(12) United States Patent
Hisano

(10) Patent No.: US 12,069,707 B2
(45) Date of Patent: Aug. 20, 2024

(54) SENSOR CONTROLLER AND PEN

(71) Applicant: Wacom Co., Ltd., Saitama (JP)

(72) Inventor: Haruhiko Hisano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 473 days.

(21) Appl. No.: 17/379,541

(22) Filed: Jul. 19, 2021

(65) Prior Publication Data

US 2021/0345361 A1 Nov. 4, 2021

Related U.S. Application Data

(63) Continuation of application No. PCT/JP2019/046999, filed on Dec. 2, 2019.

(30) Foreign Application Priority Data

Mar. 1, 2019 (JP) ................. 2019-037596

(51) Int. Cl.
*H04W 72/12* (2023.01)
*G06F 3/0354* (2013.01)
(Continued)

(52) U.S. Cl.
CPC ...... *H04W 72/542* (2023.01); *G06F 3/03545* (2013.01); *G06F 3/038* (2013.01);
(Continued)

(58) Field of Classification Search
CPC . H04W 72/542; H04W 72/541; H04W 72/30; H04W 72/21; H04W 72/0446;
(Continued)

(56) References Cited

U.S. PATENT DOCUMENTS 9,785,262 B2 10/2017 Fleck et al.
9,898,102 B2 2/2018 Qiao
(Continued)

FOREIGN PATENT DOCUMENTS

CN 105900046 A * 8/2016 ............. G01L 1/146
CN 107077264 A * 8/2017 ......... G06F 3/03545
(Continued)

OTHER PUBLICATIONS

German Office Action dated Apr. 12, 2022, for German Application No. 11 2019 006 952.7, 11 pages. (With English Machine Translation).

(Continued)

*Primary Examiner* — Phong La
(74) *Attorney, Agent, or Firm* — Seed IP Law Group LLP

(57) ABSTRACT

A change of a resource allocation scheme in a multi-pen supporting electronic apparatus can be made in a shorter period of time than in the prior art. A sensor controller 50 assigns communication resources to one or more pens 2, respectively, and detects a position of each of the one or more pens 2 on the basis of a downlink signal DS received from each of the one or more pens 2 using the assigned communication resources. When changing a resource allocation scheme, which indicates a structure of the communication resources or a method of using the communication resources, the sensor controller 50 broadcasts information indicating a new resource allocation scheme to the one or more pens 2.

13 Claims, 32 Drawing Sheets

(51) Int. Cl.
*G06F 3/038* (2013.01)
*G06F 3/041* (2006.01)
*H04L 5/00* (2006.01)
*H04W 72/04* (2023.01)
*H04W 72/0446* (2023.01)
*H04W 72/08* (2009.01)
*H04W 72/1273* (2023.01)
*H04W 72/21* (2023.01)
*H04W 72/30* (2023.01)
*H04W 72/541* (2023.01)
*H04W 72/542* (2023.01)

(52) U.S. Cl.
CPC ........ *G06F 3/04162* (2019.05); *H04L 5/0048* (2013.01); *H04W 72/0446* (2013.01); *H04W 72/1273* (2013.01); *H04W 72/21* (2023.01); *H04W 72/30* (2023.01); *H04W 72/541* (2023.01)

(58) Field of Classification Search
CPC .............. H04W 72/1273; H04L 5/0048; G06F 3/04162; G06F 3/03545; G06F 3/038
See application file for complete search history.

(56) References Cited

U.S. PATENT DOCUMENTS

| | | | |
|---|---|---|---|
| 9,977,519 B2 | 5/2018 | Lukanc et al. | |
| 2016/0103504 A1* | 4/2016 | Kang | G06F 3/04162 345/173 |
| 2016/0246390 A1* | 8/2016 | Lukanc | G06F 3/04162 |
| 2016/0299583 A1* | 10/2016 | Watanabe | G06F 3/0383 |
| 2018/0004324 A1* | 1/2018 | Park | G06F 3/0441 |
| 2018/0024654 A1 | 1/2018 | Koike et al. | |
| 2018/0024658 A1* | 1/2018 | Yamamoto | G06F 3/044 345/179 |
| 2018/0113519 A1 | 4/2018 | Yamamoto | |
| 2018/0120963 A1 | 5/2018 | Hara | |
| 2020/0159916 A1* | 5/2020 | Nguyen | G06F 11/3072 |
| 2020/0174589 A1* | 6/2020 | Hara | G06F 3/0383 |
| 2021/0345361 A1* | 11/2021 | Hisano | H04W 72/542 |

FOREIGN PATENT DOCUMENTS

| | | | | |
|---|---|---|---|---|
| CN | 109313508 B | * | 7/2021 | ............. G06F 3/016 |
| WO | 2016/163315 A1 | | 10/2016 | |
| WO | 2018/029855 A1 | | 2/2018 | |
| WO | 2018/043203 A1 | | 3/2018 | |

OTHER PUBLICATIONS

International Search Report, mailed Jan. 7, 2020, for International Application No. PCT/JP2019/046999, 1 page.

* cited by examiner

US1

| HEADER | PAIRING CONTROL INDICATOR | | | | | | RESOURCE ALLOCATION SCHEME | PAIRING SETTING INFORMATION | | |
|---|---|---|---|---|---|---|---|---|---|---|
| | 1 | 2 | 3 | 4 | 5 | 6 | TABLE NUMBER | TDID | FID | ENABLE |

US2

| HEADER | PAIRING CONTROL INDICATOR | | | | | | COMMAND | |
|---|---|---|---|---|---|---|---|---|
| | 1 | 2 | 3 | 4 | 5 | 6 | LPID | COMMAND CONTENTS |

US3

| HEADER | PAIRING CONTROL INDICATOR | | | | | | PAIRING CONFIRMATION DATA |
|---|---|---|---|---|---|---|---|
| | 1 | 2 | 3 | 4 | 5 | 6 | HASH VALUE OF PEN ID |

F I G. 8

| | TABLE NUMBER | NUMBER OF TDIDS | SYMBOL LENGTH SL | MODULATION SYSTEM | TRANSMISSION CONTENTS | NUMBER OF SLOTS | SLOT LENGTH $T_Y$ | FRAME LENGTH |
|---|---|---|---|---|---|---|---|---|
| BASIC MODE | 0 | 2 | 70us | DBPSK | T+D | 10 | 630us | 7000us |
| | 1 | 3 | 70us | DBPSK | T+D | 15 | 630us | 10175us |
| | 2 | 4 | 70us | DBPSK | T+D | 20 | 630us | 13350us |
| SYMBOL LENGTH CHANGE MODE | 3 | 2 | 105us | DBPSK | T+D | 10 | 945us | 10150us |
| | 4 | 3 | 35us | DBPSK | T+D | 15 | 315us | 5450us |
| | 5 | 4 | 35us | DBPSK | T+D | 20 | 315us | 7050us |
| DQPSK MODE | 6 | 2 | 105us | DQPSK | T+D | 10 | 525us | 5950us |
| | 7 | 3 | 70us | DQPSK | T+D | 15 | 350us | 5975us |
| | 8 | 4 | 70us | DQPSK | T+D | 20 | 350us | 7750us |
| DATA MODE | 9 | 2 | 105us | DQPSK | D | 6 | 945us | 6350us |
| | 10 | 3 | 70us | DQPSK | D | 9 | 630us | 6365us |
| | 11 | 4 | 70us | DBPSK | D | 12 | 630us | 8270us |
| COMBINATION MODE | 12 | 4 | 35us | DQPSK | D | 12 | 315us | 4490us |
| | 13 | 4 | 35us | DQPSK | T+D | 20 | 175us | 4250us |
| | 14 | 4 | 105us | DBPSK | D | 12 | 945us | 12050us |
| | 15 | 4 | 105us | DQPSK | D | 12 | 525us | 7010us |
| SINGLE MODE | 16 | 1 | 70us | DBPSK | T+D | 5 | 630us | 3825us |

FIG.15

```
|<----------------- SUPER-FRAME ----------------->|
|<-- FRAME -->|   |<-- FRAME -->|   |<-- FRAME -->|
| PEN | TOUCH | PEN | TOUCH | PEN | TOUCH |
                                              → t
```

| HEADER | PAIRING CONTROL INDICATOR | | | | | | RESOURCE ALLOCATION SCHEME | | PAIRING SETTING INFORMATION | | |
|---|---|---|---|---|---|---|---|---|---|---|---|
| | 1 | 2 | 3 | 4 | 5 | 6 | TABLE NUMBER | | TDID | FREQUENCY | ENABLE |

DIVISION INFORMATION

| HEADER | PAIRING CONTROL INDICATOR | | | | | | SUCCEEDING UPLINK SIGNAL IDENTIFYING DATA |
|---|---|---|---|---|---|---|---|
| | 1 | 2 | 3 | 4 | 5 | 6 | |

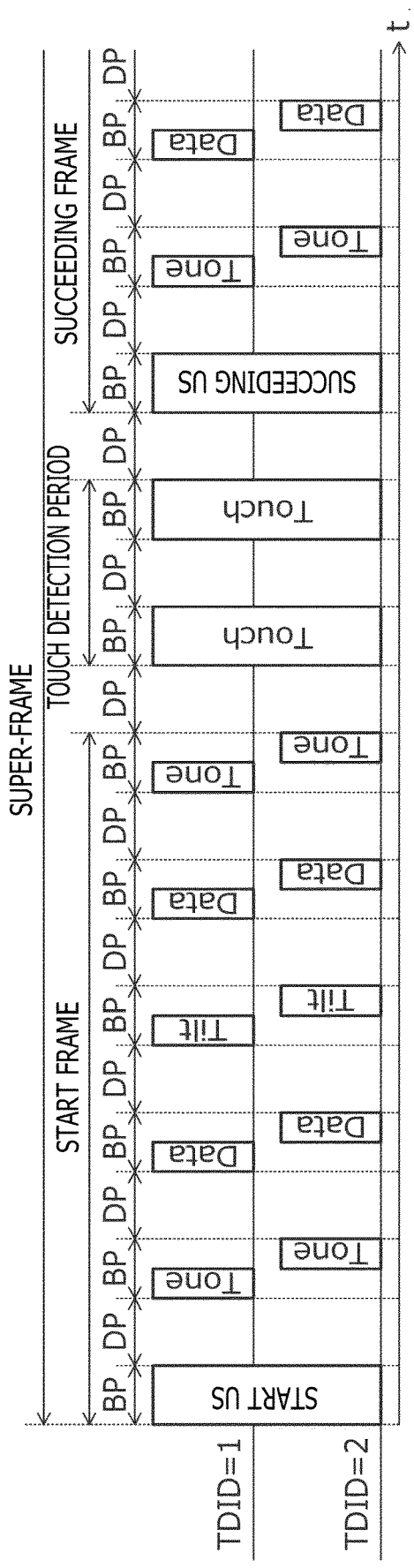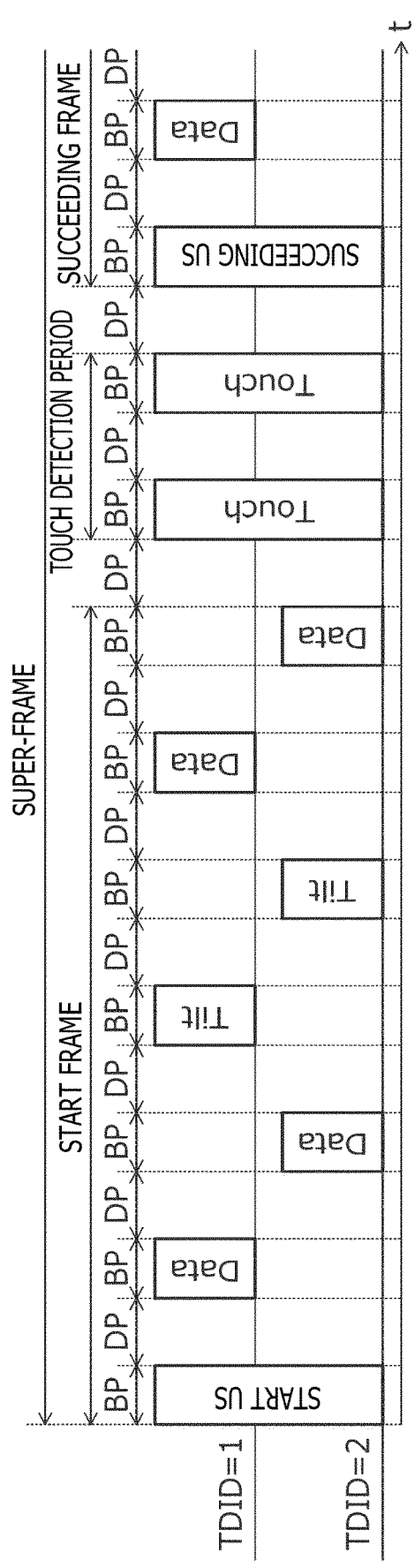

FIG. 21

| MULTI-PEN MODE | | | | | | | | | |
|---|---|---|---|---|---|---|---|---|---|
| TABLE NUMBER | NUMBER OF PRIMARY LANES | NUMBER OF SLOTS | SLOT ASSIGNMENT | Ack ASSIGNMENT | NUMBER OF DATA SLOT BITS | MODULATION SYSTEM | SYMBOL LENGTH SL | TIME LENGTH $T_B$ | TIME LENGTH $T_X$ |
| n | 1 | 12 | P(P), D(P), T(P), P(S), D(S), M(P), P(P), D(P), M(B), P(S), D(S), P(B) | 0,0,0,0,0,1, 0,0,1,0,0,1 | 8 | DQPSK | 35 us | 1000 us | 1000 us |
| n+1 | 2 | 14 | D(P), T(P), D(S), M(P), D(P), M(B), D(S) | 0,0,0,0,0,0,1, 1,0,0,1,1,0,0 | 8 | DBPSK | 35 us | 860 us | 860 us |

FIG. 22

| TYPE | | P(B) | P(P) | D(P) | T(P) | P(S) | D(S) | T(S) | M(P) | M(B) |
|---|---|---|---|---|---|---|---|---|---|---|
| | | | PRIMARY SLOT | | | SECONDARY SLOT | | | SHARED SLOT | Ack SLOT |
| SINGLE LANE MODE | PRIMARY LANE | TONE | TONE | DATA | TILT | TONE | DATA | TILT | MUTE | MUTE |
| DUAL LANE MODE | PRIMARY LANE | TONE | TONE | DATA | TILT | MUTE | MUTE | MUTE | MUTE | MUTE |
| | SECONDARY LANE | TONE | MUTE | MUTE | MUTE | TONE | DATA | TILT | TILT | MUTE |

| PROTOCOL IDENTIFYING INFORMATION | US TYPE | ST | PEN STATE INDICATOR | PE | PAIRING SETTING INFORMATION || TABLE NUMBER | RM |
|---|---|---|---|---|---|---|---|---|
| | | | | | FID | LID | | |

| PROTOCOL IDENTIFYING INFORMATION | US TYPE | PE | PAIRING SETTING INFORMATION | COMMAND || 0 |
|---|---|---|---|---|---|---|
| | | | PEN STATE INDICATOR | COMMAND TYPE | COMMAND CONTENTS | |

| PROTOCOL IDENTIFYING INFORMATION | US TYPE | PE | PAIRING SETTING INFORMATION | PAIRING CONFIRMATION DATA | ASSIGNED LPID | 0 |
|---|---|---|---|---|---|---|
| | | | PEN STATE INDICATOR | | | |

| PROTOCOL IDENTIFYING INFORMATION | US TYPE | PE | PAIRING SETTING INFORMATION | COMMAND |||||| 0 |
|---|---|---|---|---|---|---|---|---|---|---|
| | | | PEN STATE INDICATOR | COMMAND TYPE | SubF NUMBER | PT | 0 | 0 | 0 | 0 |

| SHORT UPLINK INDICATION INFORMATION | SubF NUMBER | PT | 0 |
|---|---|---|---|

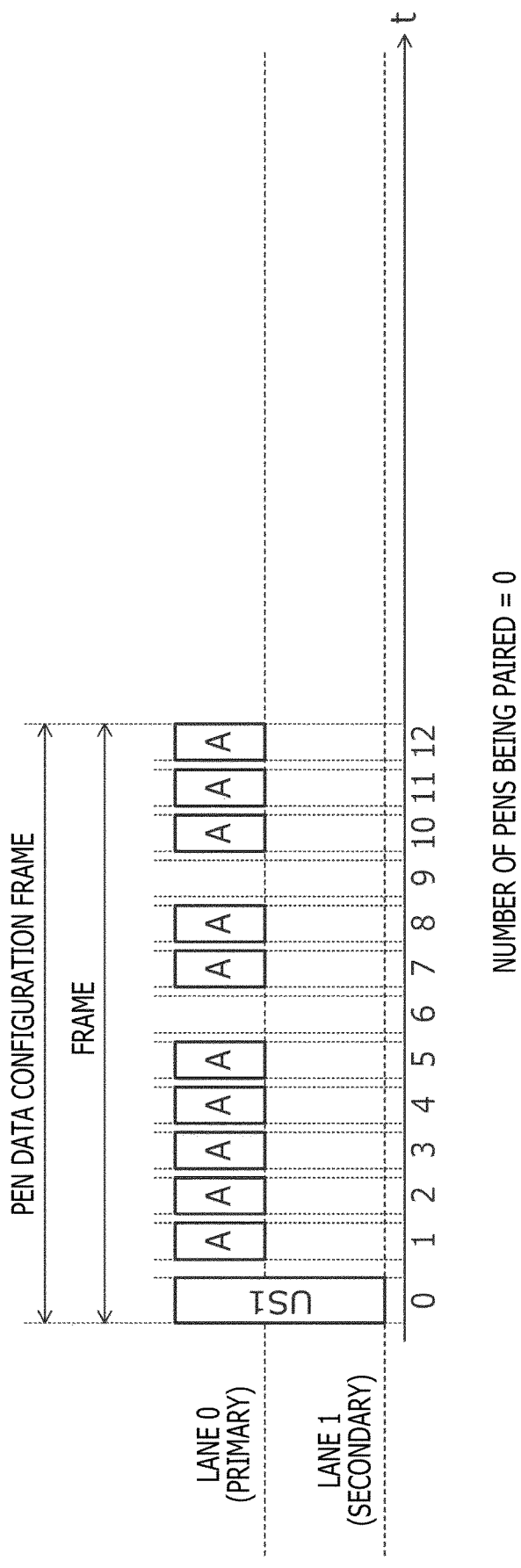

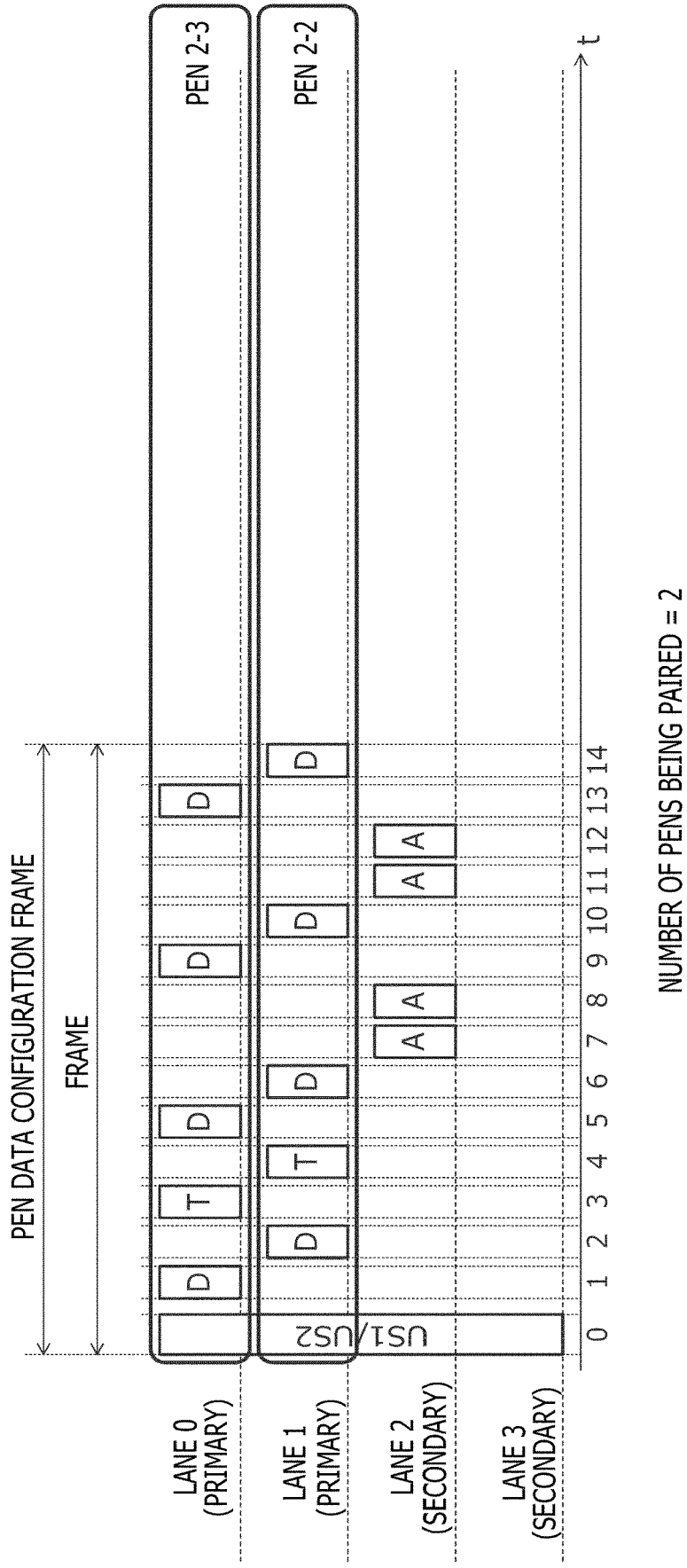

SENSOR CONTROLLER AND PEN

TECHNICAL FIELD

The present invention relates to a sensor controller that detects a position of each of one or more pens and a pen that transmits a downlink signal to the sensor controller.

BACKGROUND ART

An electronic apparatus is known, which has a sensor panel disposed within a panel surface of a display device and is configured to be able to perform communication with a pen via the sensor panel. This type of electronic apparatus includes a sensor controller that detects a position of the pen within the panel surface through communication with the pen. In the following, a signal transmitted from the sensor controller to the pen is referred to as an "uplink signal," and a signal transmitted from the pen to the sensor controller is referred to as a "downlink signal."

Patent Document 1 discloses an example of an electronic apparatus, in which communication between the pen and the sensor controller is performed during a period in which a noise generated from the display device is small (blank period). In the electronic apparatus, each of a plurality of blank periods occurring within a period necessary for display of one screen can be regarded to form a time slot, and communication between the pen and the sensor controller is performed in the time slots. Specifically, an uplink signal is transmitted by using a blank period positioned at a start of a period necessary for display of one screen, and a downlink signal is transmitted by using each succeeding blank period.

As is also described in a paragraph [0096] of Patent Document 1, the arrangement of blank periods within a period necessary for display of one screen may be changed. Hence, in order for the pen to transmit a downlink signal by using a blank period, the latest blank period arranging method needs to be notified from the sensor controller to the pen. Accordingly, in the technology of Patent Document 1, as described in a paragraph [0104] of Patent Document 1, "information indicating a blank period arranging method" can be one type of command notified from the sensor controller to the pen using the uplink signal.

Patent Document 2 describes a sensor controller configured such that processing to detect a pen (pen detection processing) and processing to detect a finger (touch detection processing) are alternately performed four times each in each period necessary for display of one screen. In the following, a period necessary for display of one screen (display period) is referred to as a "super-frame," and each pen detection processing execution period arranged within the super-frame is referred to as a "frame."

A pen according to Patent Document 2 is configured to be able to decrease a bit rate of a downlink signal when a pen tip is not in contact with a panel surface (hereinafter referred to as a "hovering state") as compared with a time when the pen tip is in contact with the panel surface (hereinafter referred to as a "contact state"). Accordingly, the sensor controller can advantageously receive the downlink signal even in the hovering state, in which the pen and the sensor panel are separated from each other and correspondingly a signal-to-noise ratio is lower.

Patent Document 3 describes an electronic apparatus that allows a plurality of pens to be used simultaneously on one panel surface. In the following, this type of electronic apparatus may be referred to as a "multi-pen supporting electronic apparatus." In Patent Document 3, a pen is configured to transmit a downlink signal when receiving an uplink signal including a local ID (identification) assigned to the pen. In a case where two pens are used simultaneously, the electronic apparatus controls timing in which each pen transmits a downlink signal, by controlling transmission timing of an uplink signal including a local ID assigned to each pen (see paragraph [0087] of Patent Document 3).

Patent Document 4 describes an electronic apparatus in which each frame is formed of a predetermined number of time slots. In this example, a first time slot of each frame is used by the sensor controller to transmit an uplink signal, and a second time slot is used by a pen not yet paired with the sensor controller to transmit a response signal in response to the uplink signal. However, in a case where the sensor controller requests by the uplink signal a specific pen to transmit data, the second time slot is used by that pen to transmit the requested data (see lines 9 to 17 on page 20 of Patent Document 4).

Patent Document 5 describes another example of the multi-pen supporting electronic apparatus. When a sensor controller in this example performs pairing with a new pen, the sensor controller assigns a time slot and a frequency to the new pen (see lines 11 to 15 on page 10 of Patent Document 5). As pairing is thus performed, the number of time slots used in a frame increases as more pens are simultaneously used.

PRIOR ART DOCUMENT

Patent Documents

Patent Document 1: PCT Patent Publication WO2016/163315
Patent Document 2: PCT Patent Publication WO2018/029855
Patent Document 3: PCT Patent Publication WO2018/043203
Patent Document 4: U.S. Pat. No. 9,785,262
Patent Document 5: U.S. Pat. No. 9,977,519

SUMMARY OF INVENTION

Technical Problems

As described also in Patent Document 3, a command arranged in an uplink signal in the multi-pen supporting electronic apparatus is transmitted to a single pen specified as a destination.

However, because the command is thus transmitted only to a specific pen, it is difficult for the conventional multi-pen supporting electronic apparatus to quickly change its resource allocation scheme, such as the structure of a communication resources (for example, a method of arranging blank periods within a frame) and a usage method therefor (for example, content of a downlink signal to be transmitted in each blank period). Specifically, the latest resource allocation scheme needs to be notified by sending a commands to multiple pens one by one. Thus, a change of the resource allocation scheme can be completed only after transmission of uplink signals corresponding in number to at least the number of pens that are detected. As a result, changing the resource allocation scheme takes a long time.

It is accordingly an aspect of the present invention to provide a sensor controller and a pen, which can easily realize a change of the resource allocation scheme in a multi-pen supporting electronic apparatus by using less processing and a shorter time than in the prior art.

As with the pen described in the above-described Patent Document 2, a pen is known which can change the bit rate of a downlink signal between the hovering state and the contact state. The signal-to-noise ratio of the downlink signal is changed also by a factor, other than the state of contact of the pen tip with the panel surface, such as the state of noise generated from the display device or the like. However, in the conventional electronic apparatus, the bit rate of the downlink signal or signal transmission intervals cannot be changed according to a factor other than the state of contact of the pen tip with the panel surface. It is therefore difficult to optimize the bit rate of the downlink signal or the signal transmission intervals according to conditions of the signal-to-noise ratio, which tends to degrade the reception quality of the downlink signal.

It is accordingly another aspect of the present invention to provide a sensor controller and a pen that can optimize a bit rate and signal transmission intervals to maintain an optimized state of reception of a downlink signal.

As with the electronic apparatus according to the above-described Patent Document 2, an electronic apparatus is known which arranges a plurality of frames in one super-frame. However, in this type of conventional electronic apparatus, the temporal position of each frame within the super-frame is fixed and, therefore, it is difficult to flexibly change the time length of touch detection processing that occurs alternately with each frame. In addition, in an in-cell type display device, to be described later, a stripe-form display noise or audio noise may be generated.

It is accordingly yet another aspect of the present invention to provide a sensor controller and a pen that can change the temporal position of each frame within a super-frame.

As with the multi-pen supporting electronic apparatus described in Patent Document 3, an electronic apparatus is known which sequentially transmits an uplink signal to notify transmission timing of a downlink signal to each of a plurality of pens that are used simultaneously. However, the method uses a large amount of communication resources to transmit the uplink signals, and thus efficient communication is not possible.

It is accordingly yet another aspect of the present invention to provide a sensor controller and a pen that can realize efficient communication by decreasing the transmission frequency of an uplink signal.

As with the electronic apparatus described in Patent Document 4, an electronic apparatus is known which secures a time slot present at a predetermined position within a frame in order to receive a signal from a pen that is not yet paired. With this configuration, however, the secured time slot is wasted in a case where it is not necessary to receive a signal from a pen that is not yet paired, such as a case where an upper limit of the number of pens that can be accommodated is already reached and thus there is no room to receive any more pens. If the sensor controller makes an explicit request, the above-described time slot can be used as a time slot for data transmission, but this would require transmission of an uplink signal for the request each time the request is made, making efficient communication not possible.

It is accordingly yet another aspect of the present invention to provide a sensor controller and a pen that can use a time slot secured to receive a signal from a pen, which is not yet paired, for another purpose without using an explicit request by an uplink signal in a case where it is not necessary to receive a signal from a pen that is not yet paired.

As with the multi-pen supporting electronic apparatus described in Patent Document 5, a multi-pen supporting electronic apparatus is known in which the number of time slots used within a frame increases as the number of simultaneously-used pens increases. With the method, however, the number of time slots that can be accommodated within one frame defines an upper limit of the number of pens that can be used simultaneously.

It is accordingly yet another aspect of the present invention to provide a sensor controller and a pen that can simultaneously accommodate more pens than the number of pens defined by the number of time slots that can be accommodated within one frame.

As one method of enabling simultaneous usage of more pens than the upper limit value of the number of pens defined by the number of time slots that can be accommodated within one frame, it is possible to halve the communication rate and assign time slots that straddle two frames to each pen when the number of pens used simultaneously is larger than the upper limit value. The halved communication rate, however, is maintained even after the number of pens used simultaneously is decreased to be equal to or be less than the upper limit value.

It is accordingly yet another aspect of the present invention to provide a sensor controller that can restore a communication rate to an original rate when the number of pens used simultaneously is decreased to be equal to or be less than a predetermined upper limit value.

Technical Solution

A sensor controller according to a first aspect of the present invention is a sensor controller that assigns communication resources to one or more pens, respectively, and detects positions of the one or more pens on the basis of downlink signals received from the one or more pens using the assigned communication resources. When changing a resource allocation scheme indicating a structure of the communication resources or a method of using the communication resources, the sensor controller broadcasts information indicating a new resource allocation scheme to the one or more pens.

A pen according to the first aspect of the present invention is a pen that receives a resource allocation scheme, which indicates a structure of communication resources or a method of using the communication resources, from a sensor controller, and transmits a downlink signal according to the resource allocation scheme. The pen is configured to receive identification information, which indicates assignment of the communication resource, from the sensor controller, and to transmit the downlink signal using the communication resource assigned by the identification information. Even when the pen receives a new resource allocation scheme from the sensor controller and transmits the downlink signal according to the new resource allocation scheme, the pen transmits the downlink signal by continuing to use the communication resource assigned by the identification information.

A sensor controller according to a second aspect of the present invention is a sensor controller for detecting a position of a pen by receiving a downlink signal from the pen using any receiving method. The sensor controller transmits an uplink signal indicating a change in a bit rate of the downlink signal to the pen, and changes the receiving method for the downlink signal to a new receiving method corresponding to the bit rate after the change.

A pen according to the second aspect of the present invention is a pen that transmits a downlink signal to a sensor controller, in which the pen changes a symbol length of the downlink signal in response to reception of an uplink signal indicating a change in a symbol length of the downlink signal from the sensor controller.

A sensor controller according to a third aspect of the present invention is a sensor controller that performs communication with one or more pens in units of a super-frame including a plurality of frames each including a plurality of time slots. The sensor controller transmits a start uplink signal, which includes setting information applicable to an entire super-frame, using a start frame located at a beginning among the plurality of frames. In each of one or more succeeding frames other than the start frame among the plurality of frames, the sensor controller transmits a succeeding uplink signal, which indicates a reference time for the plurality of time slots arranged within the succeeding frame.

A pen according to the third aspect of the present invention is a pen that performs communication with a sensor controller in units of a super-frame including a plurality of frames each including a plurality of time slots. When an uplink signal received from the sensor controller is a start uplink signal including setting information applicable to an entire super-frame, the pen sets the setting information in a memory. When the uplink signal received from the sensor controller is a succeeding uplink signal indicating a reference time for the plurality of time slots arranged in one of one or more succeeding frames other than a start frame located at a beginning among the plurality of frames, the pen obtains a temporal position of each time slot within the corresponding succeeding frame on the basis of a reception timing of the succeeding uplink signal.

A sensor controller according to a fourth aspect of the present invention is a sensor controller that performs communication with one or more pens, respectively, by using a frame including a plurality of first time slots. The sensor controller is configured to operate in one of a single lane mode, in which a data signal is received from a first pen, and a dual lane mode, in which the data signal is received from each of the first pen and a second pen. The plurality of first time slots include a first primary slot used to receive the data signal from the first pen in each of the single lane mode and the dual lane mode, and a first secondary slot that is used to receive the data signal from the first pen in the single lane mode. The first secondary slot is used to receive the data signal from the second pen in the dual lane mode. The sensor controller transmits an uplink signal including slot assignment information, which indicates, for each of the plurality of first time slots, whether the slot is the first primary slot or the first secondary slot.

A pen according to the fourth aspect of the present invention is a pen that performs communication with a sensor controller by using a frame including a plurality of time slots. The plurality of time slots include a primary slot used for reception of a data signal from a first pen in each of a single lane mode, in which the data signal is received from the first pen, and a dual lane mode, in which the data signal is received from each of the first pen and a second pen. The plurality of time slots include a secondary slot, which is used to receive the data signal from the first pen in the single lane mode, and is used to receive the data signal from the second pen in the dual lane mode. The pen receives, from the sensor controller, an uplink signal including slot assignment information indicating, for each of the plurality of time slots, whether the slot is the primary slot or the secondary slot. The pen receives, from the sensor controller, operation mode information indicating in which of the single lane mode and the dual lane mode the sensor controller is operating. When the operation mode information indicates that the sensor controller is operating in the single lane mode, the pen transmits a downlink signal in both the time slot as the primary slot and the time slot as the secondary slot. When the operation mode information indicates that the sensor controller is operating in the dual lane mode, the pen transmits the downlink signal in one of the time slot as the primary slot or the time slot as the secondary slot, and the pen does not transmit the downlink signal in the other of the time slot as the primary slot or the time slot as the secondary slot.

A sensor controller according to a fifth aspect of the present invention is a sensor controller that performs communication with one or more pens, respectively, by using a frame including a plurality of time slots. The sensor controller is configured to operate in one of a single lane mode, in which a data signal is received from a first pen, and a dual lane mode, in which the data signal is received from each of the first pen and a second pen. The plurality of time slots include a shared slot, which is used to receive a signal from a pen not yet paired in the single lane mode, and is used to receive the data signal from the second pen in the dual lane mode.

A pen according to the fifth aspect of the present invention is a pen that performs communication with a sensor controller by using a frame including a plurality of time slots. The sensor controller is configured to operate in one of a single lane mode, in which a data signal is received from a first pen, and a dual lane mode, in which the data signal is received from each of the first pen and a second pen. The pen receives, from the sensor controller, an uplink signal including slot assignment information identifying, among the plurality of time slots, a shared slot, which is used to receive a signal from a pen not yet paired in the single lane mode, and is used to receive the data signal from the second pen in the dual lane mode. The pen receives, from the sensor controller, operation mode information indicating in which of the single lane mode and the dual lane mode the sensor controller is operating. When the pen is not paired with the sensor controller at a point in time when the pen receives the uplink signal, and the operation mode information indicates that the sensor controller is operating in the single lane mode, the pen transmits a signal requesting a pairing with the sensor controller in the time slot as the shared slot. When the pen is paired with the sensor controller at a point in time when the pen receives the uplink signal, and the operation mode information indicates that the sensor controller is operating in the dual lane mode, the pen transmits the data signal in the time slot as the shared slot.

A sensor controller according to a sixth aspect of the present invention is a sensor controller that performs communication with one or more pens, respectively, by using a series of frames each including a plurality of time slots. The sensor controller is configured to operate in one of a single lane mode, in which a data signal is received from a first pen, and a dual lane mode, in which the data signal is received from each of the first pen and a second pen. During operation in the single lane mode, the sensor controller assigns, as time slots for transmission of a downlink signal, a predetermined number of time slots among the plurality of time slots included in one frame to the first pen. During operation in the dual lane mode, the sensor controller assigns to each of the first pen and the second pen, as time slots for transmission of the downlink signal, the predetermined number of time slots among the plurality of time slots in each of a first frame and a second frame that is consecutive to the first frame.

A pen according to the sixth aspect of the present invention is a pen that performs communication with a sensor controller by using a frame including a plurality of time slots. The sensor controller is configured to operate in one of a single lane mode, in which a data signal is received from a first pen, and a dual lane mode, in which the data signal is received from each of the first pen and a second pen. The pen receives, from the sensor controller, an uplink signal including operation mode information indicating in which of the single lane mode and the dual lane mode the sensor controller is operating. When the operation mode information indicates that the sensor controller is operating in the single lane mode, the pen transmits a downlink signal by using a predetermined number of time slots among the plurality of time slots included in one frame. When the operation mode information indicates that the sensor controller is operating in the dual lane mode, the pen transmits the downlink signal by using one half of the predetermined number of time slots among the plurality of time slots included in one frame.

A sensor controller according to a seventh aspect of the present invention is a sensor controller that performs communication with one or more pens, respectively, by using a series of frames each including a plurality of time slots. The sensor controller is configured to operate in one of a single lane mode, in which communication with a first pen is performed at a first communication rate by using a first primary lane, and a dual lane mode, in which the communication with the first pen is performed at a second communication rate that is half the first communication rate by using the first primary lane and communication with a second pen is performed at the second communication rate by using a first secondary lane. When the communication with the first pen is ended during operation in the dual lane mode, the sensor controller moves the second pen to the first primary lane, and thereafter changes the operation mode to the single lane mode.

Advantageous Effects

According to the first aspect of the present invention, information indicating a new resource allocation scheme is transmitted to one or more pens by broadcast rather than by individual command transmissions. Thus, it is possible to more easily change the resource allocation scheme in the multi-pen supporting electronic apparatus, using less processing in a shorter time than in the prior art.

According to the second aspect of the present invention, the bit rate of the downlink signal can be changed from the sensor controller side. It is therefore possible to optimize the bit rate and signal transmission intervals to maintain reception of the downlink signal in a good state.

According to the third aspect of the present invention, the sensor controller can change the temporal position of each succeeding frame within the super-frame by suitably adjusting transmission timing of the succeeding uplink signal. Hence, the time length of touch detection processing that can be arranged alternately with each frame can be flexibly changed. In addition, it is possible to suppress occurrence of a stripe-form display noise or audio noise in a particular display device.

According to the fourth aspect of the present invention, the sensor controller can notify each pen to be paired, in advance using the uplink signal, with respect to each of the plurality of first time slots, whether the slot is the first primary slot or the second secondary slot. Hence, it is not necessary to repeatedly transmit an uplink signal to notify the transmission timing of a downlink signal. It is therefore possible to reduce the transmission frequency of the uplink signal to thereby achieve efficient communication.

According to the fifth aspect of the present invention, a shared slot is provided, which is used to receive a signal from a pen not yet paired in the single lane mode, and is used to receive a data signal from a second pen in the dual lane mode. Thus, in the dual lane mode in which it is not necessary to receive a signal from a pen not yet paired, time slots reserved to receive a signal from a pen not yet paired can be used for another purpose without using an explicit request by an uplink signal.

According to the sixth aspect of the present invention, during operation in the dual lane mode, a predetermined number of time slots among a plurality of time slots included in each of two consecutive frames are assigned to each of the first and second pens that are paired as time slots for transmission of a downlink signal. It is therefore possible to simultaneously use more pens than the number of pens defined by the number of time slots that can be accommodated within one frame.

According to the seventh aspect of the present invention, when communication with the first pen communicating in the first primary lane is ended, the second pen communicating in the first secondary lane is moved to the first primary lane, and thereafter the operation mode is changed to the single lane mode. Thus, when the number of pens used simultaneously is decreased and becomes equal to or less than a predetermined upper limit value, the communication rate can be restored to an original rate.

BRIEF DESCRIPTION OF DRAWINGS

FIG. 8 is a diagram depicting a resource allocation scheme table including a list of resource allocation schemes.

FIG. 15 is a diagram depicting a temporal relation between pen detection processing and touch detection processing according to a second embodiment of the present invention.

FIG. 16A is a diagram depicting a configuration of an uplink signal US1$a$, and FIG. 16B is a diagram depicting a configuration of an uplink signal US4.

FIGS. 19A and 19B are each a diagram depicting another example of the method of time usage within a super-frame in the third embodiment of the present invention.

FIG. 21 is a diagram depicting a resource allocation scheme table including a list of resource allocation schemes used in a fourth embodiment of the present invention.

FIG. 22 is a diagram illustrating specific content of different slot types.

FIGS. 24A to 24E are each a diagram depicting a configuration of an uplink signal US used in the fourth embodiment of the present invention.

FIG. 25 is a diagram depicting a method of using each time slot in a case where the resource allocation scheme of the table number n depicted in FIG. 21 is used and where the number of pens 2 being paired is zero.

FIG. 35 is a diagram depicting a method of using each time slot after the operation mode of the sensor controller 50 is changed to a single lane mode in a case where the resource allocation scheme of the table number n+1 depicted in FIG. 21 is used.

MODES FOR CARRYING OUT THE INVENTION

Embodiments of the present invention will hereinafter be described in detail with reference to the accompanying drawings.

Figure 1:
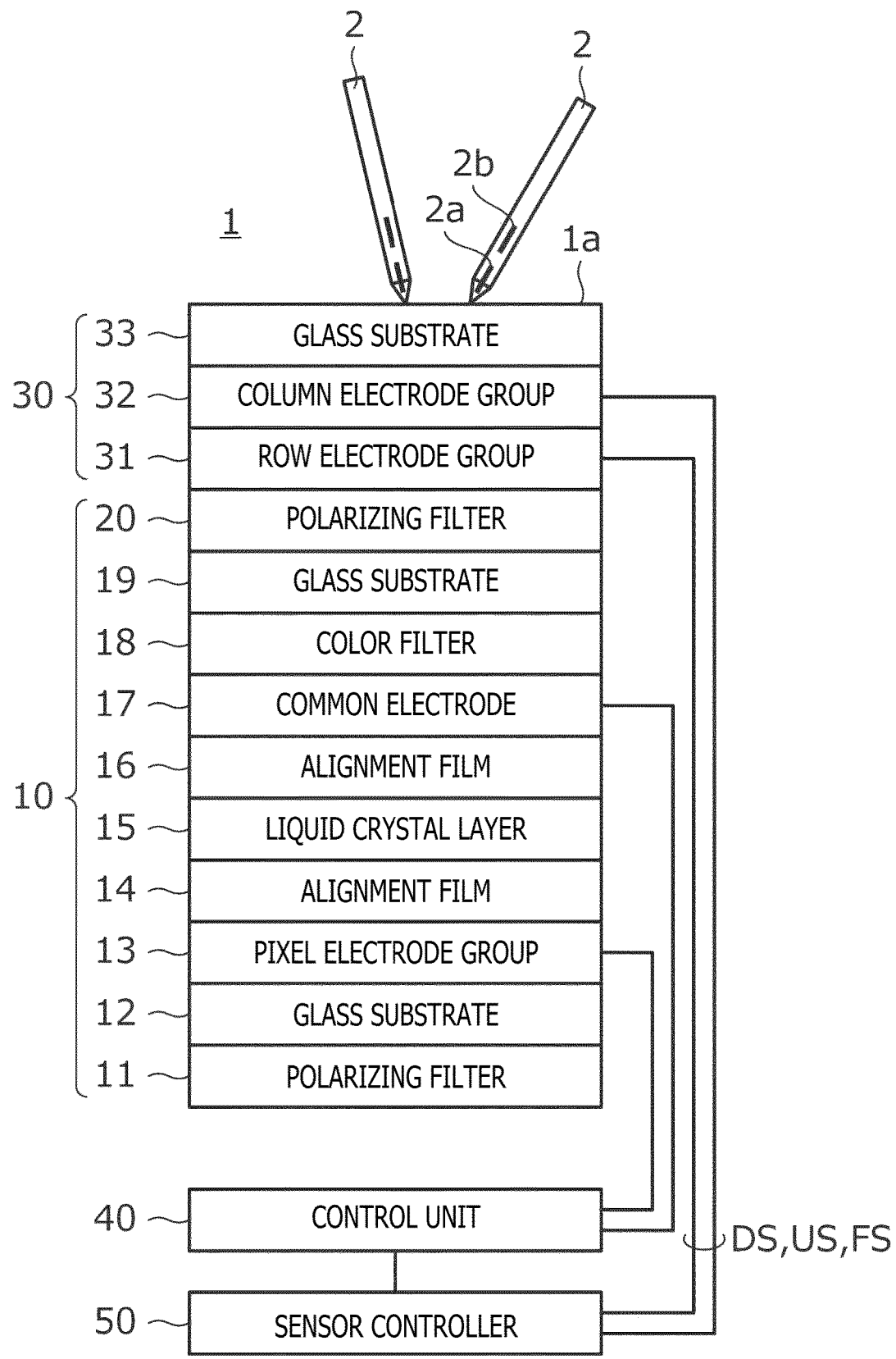
FIG. 1 is a diagram depicting a system including an electronic apparatus 1 and a pen 2 according to a first embodiment of the present invention.

FIG. 1 is a diagram depicting a system including an electronic apparatus 1 and pens 2 according to a first embodiment of the present invention. The electronic apparatus 1 is, for example, a tablet computer. As depicted in FIG. 1, the electronic apparatus 1 includes a display device 10, a sensor panel 30, a control unit 40, and a sensor controller 50. The sensor panel 30 and the display device 10 are arranged in a stacked manner such that the sensor panel 30 is on an upper side. An upper surface of the sensor panel 30 constitutes a panel surface 1$a$ of the electronic apparatus 1. The electronic apparatus 1 is configured to be able to support a plurality of pens 2 at the same time on the one panel surface 1$a$. Hence, the electronic apparatus 1 is a multi-pen supporting electronic apparatus described above.

A pen 2 is, for example, an electronic pen (active pen) that supports an active capacitive system. In the vicinity of a pen tip of the pen 2, two pen tip electrodes 2$a$ and 2$b$ are arranged next to each other along a pen axis in order from a position close to the pen tip.

Various types of displays such as a liquid crystal display, an organic EL (Electroluminescence) display, and an electronic paper can be used as the display device 10. FIG. 1 illustrates an example in which a liquid crystal display is used. As depicted in the figure, the display device 10 in this case has a structure obtained by laminating a polarizing filter 11, a glass substrate 12, a pixel electrode group 13, an alignment film 14, a liquid crystal layer 15, an alignment film 16, a common electrode 17, a color filter 18, a glass substrate 19, and a polarizing filter 20 in this order. The pixel electrode group 13 is formed of a plurality of pixel electrodes provided so as to correspond to respective pixels of the display device 10. The control unit 40 displays image data on the display device 10 by controlling a voltage applied to each pixel electrode 13 on the basis of the display target image data, in a state in which a ground potential is supplied to the common electrode 17.

The sensor panel 30 includes a structure in which a row electrode group 31 and a column electrode group 32 are formed on the lower surface of a glass substrate 33. The electronic apparatus 1 of a type in which the row electrode group 31 and the column electrode group 32 constituting the sensor panel 30 are thus provided outside the display device 10 is referred to as an "out-cell type" position detecting device. In a third embodiment to be described later, on the other hand, description will be made of an electronic apparatus 1 which is an "in-cell type" position detecting device, in which the row electrode group 31 and the column electrode group 32 constituting the sensor panel 30 are provided within the display device 10.

Figure 2:
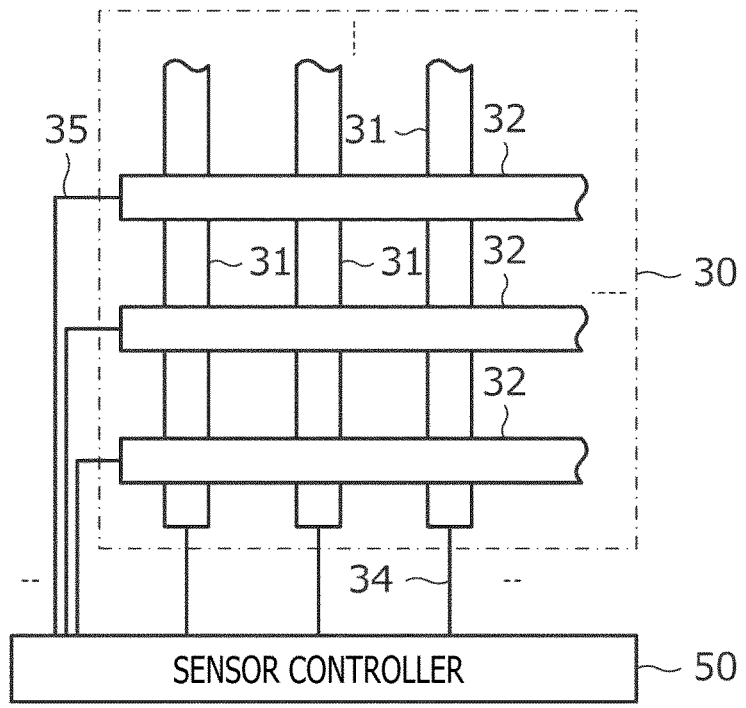
FIG. 2 is a diagram schematically depicting a planar structure of a row electrode group 31 and a column electrode group 32 depicted in FIG. 1.

FIG. 2 is a diagram schematically depicting a planar structure of the row electrode group 31 and the column electrode group 32. As depicted in the figure, the row electrode group 31 and the column electrode group 32 are each formed of a plurality of linear electrodes extended in parallel with each other at equal intervals. The plurality of linear electrodes constituting the row electrode group 31 and the plurality of linear electrodes constituting the column electrode group 32 are arranged so as to be orthogonal to each other. Each linear electrode constituting the row electrode group 31 is individually connected to the sensor controller 50 by lead wiring 34. Similarly, each linear electrode constituting the column electrode group 32 is individually connected to the sensor controller 50 by lead wiring 35.

Returning to FIG. 1, the control unit 40 is a computer including a processor and a memory (neither is depicted). The processor reads and executes a program stored in the memory, and thereby the computer performs various types of processing, such as control of each part of the electronic apparatus 1 including the display device 10 and the sensor controller 50, and execution of various types of applications including a drawing application. The memory includes a main memory such as a DRAM (Dynamic Random Access Memory) and an auxiliary storage device such as a flash memory. Though not depicted in the figure, the electronic apparatus 1 includes a communicating device that supports various types of communication standards (Wi-Fi (registered trademark), Bluetooth (registered trademark), and the like), and is capable of communicate with another electronic device (including a pen 2) via the communicating device.

The sensor controller 50 is an IC (Integrated Circuit) including a processor and a memory (neither is depicted). The processor reads and executes a program stored in the memory, and thereby the sensor controller 50 performs various types of processing such as processing of detecting a pen 2 (pen detection processing), and processing of detecting a finger not depicted (touch detection processing). The pen detection processing includes processing of deriving the position of the pen 2 on the panel surface 1a and obtaining data transmitted by the pen 2 by transmitting and receiving an uplink signal US and a downlink signal DS to and from the pen 2 via capacitive coupling between the row electrode group 31 and the column electrode group 32 and the pen tip electrodes 2a and 2b. In addition, the touch detection processing includes processing of deriving the position of a finger on the panel surface 1a by supplying a finger detection signal FS to one of the row electrode group 31 and the column electrode group 32 and detecting a potential appearing in the other.

Figure 3:
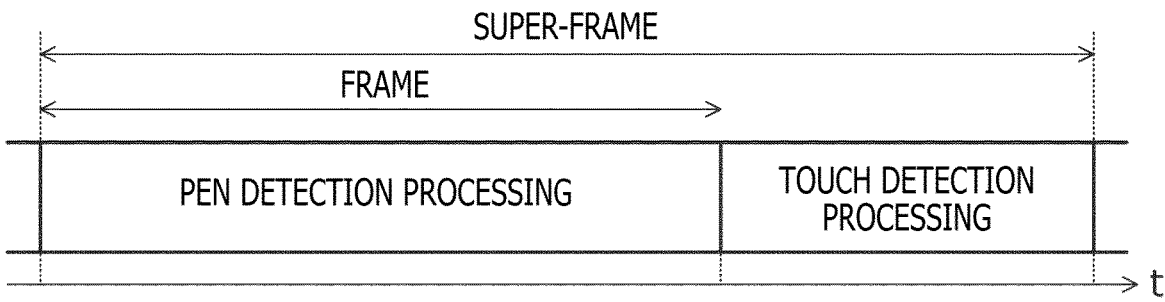
FIG. 3 is a diagram depicting a temporal relation between pen detection processing and touch detection processing according to the first embodiment of the present invention.

FIG. 3 is a diagram depicting a temporal relation between the pen detection processing and the touch detection processing. As depicted in the figure, in the present embodiment, the pen detection processing and the touch detection processing are each performed once in a super-frame controlled by the sensor controller 50. As described above, in the present specification, a period in which the pen detection processing is performed will be referred to as a "frame." The sensor controller 50 is configured to control the super-frame so as to be synchronous with a period (display frame) necessary for the display device 10 to display (render) display data of one screen.

Figure 4A:
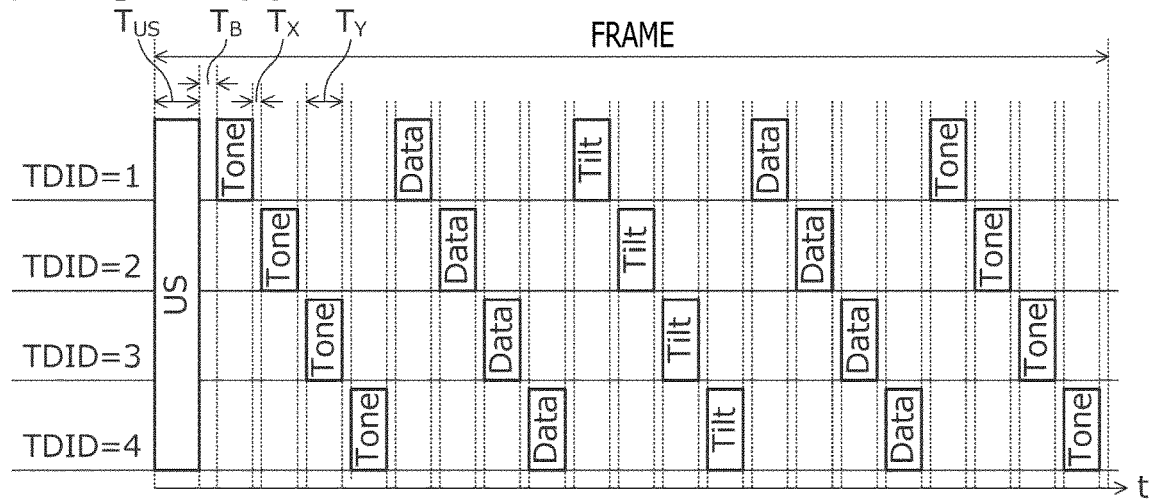
FIGS. 4A to 4D are each a diagram depicting an example method of time usage within a frame.
Figure 4B:
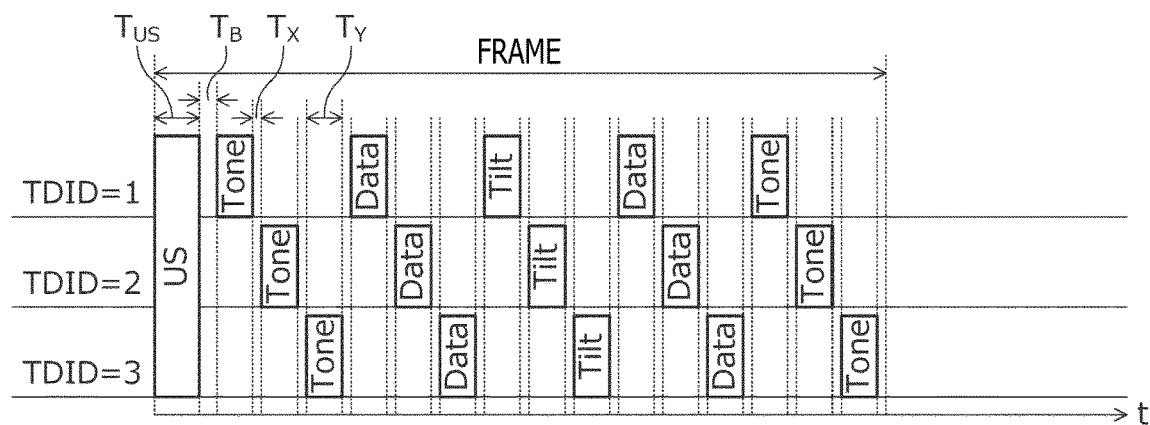
Figure 4C:
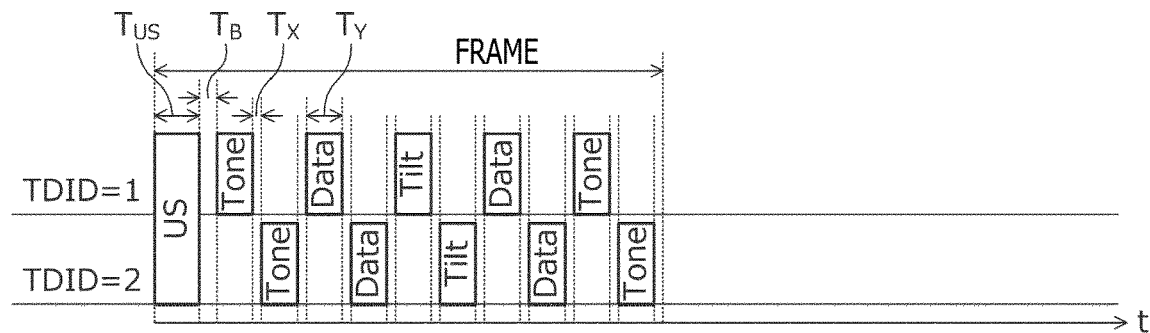
Figure 4D:
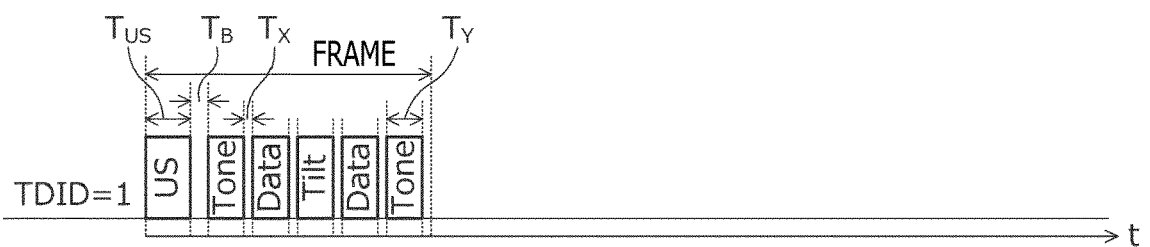
Figure 5A:
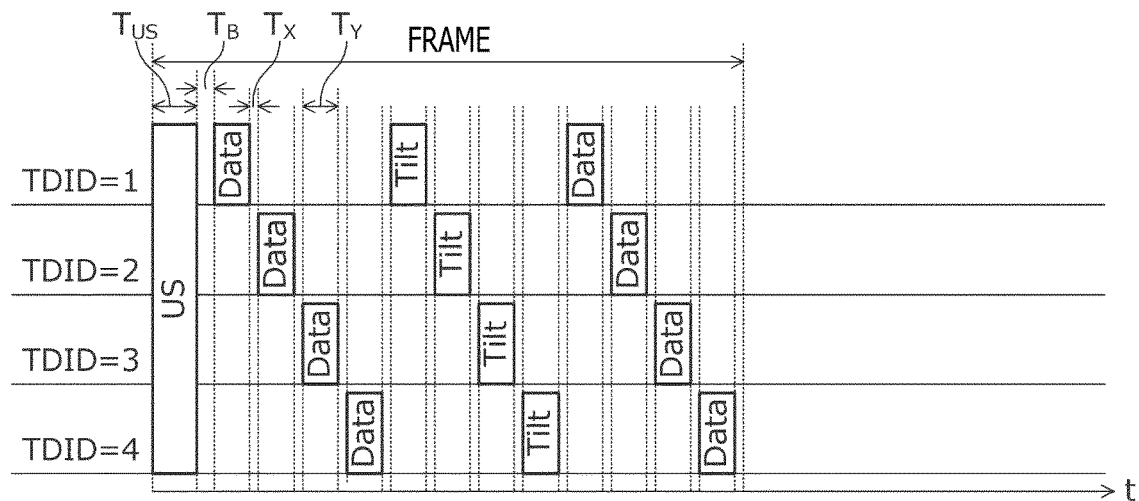
FIGS. 5A to 5D are each a diagram depicting another example of the method of time usage within a frame.
Figure 5B:
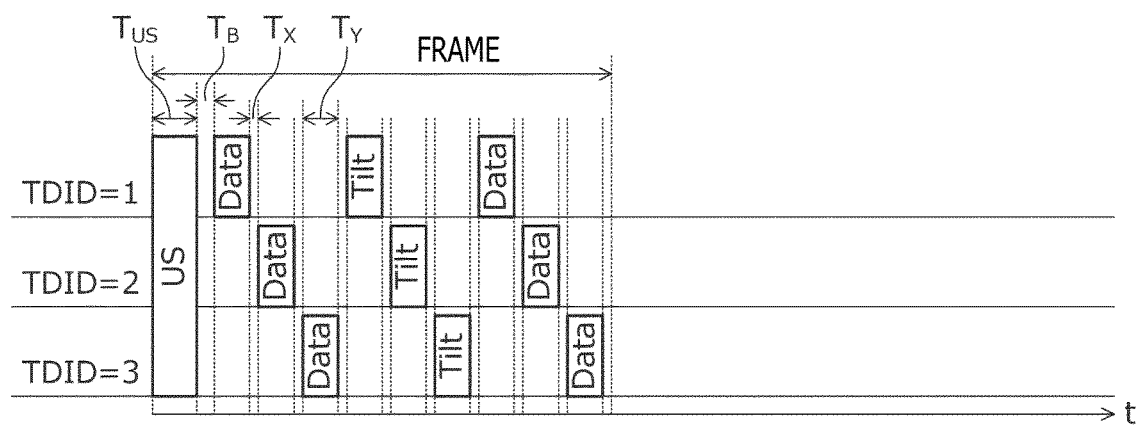
Figure 5C:
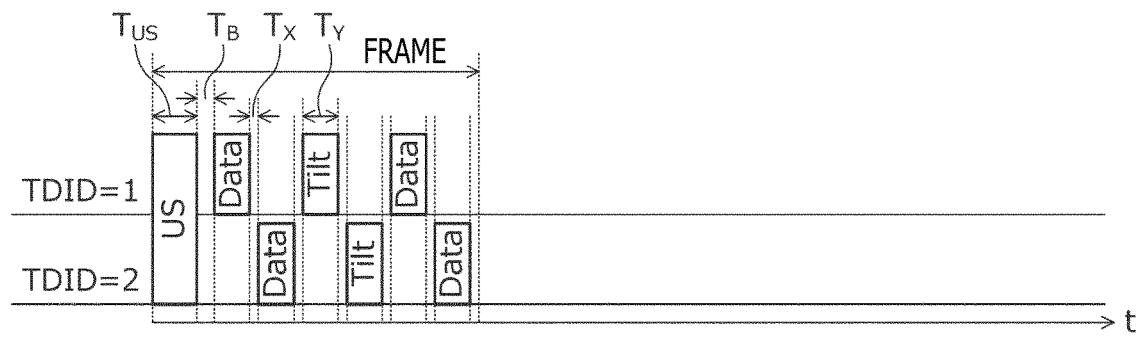
Figure 5D:

Each of FIGS. 4A to 4D is a diagram depicting an example method of time usage within a frame. Each of FIGS. 5A to 5D is a diagram depicting another example method of time usage within a frame. Each of FIG. 4A and FIG. 5A depicts a usage method adopted in a case where the sensor controller 50 allows communication with four pens 2 (time division multiplex communication, as in the following cases). Each of FIG. 4B and FIG. 5B depicts a usage method adopted in a case where the sensor controller 50 allows communication with three pens 2. Each of FIG. 4C and FIG. 5C depicts a usage method adopted in a case where the sensor controller 50 allows communication with two pens 2. Each of FIG. 4D and FIG. 5D depicts a usage method adopted in a case where the sensor controller 50 allows communication with one pen 2. A usage method to be actually adopted is dynamically determined by the sensor controller 50, and is notified to each pen 2 by broadcast transmission. This aspect will be described in detail later.

As depicted in each diagram of FIG. 4 and FIG. 5, the sensor controller 50 is configured to transmit an uplink signal US over a time length Tus at a start within a frame irrespective of the number of pens 2 with which communication is allowed. Details of the uplink signal US will be described later with reference to FIG. 6.

A blank period of a time length $T_B$ is provided after the transmission period of the uplink signal US, and any number of time slots each having a time length $T_Y$ are thereafter provided spaced apart by intervals of a time length $T_X$.

Each of a series of time slots within a frame is used for a pen 2 to transmit a downlink signal DS. "Tone," "Data," and "Tilt" depicted in each figure of FIG. 4 and FIG. 5 denote types of downlink signals DS thus transmitted. Detailed content of each will be described later with reference to FIG. 7.

Time slot identification information TDID depicted in each diagram of FIG. 4 and FIG. 5 is identification information indicating assignment of communication resources to each pen 2 with regard to the time slots. The sensor controller 50 is configured to assign one of different time slot identification information TDIDs, which are different from each other, to each of one or more paired pens 2 by using pairing setting information to be described later.

Each time slot identification information TDID is assigned time slots one by one in order. For illustration, in the example of FIG. 4A, a total of 20 time slots are prepared, and time slot identification information TDID=1 is assigned the 1st, 5th, 9th, 13th, and 17th time slots of the 20 time slots. Time slot identification information TDID=2 is assigned the 2nd, 6th, 10th, 14th, and 18th time slots. Time slot identification information TDID=3 is assigned the 3rd, 7th, 11st, 15th, and 19th time slots. Time slot identification information TDID=4 is assigned the 4th, 8th, 12nd, 16th, and 20th time slots. Such time slot assigning method is adopted to make the intervals of downlink signals DS transmitted by each pen 2 as uniform as possible.

Figures 6A, 6B, 6C, 7:
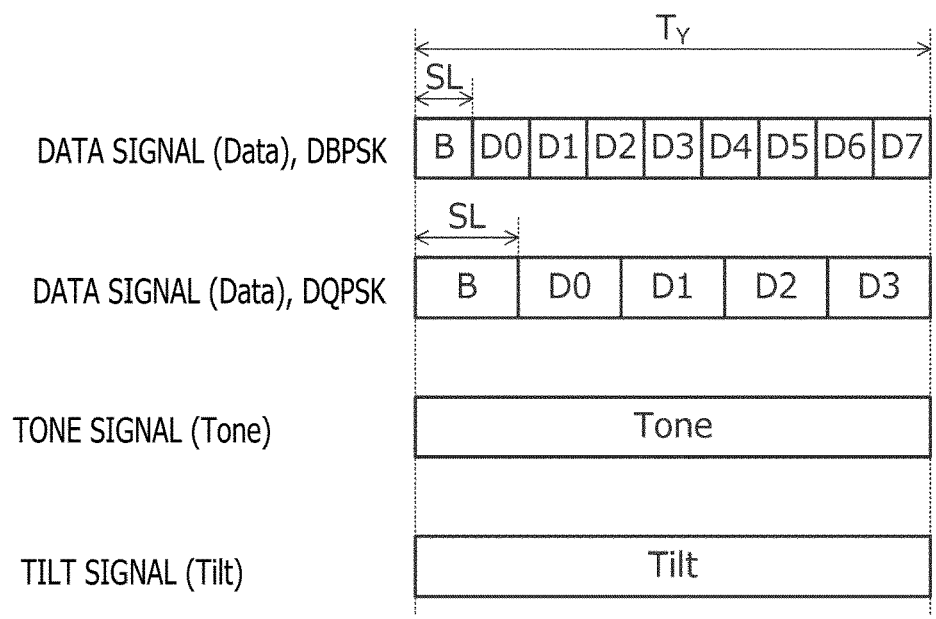
FIG. 6A is a diagram depicting a configuration of an uplink signal US1.
FIG. 6B is a diagram depicting a configuration of an uplink signal US2.
FIG. 6C is a diagram depicting a configuration of an uplink signal US3.
FIG. 7 is a diagram depicting a configuration of a downlink signal DS.

Each of FIGS. 6A to 6C is a diagram depicting a configuration of an uplink signal US used in the present embodiment. As depicted in these figures, broadly classified, three types of uplink signals US are used in the present embodiment. Generally speaking, an uplink signal US1 depicted in FIG. 6A is used to broadcast a new resource allocation scheme to each paired pen 2, and to transmit pairing setting information necessary for establishing a new pairing to a pen 2 not yet paired with the sensor controller 50. An uplink signal US2 depicted in FIG. 6B is used to transmit a command to a specific pen 2. An uplink signal US3 depicted in FIG. 6C is used to establish a pairing with the pen 2 that has transmitted a pen ID in response to the pairing setting information.

As depicted in FIGS. 6A to 6C, a header and pairing control indicators are arranged in this order at a start of any type of uplink signal US. However, the arrangement of the pairing control indicators may be omitted in some uplink signals US.

The header is, for example, information including four bits of information indicating that the signal is generated by the multi-pen supporting electronic apparatus 1 illustrated in the present embodiment, and two bits of information indicating the type of the uplink signal US (one of the uplink signals US1 to US3). When the pen 2 can obtain the former information by decoding a received signal, the pen 2 determines that the received signal is an uplink signal US. When the pen 2 can next obtain the latter information, the pen 2 determines the type of the received uplink signal US, and starts processing corresponding to the determined type.

The pairing control indicators are information including a value of "1" or "0" for each local pen ID. The local pen ID is identification information that the sensor controller 50 uniquely assigns to each pen 2 already paired with the sensor controller 50. FIG. 6 depicts an example in which six kinds of local pen IDs 1 to 6 are used. A pairing control indicator of "1" indicates that this local pen ID is being used, that is, the sensor controller 50 currently maintains a pairing with the pen 2 assigned the local pen ID. On the other hand, a pairing control indicator of "0" indicates that this local pen ID is unused, that is, the sensor controller 50 is not paired with the pen 2 assigned the local pen ID (or has canceled the pairing).

Here, when the sensor controller 50 does not receive a downlink signal DS from a pen 2 with which a pairing is established for a predetermined time, the sensor controller 50 preferably cancels the pairing with the pen 2. This enables the sensor controller 50 to select a resource allocation scheme based on the number of pens 2 in an actually communicable state when determining the resource allocation scheme to be described later (step S1 in FIG. 10 to be described later). In addition, when the pen 2 does not receive an uplink signal US from the sensor controller 50, with which a pairing is established, for a predetermined time, the pen 2 also preferably cancels the pairing with the sensor controller 50.

As depicted in FIG. 6A, the uplink signal US1 further includes a resource allocation scheme and pairing setting information. Of these, the resource allocation scheme is setting information applied to the entire super-frame, and is indicated by a table number (information indicating the resource allocation scheme) depicted in FIG. 8 to be described later. On the other hand, the pairing setting information includes, for example, one bit of enable data indicating whether a pairing with a new pen 2 is possible, two bits of data indicating time slot identification information TDID to be assigned to the new pen 2, and three bits of data indicating frequency identification information FID to be assigned to the new pen 2. Here, the frequency identification information FID is identification information indicating assignment of communication resources, in terms of frequencies, to the individual pen 2. A pen 2 assigned certain frequency identification information FID transmits a downlink signal using the frequency indicated by the frequency identification information FID.

As depicted in FIG. 6B, the uplink signal US2 further includes a command. The command is data indicating an instruction for a specific pen 2 from the sensor controller 50, and includes a local pen ID (LPID) indicating a destination (intended recipient) of the command. Examples of the instruction indicated by the command include an instruction for transmission of data retained by the pen 2 such as a pen ID, an instruction for changing communication resources assigned by the pairing setting information (specifically, changing of the time slot identification information TDID and/or the frequency identification information FID), and the like.

As depicted in FIG. 6C, the uplink signal US3 further includes pairing confirmation data. The pairing confirmation data is formed of pairing bit data that is received from the pen 2. The pairing bit data is data unique to each pen 2 (or data that can be expected to be unique), and is, for example, a hash value of a pen ID retained by the pen 2 in advance. Details of a method of using the pairing bit data will be described later in detail with reference to FIG. 10.

FIG. 7 is a diagram depicting a configuration of a downlink signal DS. As depicted in the figure, the downlink signal DS includes a data signal (Data), a tone signal (Tone), and a tilt signal (Tilt).

The tone signal is an unmodulated signal of a predetermined frequency, and is transmitted continuously over one time slot from the pen tip electrode 2a (see FIG. 1) of the pen 2. The sensor controller 50 is configured to detect the position of the pen 2 on the basis of the tone signal. In a case where the sensor controller 50 detects the position of the pen 2 anew, the sensor controller 50 obtains a reception strength distribution of the tone signal within the panel surface 1a by receiving the tone signal at each of the linear electrodes constituting the row electrode group 31 and the column electrode group 32 depicted in FIG. 1. The sensor controller 50 detects the position of the pen 2 from a result of obtaining the reception strength distribution (global scan). In a case where the sensor controller 50 updates the position of the already detected pen 2, the sensor controller 50 obtains a reception strength distribution of the tone signal in a portion of the panel surface 1a by receiving the tone signal at each of a predetermined number of linear electrodes in order of increasing distance from the latest position, and detects the position of the pen 2 from a result of obtaining the reception strength distribution (local scan).

Here, a difference between the time usage method depicted in FIG. 4 and the time usage method depicted in FIG. 5 is a difference as to whether the downlink signals DS include or do not include tone signals. Depending on the type of the sensor controller 50 or the like, it may be possible to detect the position of the pen 2 by using the data signal in place of the tone signal. The time usage method depicted in FIG. 5 is adopted in such a case.

Returning to FIG. 7, the tilt signal is similar to the tone signal in that the tilt signal is an unmodulated signal of a predetermined frequency and in that the tilt signal is transmitted continuously over one time slot. However, the tilt signal is a signal different from the tone signal in that the tilt signal is transmitted from the pen tip electrode 2b (see FIG. 1) of the pen 2. The frequency of the tilt signal may be different from the frequency indicated by the frequency identification information FID. This enables the pen 2 to transmit the tone signal and the tilt signal within the same time slot. The sensor controller 50 first detects the position of the pen 2 by performing processing similar to that of the tone signal on the basis of the tilt signal. Then, the sensor controller 50 derives a difference (in direction and distance) from the position detected on the basis of the tone signal, and detects a tilt of the pen 2 from a result of deriving the difference.

The data signal is a signal modulated by data to be transmitted to the sensor controller 50 by the pen 2. The data to be transmitted by the data signal includes a pen pressure value indicating a pressure applied to the pen tip of the pen 2, on-off information of a switch provided on a side surface or a bottom surface of the pen 2, data requested to be transmitted by the command in the uplink signal US2, and the like.

As depicted in FIG. 7, the data signal used in the present embodiment includes a data signal modulated by DBPSK (Differential Binary Phase Shift Keying) and a data signal modulated by DQPSK (Differential Quadrature Phase Shift Keying). It is to be noted that DBPSK and DQPSK cited here are mere examples, and data signals modulated by other modulation systems may be used. However, in the following, only DBPSK and DQPSK will be used as examples for simplicity.

The data signal resulting from DBPSK includes one start symbol B and eight symbols D0 to D7, each representing data of one bit. On the other hand, the data signal resulting from DQPSK includes one start symbol B and four symbols D0 to D3 each representing data of two bits. As is understood from the above, an amount of data transmitted by one data signal is fixed as eight bits irrespective of the modulation system in the present embodiment. However, a larger or smaller amount of data may of course be transmitted by one data signal.

A symbol length SL depicted in FIG. 7 represents a time length of each symbol constituting the data signal. The symbol length SL is fixed in the same data signal, but can be different from that of the other data signal. As is understood from FIG. 7, letting n (=9 or 5) be the number of symbols included in one time slot, a relation $T_Y$=SL×n holds. Then, because the data that can be transmitted within one time slot is eight bits, a bit rate R of the data signal is expressed as R=8/$T_Y$=8/(SL×n). Hence, a change in the symbol length SL means a change in the bit rate R of the data signal.

FIG. 8 is a diagram depicting a resource allocation scheme table including a list of resource allocation schemes used in the present embodiment. In the table, each table number indicates one resource allocation scheme. The table is shared by both the pen 2 and the sensor controller 50 in advance. It is to be noted that, while the figure illustrates 17 types of resource allocation schemes corresponding to table numbers 0 to 16, the number of resource allocation schemes is of course not limited to 17.

As depicted in FIG. 8, a resource allocation scheme used in the present embodiment includes communication parameters indicative of: the number of TDIDs, a symbol length SL, a modulation system, transmission content, the number of slots, a slot length $T_Y$, and a frame length. It is to be noted that communication parameters other than the communication parameters cited here may of course be included in the resource allocation scheme. In addition, the communication parameters constituting the resource allocation scheme may include a communication parameter naturally determined from a combination of one or more other communication parameters.

The "number of TDIDs" is information indicating the number of time slot identification information TDIDs described above. In a case where multiplexing other than time division multiplexing (frequency multiplexing or the like) is not performed, the number of TDIDs is equal to the number of pens 2 that can be paired with the sensor controller 50. The "symbol length SL" and the "modulation system" are respectively the symbol length SL and the modulation system (DBPSK or DQPSK) of the data signal described with reference to FIG. 7. The "transmission content" is information indicating the content of a signal to be transmitted from each pen 2 in each time slot. More specifically, the transmission content is information indicating whether or not to make the pen 2 transmit the tone signal. A case of making the pen 2 transmit the tone signal is a case where a method of time usage within a frame is depicted in FIG. 4. A case of not making the pen 2 transmit tone signal is a case where a method of time usage within a frame is depicted in FIG. 5. In FIG. 8, "T+D" denotes the case of making the pen transmit the tone signal, and "D" denotes the case of not making the pen transmit the tone signal. The "number of slots" is the number of time slots arranged within a frame. The "slot length $T_Y$" is the time length $T_Y$ of each time slot described with reference to FIG. 4 and FIG. 5. The "frame length" is the time length of an entire frame.

In the following, processing performed by each of the sensor controller 50 and the pen 2 using each of the signals and the resource allocation scheme table described above will be described in detail with reference to state transition diagrams depicted in FIG. 9 and flowcharts depicted in FIGS. 10 to 13.

Figure 9A:
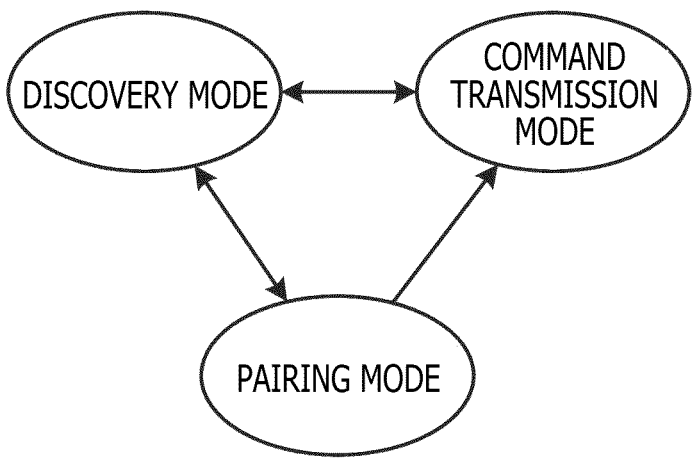
FIG. 9A is a state transition diagram depicting state transitions of a sensor controller 50.

First, FIG. 9A is a state transition diagram depicting state transitions of the sensor controller 50. As depicted in the figure, the sensor controller 50 is configured to be able to operate in one of a discovery mode, a command transmission mode, and a pairing mode.

Specifically describing each mode, first, the discovery mode is a mode in which a new resource allocation scheme is broadcast to each paired pen 2, and the presence of the sensor controller 50 is notified to an undetected pen 2. The uplink signal US transmitted by the sensor controller 50 in the discovery mode is the uplink signal US1 depicted in FIG. 6A. The command transmission mode is a mode in which a command is transmitted to a detected pen 2. The uplink signal US transmitted from the sensor controller 50 in the command transmission mode is the uplink signal US2 depicted in FIG. 6B. The pairing mode is a mode in which a pairing is established with a pen 2 responding to the uplink signal US1. The uplink signal US transmitted from the sensor controller 50 in the pairing mode is the uplink signal US3 depicted in FIG. 6C.

When power to the electronic apparatus 1 is turned on, the sensor controller 50 first makes an entry into the discovery mode, and repeats transmission of the uplink signal US1 and sensing of a downlink signal DS. When the sensor controller 50 then detects a downlink signal DS including pairing bit data, the sensor controller 50 makes an entry into the pairing mode, and establishes a pairing with a pen 2 that has transmitted the pairing bit data. Specifically, the sensor controller 50 performs transmission of the uplink signal US3 including the received pairing bit data, and performs sensing of a downlink signal DS. When the sensor controller 50 detects the downlink signal DS from the pen 2, the sensor controller 50 establishes a pairing with the pen 2. When the sensor controller 50 thereafter needs to transmit a command, the sensor controller 50 makes an entry into the command transmission mode, and performs transmission of the uplink signal US2 and sensing of a downlink signal DS. When the sensor controller 50 does not need to transmit a command, the sensor controller 50 makes an entry into the discovery mode, and performs transmission of the uplink signal US1 and sensing of a downlink signal DS.

Figure 9B:
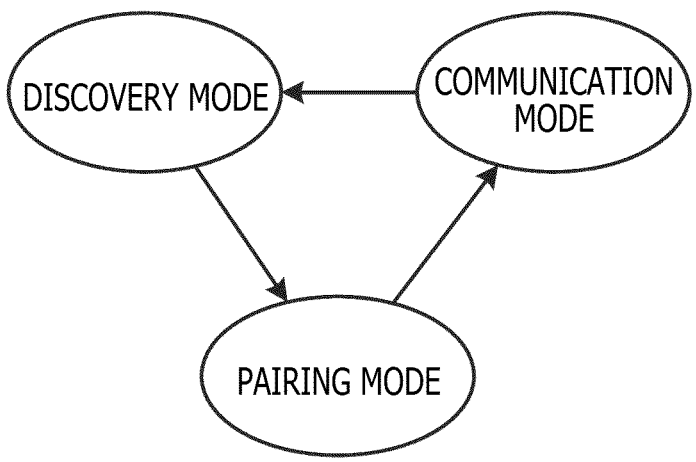
FIG. 9B is a state transition diagram depicting state transitions of a pen 2.

Next, FIG. 9B is a state transition diagram depicting state transitions of a pen 2. As depicted in the figure, the pen 2 is configured to be able to operate in one of a discovery mode, a communication mode, and a pairing mode.

Specifically describing each mode, first, the discovery mode is a mode in which communication with a specific sensor controller 50 is not started yet, and a search is made for a communicable sensor controller 50. The pen 2 in the discovery mode is configured to repeat sensing of an uplink signal US1. When the pen 2 receives the uplink signal US1 as a result of the sensing, the pen 2 determines whether or not a pairing is possible on the basis of the pairing setting information included in the uplink signal US1. When the pen 2 determines that a pairing is possible, the pen 2 transmits a downlink signal DS including the pairing bit data according to the resource allocation scheme included in the uplink signal US1.

The communication mode is a mode in which communication is performed with a detected sensor controller 50. The pen 2 in the communication mode performs sensing of an uplink signal US, and performs transmission of a downlink signal DS. When the pen 2 receives some uplink signal US as a result of the sensing, the pen 2 obtains a reference time for a frame (and for a plurality of time slots included in the frame) on the basis of a reception timing of the uplink signal US, and performs processing within the frame (transmission of a downlink signal DS or the like) on the basis of the obtained reference time. In a case where the received uplink signal US is the uplink signal US1, the pen 2 performs processing of setting the resource allocation scheme included in the uplink signal US1 in the memory of the pen 2. In a case where the received uplink signal US is the uplink signal US2, on the other hand, the pen 2 determines whether or not a command included in the uplink signal US2 is addressed to the pen 2. In a case where the command is addressed to the pen 2, the pen 2 performs processing corresponding to the command.

The pairing mode is a mode in which a pairing is established with the sensor controller 50 that has transmitted the uplink signal US1 detected in the discovery mode. The pen 2 in the pairing mode is configured to perform sensing of the uplink signal US3. When the pen 2 receives the uplink signal US3 as a result of the sensing, the pen 2 determines whether or not the pairing bit data included in the uplink signal US3 matches the pairing bit data that has been sent out by the pen 2. When the pairing bit data matches, the pen 2 establishes a pairing with the sensor controller 50. Thereafter, the pen 2 makes an entry into the communication mode, and transmits a downlink signal DS.

Figure 10:
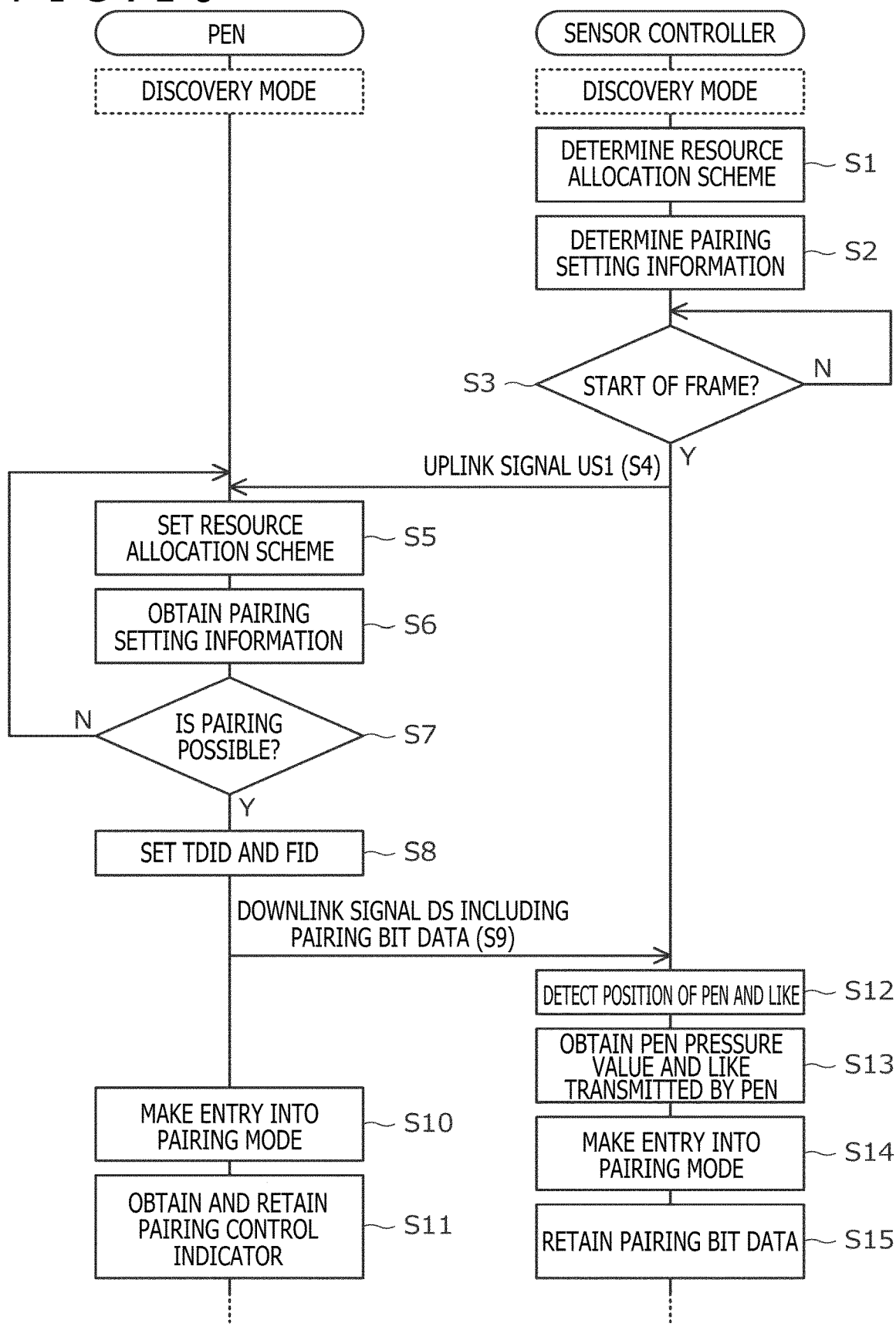
FIG. 10 is a flowchart depicting processing in a case where the sensor controller 50 and the pen 2 are both in a discovery mode.

FIG. 10 is a flowchart depicting processing in a case where the sensor controller 50 and the pen 2 are both in the discovery mode. As depicted in the figure, first, the sensor controller 50 determines a resource allocation scheme (step S1). More specifically, the sensor controller 50 determines the resource allocation scheme to be used next by selecting one resource allocation scheme from among the plurality of resource allocation schemes illustrated in FIG. 8, on the basis of the number of paired pens 2, a reception state (condition) of a downlink signal DS (signal-to-noise ratio), execution conditions of the touch detection processing, and the like.

As a further specific example of the determination in step S1, in a case where the number of paired pens has reached two, for example, the sensor controller 50 preferably selects a resource allocation scheme in which the number of TDIDs is three or four in order to allow for addition of a further pen 2. As another example, in a case where the signal-to-noise ratio of the downlink signal DS is decreasing, for example, the sensor controller 50 preferably selects a resource allocation scheme including a longer symbol length SL. This can decrease the above-described bit rate R of the data signal, and can therefore improve the reception state of the data signal. In this case, the sensor controller 50 more preferably selects a resource allocation scheme including a modulation system that makes the reception easier (that is, DBPSK rather than DQPSK). In addition, in a case where the position of the pen can be detected on the basis of only the data signal, a resource allocation scheme not including the tone signal can be selected. The sensor controller 50 in this case detects the position of the pen using the data signal in place of the tone signal.

Next, the sensor controller 50 determines pairing setting information (step S2). As described with reference to FIG. 6A, the pairing setting information includes enable data, time slot identification information TDID, and frequency identification information FID. In a case where the number of pens 2 acceptable in the resource allocation scheme determined in step S1 is larger than the number of currently paired pens 2, the sensor controller 50 sets the enable data to "1" (pairing is possible). The sensor controller 50 otherwise sets the enable data to "0" (pairing is impossible). In addition, in a case where the sensor controller 50 sets the enable data to "1," the sensor controller 50 determines time slot identification information TDID to be assigned to a new pen by selecting one time slot identification information TDID from among one or more time slot identification information TDIDs not yet assigned to other pens 2, and determines frequency identification information FID to be assigned to the new pen 2. As for the frequency identification information FID, the same value may be assigned to a plurality of pens 2.

When a start timing of a frame thereafter arrives (step S3), the sensor controller 50 transmits the uplink signal US1 depicted in FIG. 6A (step S4). The uplink signal US1 includes the table number indicating the resource allocation scheme determined in step S1 and the constituent elements of the pairing setting information determined in step S2.

When the pen 2 in the discovery mode receives the uplink signal US1 as a result of sensing, the pen 2 extracts the resource allocation scheme from the uplink signal US1, and sets the resource allocation scheme in the memory (not depicted) of the pen 2 (step S5). The pen 2 thereafter operates according to the resource allocation scheme set in the memory. In addition, the pen 2 extracts and obtains the pairing setting information from the received uplink signal US1 (step S6).

Here, in a case where a change of the resource allocation scheme is made as a result of the determination in step S1, not only the pen 2 but also the sensor controller 50 itself that determines the change of the resource allocation scheme needs to implement the change so as to operate according to the new resource allocation scheme. Specifically, a method of receiving a downlink signal DS needs to be changed to a receiving method conforming to the new resource allocation scheme. As a more specific example, in a case where the symbol length SL is changed, for example, a reception window for detecting a downlink signal DS (typically a window of a discrete Fourier transform or a fast Fourier transform) needs to be changed. This enables the sensor controller 50 to appropriately receive a downlink signal DS transmitted by the pen 2 according to the new resource allocation scheme.

The pen 2 after obtaining the pairing setting information determines whether or not the sensor controller 50 that has transmitted the uplink signal US1 is in a state in which a pairing is possible by referring to the enable data in the pairing setting information (step S7). When determining as a result that a pairing is impossible, the pen 2 returns to sensing of the uplink signal US1. When determining that a pairing is possible, on the other hand, the pen 2 extracts the time slot identification information TDID and the frequency identification information FID from the received pairing setting information, and sets the time slot identification information TDID and the frequency identification information FID in the memory (not depicted) of the pen 2 (step S8). Then, the pen 2 selects time slots corresponding to the time slot identification information TDID set in step S8, among a plurality of time slots indicated by the resource allocation scheme set in step S5, and transmits a downlink signal DS including the data signal including the above-described pairing bit data, by using various communication parameters included in the resource allocation scheme and using the frequency indicated by the frequency identification information FID set in step S8 (step S9). Thereafter, the pen 2 makes an entry into the pairing mode (step S10), and obtains pairing control indicators from the uplink signal US1 received in step S4 and retains the pairing control indicators in the memory (not depicted) (step S11).

Receiving the downlink signal DS transmitted in step S9, the sensor controller 50 detects the position and tilt of the pen 2 on the basis of the tone signal (or the data signal) and the tilt signal included in the downlink signal DS (step S12), and obtains various types of data such as a pen pressure value included in the data signal (step S13). Though not depicted, the sensor controller 50 is configured to sequentially supply the thus detected or obtained data to the control unit 40 (see FIG. 1). In addition, the sensor controller 50 makes an entry into the pairing mode (step S14), and performs processing of extracting the pairing bit data included in the data signal within the downlink signal DS and retains the pairing bit data in the memory (not depicted) (step S15).

Figure 11:
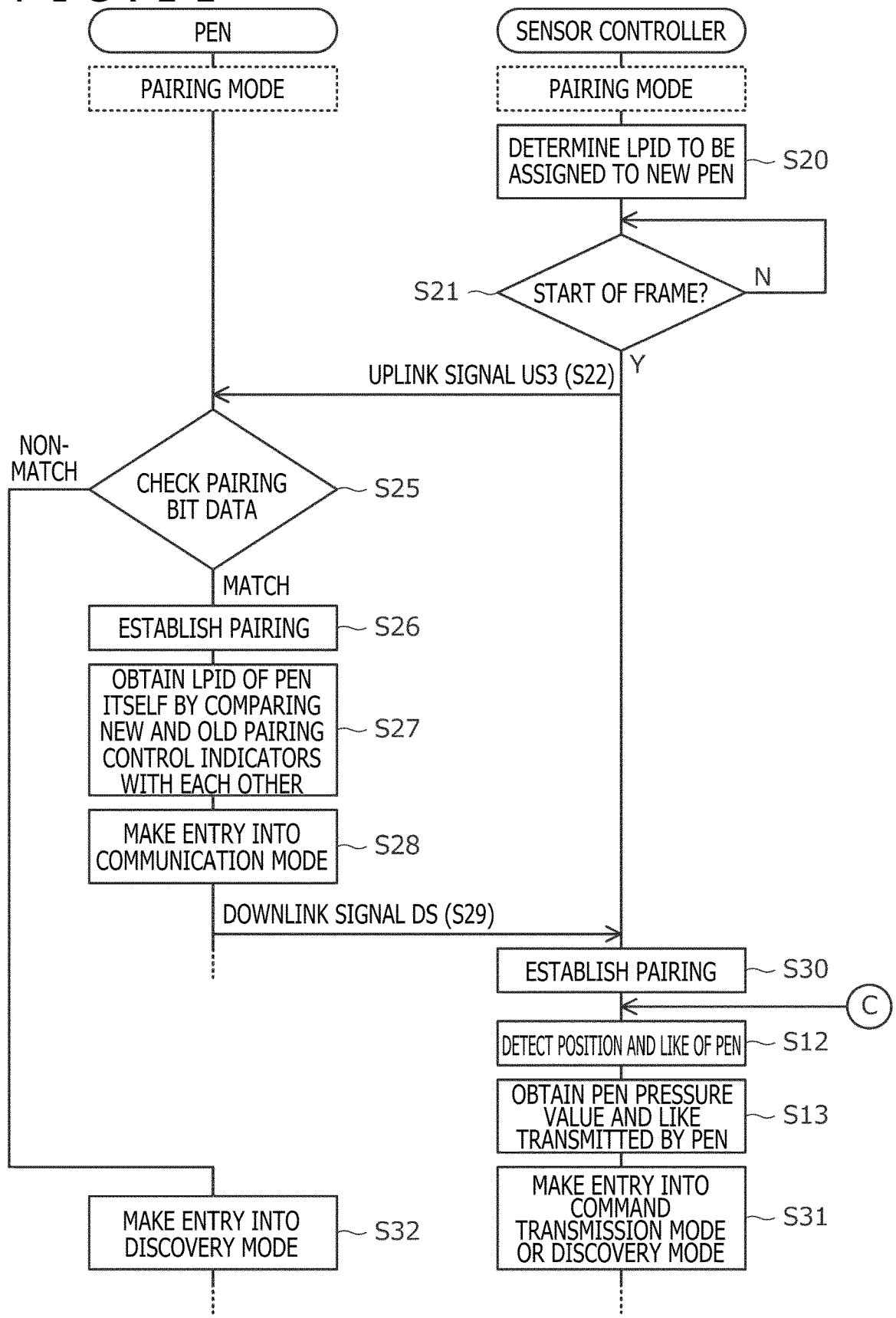
FIG. 11 is a flowchart depicting processing in a case where the sensor controller 50 and the pen 2 are both in a pairing mode.

FIG. 11 is a flowchart depicting processing in a case where the sensor controller 50 and the pen 2 are both in the pairing mode. As depicted in the figure, first, the sensor controller 50 determines a local pen ID to be assigned to the new pen 2 (step S20). The sensor controller 50 determines the local pen ID to be assigned to the new pen 2 by selecting one local pen ID from one or more local pen IDs not yet assigned to other pens 2 (that is, one or more local pen IDs corresponding to a pairing control indicator of "0" in the uplink signal US that is immediately previously transmitted).

When a start timing of a frame thereafter arrives (step S21), the sensor controller 50 transmits the uplink signal US3 depicted in FIG. 6C (step S22). In the uplink signal US3, the pairing control indicator of the local pen ID determined in step S20 is "1." The hash value of the pen ID included in the uplink signal US3 is derived in step S15 in FIG. 10.

When the pen 2 in the pairing mode receives the uplink signal US3 as a result of sensing, the pen 2 determines whether or not the pairing bit data included in the uplink signal US3 matches the pairing bit data transmitted in step S9 in FIG. 10 (step S25). When the pen 2 determines as a result that the pairing bit data does not match, the pen 2 assumes that a pairing has failed, returns to the discovery mode, and continues its processing (step S32). When the pen 2 determines that the pairing bit data matches, on the other hand, the pen 2 establishes a pairing with the sensor controller 50 (step S26), and thereafter obtains the local pen ID assigned to the pen 2 by comparing new and old pairing control indicators with each other (step S27). That is, the pairing control indicator of the local pen ID assigned to the pen 2 should be "0" in the previous uplink signal US, whereas the pairing control indicator is "1" in the uplink signal US3 received in step S22, as described above. The pen 2 can therefore obtain the local pen ID assigned to the pen 2 by comparing the pairing control indicators retained in step S11 in FIG. 10 (old pairing control indicators) with the pairing control indicators included in the uplink signal US3 received in step S22 (new pairing control indicators). While it is assumed here that the local pen ID is obtained by comparing the new and old pairing control indicators with each other, the local pen ID determined in step S20 may be specified as the local pen ID to be assigned to the new pen 2 within the uplink signal US3, and the pen 2 may obtain the local pen ID.

Thereafter, the pen 2 makes an entry into the communication mode (step S28), and transmits a downlink signal DS (step S29). Specifically, the pen 2 selects time slots corresponding to the time slot identification information TDID set in step S8 in FIG. 10 among a plurality of time slots indicated by the resource allocation scheme set in step S5 in FIG. 10, and transmits a downlink signal DS by using various communication parameters included in the resource allocation scheme and by using the frequency indicated by the frequency identification information FID set in step S8 in FIG. 10.

Receiving the downlink signal DS transmitted in step S29, the sensor controller 50 establishes a pairing with the pen 2 that has transmitted the downlink signal DS (step S30), and thereafter performs the processing of steps S12 and S13 described with reference to FIG. 10 on the basis of the received downlink signal DS. Then, the sensor controller 50 makes an entry into the command transmission mode when there is a command to be transmitted, or makes an entry into the discovery mode when there is no command to be transmitted (step S31). In order to perform a pairing with a pen 2 approaching the panel surface 1a without a delay, the sensor controller 50 preferably makes an entry into the discovery mode at least at a certain frequency irrespective of whether or not there is a command to be transmitted.

Figure 12:
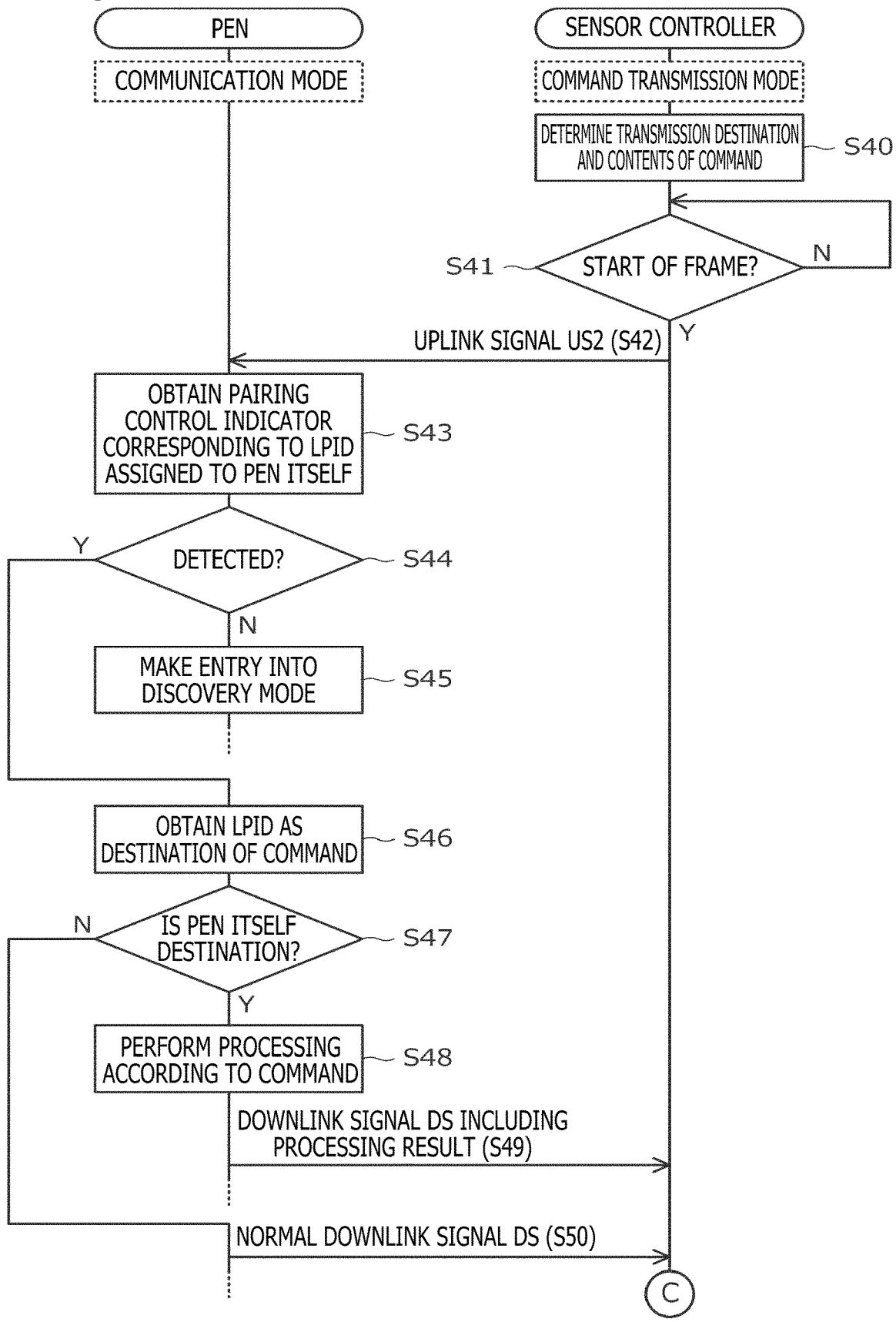
FIG. 12 is a flowchart depicting processing in a case where the sensor controller 50 is in a command transmission mode, and the pen 2 is in a communication mode.

FIG. 12 is a flowchart depicting processing in a case where the sensor controller 50 is in the command transmission mode and the pen 2 is in the communication mode. As depicted in the figure, first, the sensor controller 50 determines the pen 2 as a transmission destination of a command and determines the content of the command (step S40). When a start timing of a frame thereafter arrives (step S41), the sensor controller 50 transmits the uplink signal US2 depicted in FIG. 6B (step S42).

When the pen 2 in the communication mode receives the uplink signal US2 as a result of sensing, the pen 2 first obtains the pairing control indicator corresponding to the local pen ID assigned to the pen 2 (local pen ID obtained in step S27) from the uplink signal US2 (step S43). Then, the pen 2 determines whether or not the pen 2 is detected (continues being detected) by the sensor controller 50 on the basis of the obtained pairing control indicator (step S44). When determining as a result that the pen 2 is not detected (that is, when the obtained pairing control indicator is "0"), the pen 2 cancels the pairing, and makes an entry into the discovery mode (step S45).

When the pen 2 determines in step S44 that the pen 2 is detected (that is, when the obtained pairing control indicator is "1"), on the other hand, the pen 2 obtains a local pen ID as the destination of the command (step S46). Then, the pen 2 determines whether or not the destination of the command is the pen 2 itself by comparing the obtained local pen ID with the local pen ID assigned to the pen 2 (local pen ID obtained in step S27) (step S47). When determining that the destination of the command is not the pen 2, the pen 2 transmits a normal downlink signal DS (that is, a downlink signal DS not including a result of processing performed according to the content of the command included in the uplink signal US2) (step S50). When the pen 2 determines that the destination of the command is the pen 2, on the other hand, the pen 2 performs processing according to the content of the command included in the uplink signal US2 (step S48), and transmits a downlink signal DS including a processing result (step S49).

Receiving the downlink signal DS transmitted in step S49 or step S50, the sensor controller 50 performs the respective processing of steps S12, S13, and S31 depicted in FIG. 10. In a case where the downlink signal DS is the downlink signal DS transmitted in step S49, various types of data obtained in step S13 include data obtained by the pen 2 according to the command.

Figure 13:
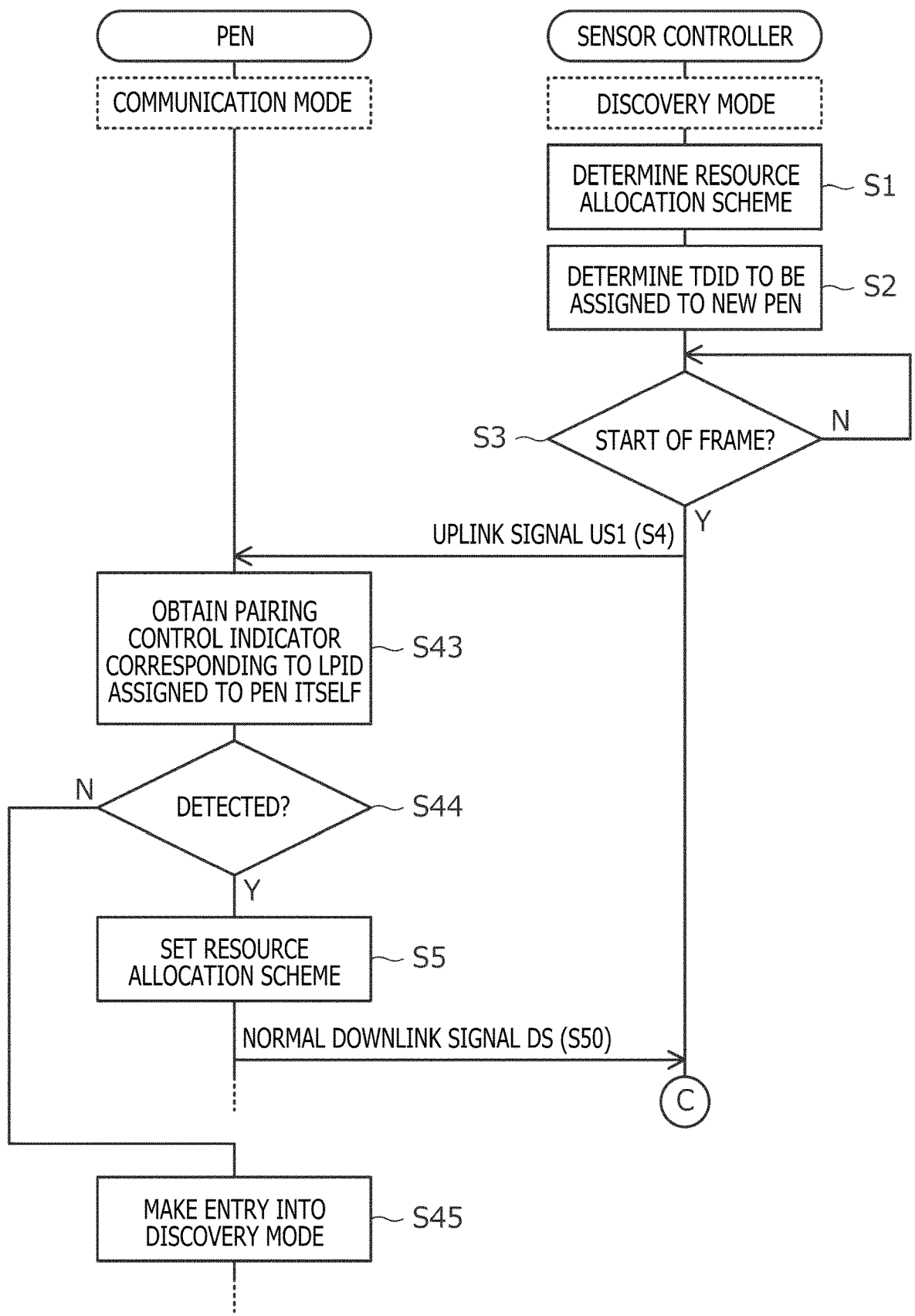
FIG. 13 is a flowchart depicting processing in a case where the sensor controller 50 is in the discovery mode, and the pen 2 is in the communication mode.
Figure 14A:
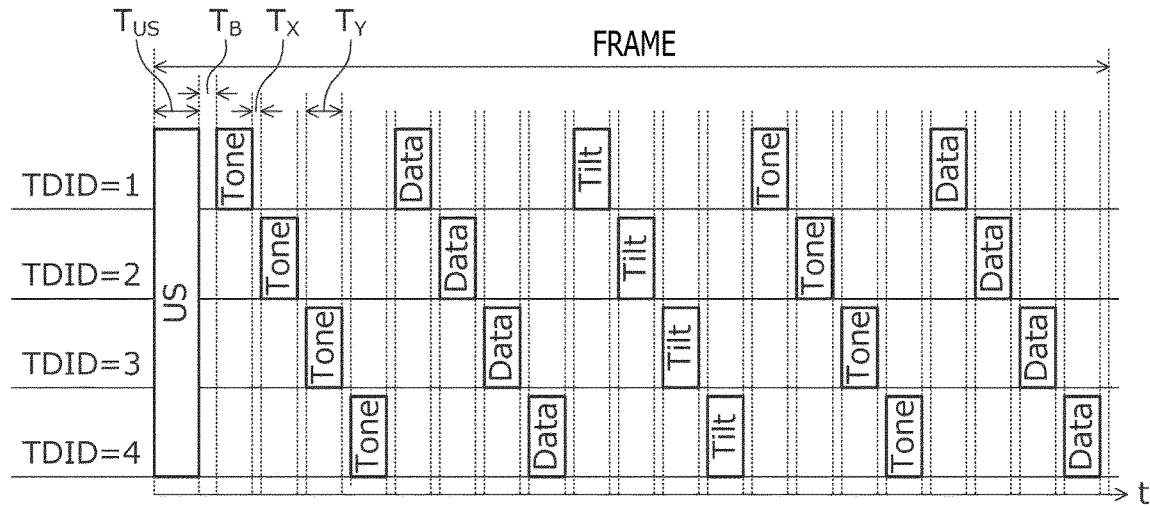
FIGS. 14A-14D are diagrams depicting time usage methods, respectively obtained by interchanging the positions of a second data signal and a second tone signal, for each time slot identification information TDID (interchange patterns), in the time usage methods depicted in FIGS. 4A-4D.
Figure 14B:
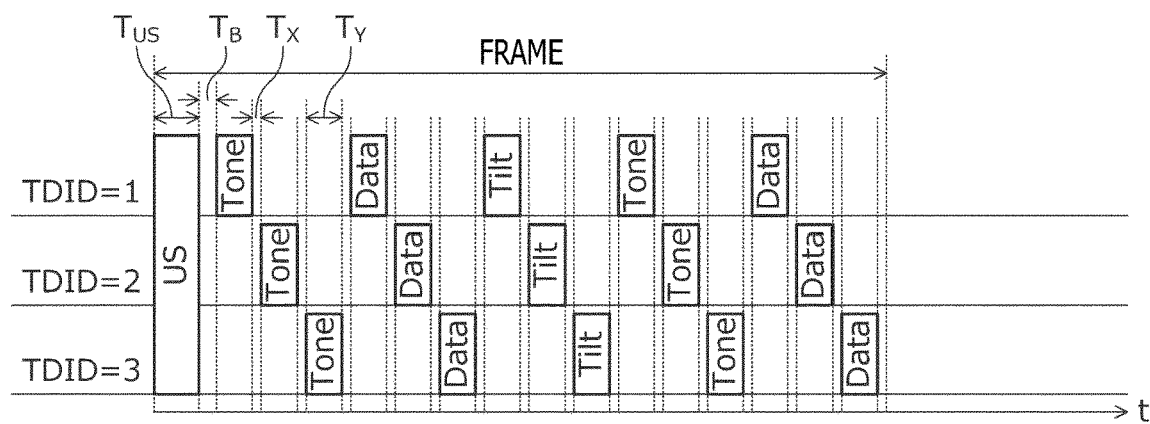
Figure 14C:
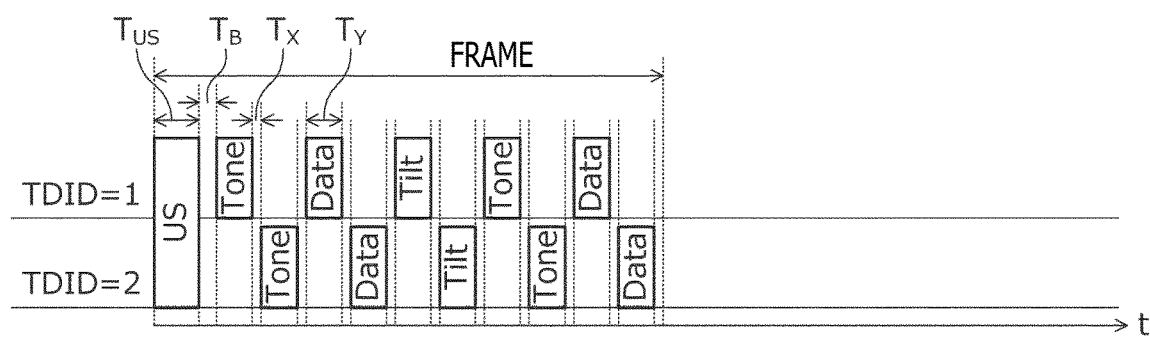
Figure 14D:
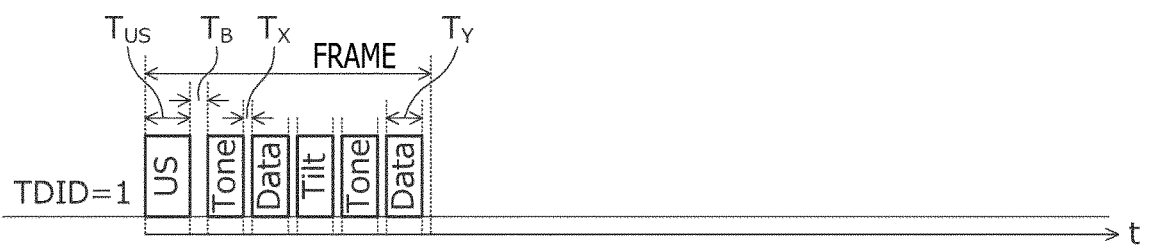

FIG. 13 is a flowchart depicting processing in a case where the sensor controller 50 is in the discovery mode and the pen 2 is in the communication mode. The sensor controller 50 in this case first performs the processing of steps S1 to S4 described with reference to FIG. 10, and thereby transmits the uplink signal US1. Receiving the uplink signal US1, the pen 2 performs the processing of steps S43 and S44 described with reference to FIG. 12, and thereby determines whether or not the pen 2 is detected (continues being detected) by the sensor controller 50. When determining as a result that the pen 2 is not detected (that is, when the obtained pairing control indicator is "0"), the pen 2 cancels the pairing, and makes an entry into the discovery mode (step S45). When determining that the pen 2 is detected (that is, when the obtained pairing control indicator is "1"), on the other hand, the pen 2 performs the processing of step S5 described with reference to FIG. 10, and transmits a normal downlink signal DS depicted also in FIG. 12 according to the new resource allocation scheme (step S50). The communication resources that are set in step S8 (specifically, the time slot identification information TDID and the frequency identification information FID) continue to be used also after a change of the resource allocation scheme, unless changed by the command within the uplink signal US2. Receiving the downlink signal DS transmitted in step S50, the sensor controller 50 performs the respective processing of steps S12, S13, and S31 depicted in FIG. 10.

As described above, according to the present embodiment, information indicating a new resource allocation scheme is transmitted by broadcast to all of paired pens 2 rather than by individual command transmissions. Thus, a change of the resource allocation scheme in the multi-pen supporting electronic apparatus can be realized more easily using less processing in a shorter time than in the prior art.

In addition, the symbol length SL of a downlink signal DS can be changed from the sensor controller 50 side. Hence, the bit rate of a data signal included in the downlink signal DS can be changed. It is therefore possible to optimize the bit rate and signal transmission intervals to maintain a good reception state for the downlink signal DS.

According to the present embodiment, in a case where the sensor controller 50 changes the resource allocation scheme to reduce the number of TDIDs because the number of paired pens 2 is decreased, there is a possibility that the pen 2 may be unable to transmit a downlink signal DS depending on the value of the time slot identification information TDID that has been assigned to the pen 2. For example, in a case where a change is made from a resource allocation scheme, in which the number of TDIDs is four, to a resource allocation scheme, in which the number of TDIDs is three, time slots corresponding to the time slot identification information TDID=4 disappear after the change, and therefore the pen 2 assigned the time slot identification information TDID=4 becomes unable to transmit a downlink signal DS. Accordingly, in a case where the sensor controller 50 changes the resource allocation scheme to reduce the number of TDIDs, and there is a pen 2 that becomes unable to transmit a downlink signal DS after the change, the sensor controller 50 preferably transmits a command in advance, via the uplink signal US2, to change the assignment of the time slot identification information TDID.

FIG. 14 illustrates it is possible to adopt time usage methods in which assignments are changed within the same time slots, such as the illustrated examples obtained by interchanging the positions of the second data signal and the second tone signal, for each time slot identification information TDID, in each time usage method depicted in FIG. 4 (interchange patterns). In this case, the resource allocation scheme broadcast by the uplink signal US1 preferably includes information indicating which of the usage method to use, whether the usage method shown in FIG. 4 or the changed usage method shown in FIG. 14.

The frequency identification information FID may be used to indicate the destination of the command transmitted by the uplink signal US2, in place of the above-described local pen ID. This enables an instruction to be given only to the pens 2 that are using a specific frequency. Examples of the instruction thus transmitted include an instruction to change the frequency of those pens 2 simultaneously, and the like.

The time slot identification information TDID assigned to each pen 2 by the pairing setting information within the uplink signal US1 may be used also as the local pen ID. In this case, the processing for determining the local pen ID (step S20 in FIG. 11) can be omitted. Similarly, the frequency identification information FID can also be used as the local pen ID.

An electronic apparatus 1 and a pen 2 according to a second embodiment of the present invention will next be described. The present embodiment is different from the first embodiment in that the pen detection processing and the touch detection processing are alternately performed a plurality of times within one super-frame. The present embodiment is otherwise similar to the first embodiment. Thus, in the following, the same configurations are identified by the same reference numerals, and the description will focus on the differences from the first embodiment.

FIG. 15 is a diagram depicting a temporal relation between the pen detection processing and the touch detection processing according to the present embodiment. As is understood from a comparison of the figure with FIG. 3, in the present embodiment, the pen detection processing and the touch detection processing are alternately performed a plurality of times within one super-frame. Hence, in the present embodiment, a plurality of frames are arranged at arbitrary intervals within one super-frame.

Each of FIG. 16A and FIG. 16B is a diagram depicting a configuration of an uplink signal US used in the present embodiment. The present embodiment uses not only uplink signals US1*a* and US4 identified in these figures but also the uplink signals US2 and US3 depicted in FIG. 6B and FIG. 6C.

The uplink signal US1*a* is a signal used in place of the uplink signal US1. A difference from the uplink signal US1 lies in that division information is included in the resource allocation scheme. The division information is information indicating the number of frames arranged within a super-frame. Specifically, the division information may be the number of frames itself, or in a case where the sensor controller 50 and the pen 2 share a plurality of numbers of divisions in a table format in advance, the division information may be information indicating a row number of the table. The pen 2 according to the present embodiment is configured to obtain the number of frames arranged within a super-frame in advance by obtaining the division information from the uplink signal US1*a* received, and to sense the same number of uplink signals US as the number of frames arranged within a super-frame.

The uplink signal US4 is a signal formed by arranging, in the rear of a header and pairing control indicators similar to those of the uplink signal US2, a predetermined succeeding uplink signal identifying data (to be described later). In the present example, the content of the header is the same as that in the uplink signal US2, and therefore the pen 2 deems the succeeding uplink signal identifying data as one type of command. However, a header dedicated to the uplink signal US4 may be prepared, and the uplink signal US4 may be identified based on the header. Specific example content of the succeeding uplink signal identifying data includes a predetermined number of bits of data for distinguishing the uplink signal US4 from the uplink signal US2 (that is, a combination of bit values not appearing as a command). In a case where the pen 2 obtains the succeeding uplink signal identifying data from the uplink signal US2 received, the pen 2 determines that the uplink signal US is the uplink signal US4.

The sensor controller 50 is configured to transmit, rather than the uplink signals US1*a*, US2, and US3 (start uplink signals), the uplink signal US4 (succeeding uplink signal) in a succeeding frame which is a frame other than a start frame positioned at a start of a super-frame. A main role of the uplink signal US4 is to notify each paired pen 2 of a reference time for a plurality of time slots arranged within the corresponding succeeding frame. The pen 2 that receives the uplink signal US4 is configured to obtain the temporal position of each time slot within the corresponding succeeding frame on the basis of a reception timing of the uplink signal US4.

The sensor controller 50 according to the present embodiment is configured to perform processing of suitably adjusting timing of transmission of the uplink signal US4 at a time of the transmission of the uplink signal US4. Specifically, at each time of the transmission of the uplink signal US4, the transmission timing is moved forward or rearward by a time difference, for each succeeding frame, from the transmission timing determined from the temporal position of the super-frame. Preferably, the transmission timing may be moved forward or rearward by a random time including zero. This suitably changes the temporal position of each succeeding frame within the super-frame, and therefore makes it possible to flexibly change the time length of the touch detection processing that is arranged alternately with each frame. In addition, it is possible to suppress occurrence of a stripe-form display noise or audio noise in an in-cell type display device 10.

As described above, according to the present embodiment, the sensor controller 50 transmits the uplink signal US4 at a start of each succeeding frame, and suitably adjusts timing of transmission of the uplink signal US4. The temporal position of each succeeding frame can therefore be changed within the super-frame. Hence, it is possible to suppress occurrence of a stripe-form display noise or audio noise in the display device 10, and flexibly change the time length of the touch detection processing that is arranged alternately with each frame.

While the present embodiment notifies the pen 2 of the number of frames arranged within a super-frame by including the number of divisions in the resource allocation scheme in the uplink signal US1*a*, the presence or absence of a succeeding frame may be notified to the pen 2 by arranging one bit of information indicating whether or not there is a succeeding frame within each uplink signal US. In addition, data indicating a frame number may be arranged within each uplink signal US.

An electronic apparatus 1 and a pen 2 according to a third embodiment of the present invention will next be described. The present embodiment is different from the second embodiment in that the electronic apparatus 1 is a position detecting device that is generally called an "in-cell type." The present embodiment is otherwise similar to the second embodiment. Thus, in the following, the same configurations are identified by the same reference numerals, and description will focus on the differences from the second embodiment.

Figure 17:
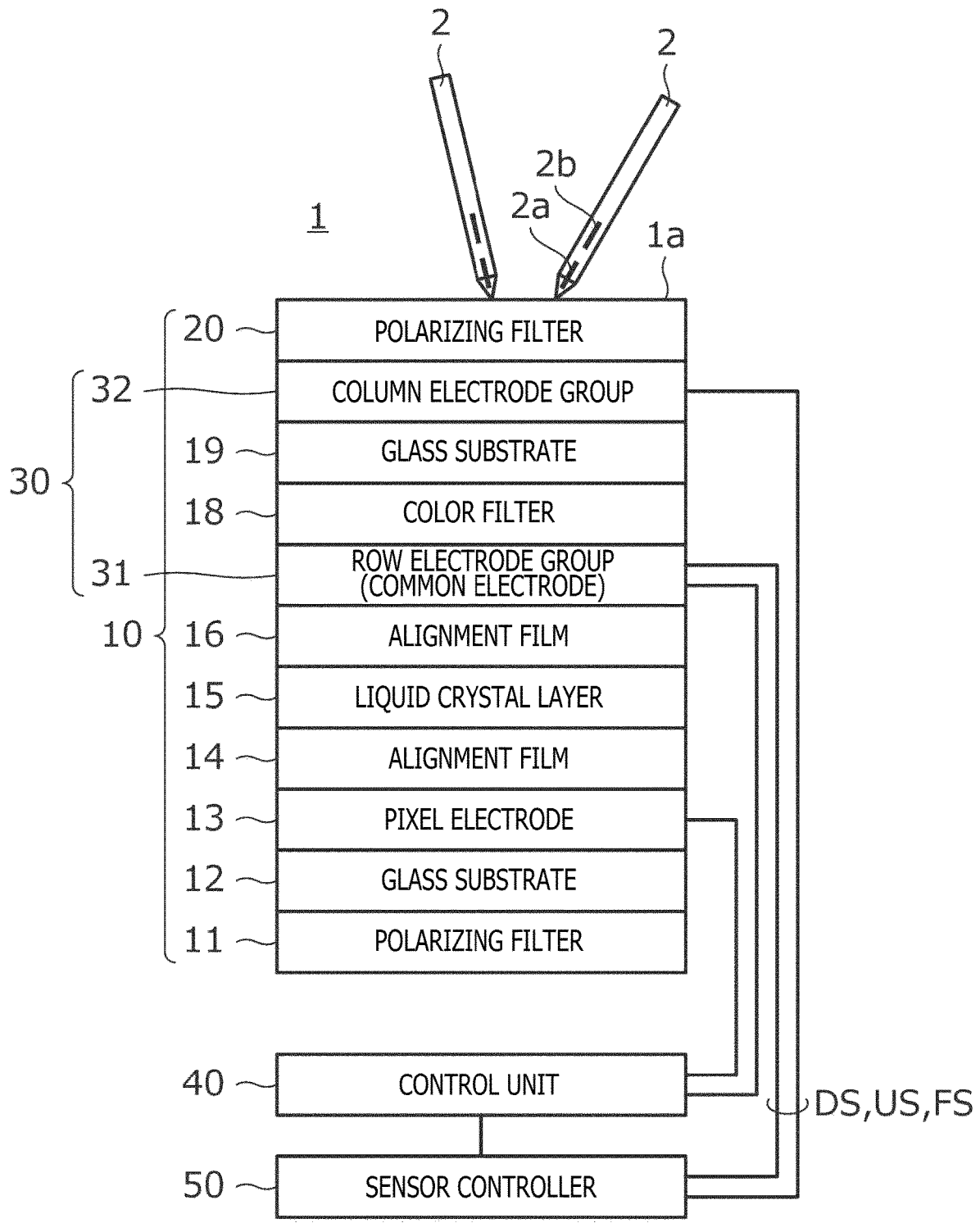
FIG. 17 is a diagram depicting a system including an electronic apparatus 1 and a pen 2 according to a third embodiment of the present invention.

FIG. 17 is a diagram depicting a system including the electronic apparatus 1 and the pen 2 according to the present embodiment. As depicted in the figure, the sensor panel 30 according to the present embodiment is provided within the display device 10. Specifically, the row electrode group 31 is disposed at a position at which the common electrode 17 is disposed in FIG. 1, and the column electrode group 32 is disposed between the glass substrate 19 and the polarizing filter 20. A configuration of each of the row electrode group 31 and the column electrode group 32 is the same as that described with reference to FIG. 2.

In the present embodiment, the row electrode group 31 plays the role of the common electrode 17. Hence, when the display device 10 performs pixel driving operation, the control unit 40 fixes the potential of the row electrode group 31 at a ground potential. The sensor controller 50 cannot perform communication with the pen 2 while the potential of the row electrode group 31 is thus fixed at the ground potential.

Here, in the pixel driving operation of the display device 10, the writing of each pixel in a row is performed simultaneously within a fixed time period for each row, while descending row by row from a topmost row in a screen. Then, a blank period, in which pixel driving is not performed for a certain time, occurs in a period from an end of driving in a certain row to a start of driving in the next row. Because the pixel driving is not performed, the potential of the row electrode group 31 does not need to be fixed at the ground potential in the blank period. Accordingly, the sensor controller 50 according to the present embodiment is configured to perform communication with the pen 2 using the blank period.

Figure 18:
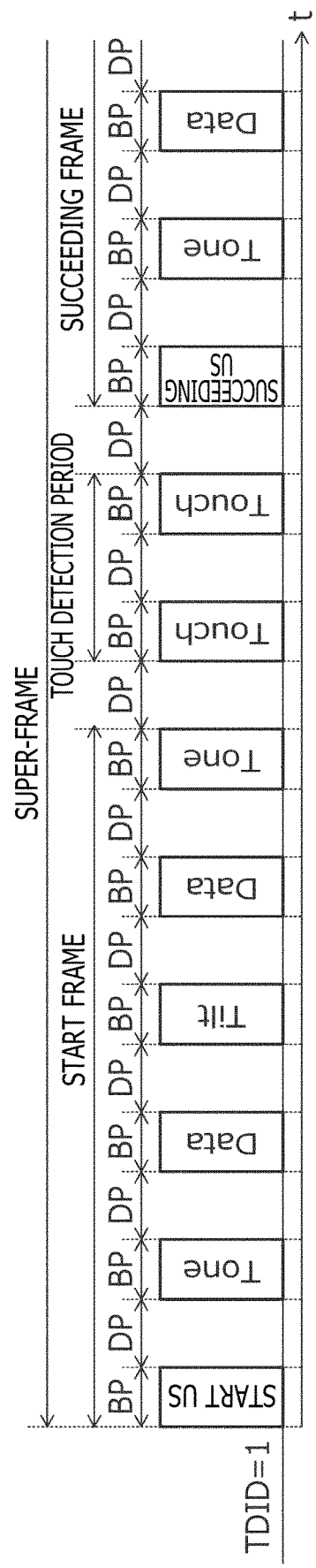
FIG. 18 is a diagram depicting an example of a method of time usage within a super-frame in the third embodiment of the present invention.

Each of FIG. 18, FIG. 19A, and FIG. 19B is a diagram depicting a sample method of time usage within a super-frame in the present embodiment. As depicted in these figures, pluralities of blank periods BP and pixel driving periods DP alternately occur within one super-frame. Using the plurality of blank periods BP, the sensor controller 50 according to the present embodiment performs transmission of an uplink signal US, reception of a downlink signal DS (including a data signal and a tilt signal and further including a tone signal as required), and the touch detection processing (Touch).

In the present embodiment, the determination of the resource allocation scheme, which is made in step S1 depicted in FIG. 10 and FIG. 13, is performed also on the basis of the time length of the blank periods BP and the time length of time slots. Specifically, in a case where a plurality of time slots can be arranged in one blank period BP, a resource allocation scheme is preferably used which is configured such that a plurality of time slots are arranged in one blank period BP. In addition, in a case where only one time slot can be arranged in one blank period BP, a resource allocation scheme is preferably used which is configured such that one time slot is disposed in one blank period BP. In this resource allocation scheme, supposing that the number of TDIDs is 2, for example, time slots belonging to respective time slot identification information TDIDs are preferably alternately assigned to the series of blank periods BP.

Specifically referring to FIG. 18, FIG. 19A, and FIG. 19B, first, FIG. 18 depicts a case where the number of TDIDs is 1, and the time length of blank periods BP is substantially equal to the time length of time slots. In this case, as depicted in the figure, the sensor controller 50 preferably determines a resource allocation scheme such that one time slot is arranged in one blank period BP. FIG. 19A depicts a case where the number of TDIDs is 2 and the time length of blank periods BP is substantially equal to twice the time length of time slots. In this case, as depicted in the figure, the sensor controller 50 preferably determines a resource allocation scheme such that two time slots are arranged in one blank period BP. As a result, as depicted in the figure, two pens 2 consecutively transmit downlink signals DS in one blank period BP. FIG. 19B depicts a case where the number of TDIDs is 2 and the time length of blank periods BP is substantially equal to the time length of time slots. In this case, as depicted in the figure, the sensor controller 50 preferably determines a resource allocation scheme such that time slots belonging to respective time slot identification information TDIDs are alternately assigned to the series of blank periods BP.

As described above, according to the present embodiment, a resource allocation scheme is determined on the basis of the time length of blank periods BP and the time length of time slots, and therefore communication between the sensor controller 50 and the pen 2 can be performed by effectively utilizing the blank periods BP.

It is to be noted that, while the present embodiment has been described using the sensor panel 30 as an example, which is formed of the row electrode group 31 and the column electrode group 32 (what is generally called a mutual capacitance type sensor panel), the present invention is applicable in an example, in which the common electrode 17 is replaced with a plurality of block-shaped electrodes (quadrangular electrodes) laid in a matrix form in the electronic apparatus 1 depicted in FIG. 1, and the plurality of block-shaped electrodes constitute the sensor panel 30 (what is generally called a self-capacitance type sensor panel).

While an example has been described, in which a plurality of time slots are arranged within one blank period in the present embodiment, one frame may be arranged in one blank period in a case where the time length of blank periods is sufficiently long.

Figure 20:
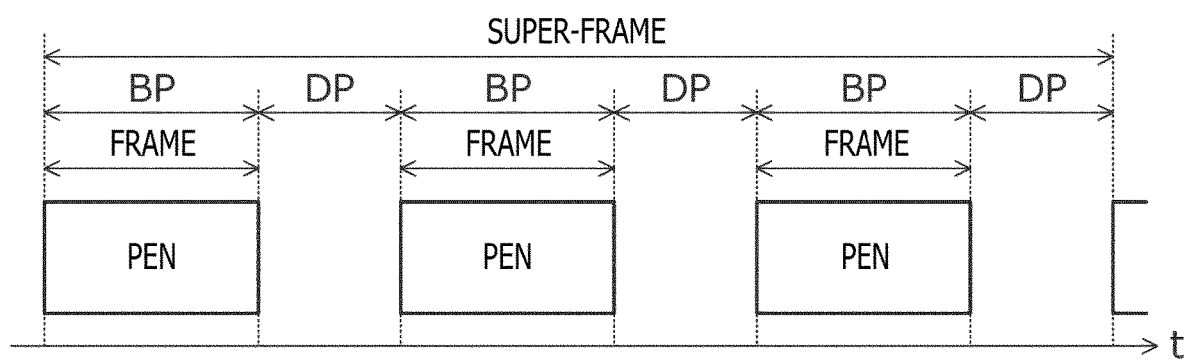
FIG. 20 is a diagram depicting a temporal relation between frames and pixel driving periods DP in a case where one frame is disposed in one blank period, in the electronic apparatus 1 which is a position detecting device of an "in-cell type."

FIG. 20 is a diagram depicting a temporal relation between frames and pixel driving periods DP in a case where one frame is disposed in one blank period in the electronic apparatus 1 used as a position detecting device of the "in-cell type." The relation depicted in the figure is none other than a relation obtained by replacing the touch detection processing in FIG. 15 with the pixel driving periods DP. Hence, as in the second embodiment, communication between the sensor controller 50 and the pen 2 can be performed using a start uplink signal and succeeding uplink signals.

An electronic apparatus 1 and a pen 2 according to a fourth embodiment of the present invention will next be described. The present embodiment is different from the first embodiment in terms of a specific method of using time slots that constitute a frame. The present embodiment is otherwise similar to the first embodiment. Thus, in the following, the same configurations are identified by the same reference numerals, and description will focus on the differences from the first embodiment.

FIG. 21 is a diagram depicting a resource allocation scheme table including a list of resource allocation schemes used in the present embodiment. As in the table of FIG. 8, also in the table of FIG. 21, each table number represents one resource allocation scheme. The table is similar to the table of FIG. 8 also in that the table is shared in advance by both the pen 2 and the sensor controller 50. It is to be noted that, while the figure illustrates two types of resource allocation schemes corresponding to table numbers n and n+1, the number of resource allocation schemes is not limited to two, of course.

As depicted in FIG. 21, a resource allocation scheme used in the present embodiment includes communication parameters indicative of: the number of primary lanes, the number of slots, slot assignment, Ack assignment, the number of data slot bits, a modulation system, a symbol length SL, and time lengths $T_B$ and $T_X$. It is to be noted that communication parameters other than the communication parameters cited here may of course be included in the resource allocation scheme. In addition, the communication parameters constituting the resource allocation scheme may include a communication parameter naturally determined from a combination of one or more other communication parameters.

Of the communication parameters included in FIG. 21, the "number of slots," the "modulation system," the "symbol length SL," the "time length $T_B$," and the "time length $T_x$" are as described in the first embodiment. The "number of data slot bits" is an amount of data transmitted by the above-described data signal.

The "number of primary lanes" is a number indicating one half of the number of pens 2 that can be used simultaneously. As will be described later in detail, in the present embodiment, one secondary lane is provided so as to correspond to one primary lane, and communication with one pen 2 is performed in each of the lanes. Hence, in a case where the number of primary lanes is one, the number of pens 2 that can be used simultaneously is two. In addition, in a case where the number of primary lanes is two, the number of secondary lanes is also two, and therefore the number of pens 2 that can be used simultaneously is four.

The "slot assignment" is information indicating respective types of time slots corresponding to the "number of slots" included in one frame (slot assignment information). Character strings such as "P(P)," "D(P)," and "T(P)" delimited by "," represent types (slot types) of the corresponding time slots.

FIG. 22 is a diagram depicting specific details of slot types. First, a "single lane mode" and a "dual lane mode"

depicted in the figure are operation modes of the sensor controller 50 according to the present embodiment. The sensor controller 50 is configured to be able to operate in one of the single lane mode and the dual lane mode in parallel with the three operation modes (the discovery mode, the command transmission mode, and the pairing mode) depicted in FIG. 9A.

The single lane mode is an operation mode in which communication with the pen 2 is performed by using only a primary lane. Hence, when the sensor controller 50 has entered the single lane mode, the number of pens 2 that can be used simultaneously is equal to the number of primary lanes. As in the first embodiment and the like, the sensor controller 50 operating in the single lane mode performs communication with each pen 2 using one frame as a basic unit (hereinafter referred to as a "pen data configuration frame").

The pen data configuration frame will be described in the following. The pen data configuration frame is a basic unit of communication performed between the sensor controller 50 and the pen 2. The number of signals that need to be able to be transmitted from the pen 2 in one pen data configuration frame is defined by a technical standard, and at least four tone signals, four data signals, and one tilt signal need to be able to be transmitted. However, the sensor controller 50 that can detect a position by a data signal does not need to receive transmission of the tone signals, and it is sufficient for the pen 2 to be able to transmit at least four data signals and one tilt signal. The sensor controller 50 according to the present embodiment is configured to perform communication with one or more pens 2, respectively, in units of the pen data configuration frame.

The dual lane mode is an operation mode in which communication with the pen 2 is performed using both a primary lane and a secondary lane. Hence, when the sensor controller 50 has entered the dual lane mode, the number of pens 2 that can be used simultaneously is twice the number of primary lanes. The sensor controller 50 operating in the dual lane mode performs communication with each pen 2 using two or more consecutive frames as forming a pen data configuration frame. Details of this will be described later.

A type P(B) is a time slot used for transmission of the above-described tone signal in any of a primary lane in a single lane mode and a primary lane and a secondary lane in the dual lane mode. A type P(P) is a time slot, which is used for transmission of a tone signal in the primary lane in the single lane mode and in the primary lane in the dual lane mode, but is mute in the secondary lane in the dual lane mode. Being mute means that the sensor controller 50 does not perform reception of the downlink signal DS.

A type D(P) is a time slot, which is used for transmission of the above-described data signal in the primary lane in the single lane mode and in the primary lane in the dual lane mode, but is mute in the secondary lane in the dual lane mode. A type T(P) is a time slot, which is used for transmission of the above-described tilt signal in the primary lane in the single lane mode and in the primary lane in the dual lane mode, but is mute in the secondary lane in the dual lane mode.

A type P(S) is a time slot, which is used for transmission of the tone signal in the primary lane in the single lane mode and in the secondary lane in the dual lane mode, but is mute in the primary lane in the dual lane mode. A type D(S) is a time slot, which is used for transmission of the data signal in the primary lane in the single lane mode and in the secondary lane in the dual lane mode, but is mute in the primary lane in the dual lane mode. A type T(S) is a time slot, which is used for transmission of the tilt signal in the primary lane in the single lane mode and in the secondary lane in the dual lane mode, but is mute in the primary lane in the dual lane mode.

A type M(P) is a time slot, which is mute in the primary lane in the single lane mode and in the primary lane in the dual lane mode, but is used for transmission of the tilt signal in the secondary lane in the dual lane mode. A type M(B) is a time slot that is mute in any of the primary lane in the single lane mode and the primary lane and the secondary lane in the dual lane mode.

Here, the sensor controller 50 is configured to first start communication with one pen 2 in the single lane mode, and then to make a transition to the dual lane mode when starting communication with a second pen 2. Communication with the first pen 2 is performed using the primary lane in both the single lane mode and the dual lane mode, and communication with the second pen 2 is performed using the secondary lane.

As is understood from FIG. 22, time slots of the types P(B), P(P), D(P), and T(P) are assigned to the primary lane in both the single lane mode and the dual lane mode, and therefore continue to be used to receive a downlink signal from the first pen 2 even when the mode of the sensor controller 50 is changed. In the following, the time slots of these types P(B), P(P), D(P), and T(P) may be referred to as a "primary slot."

On the other hand, time slots of the types P(S), D(S), and T(S) are assigned to the primary lane in the single lane mode, but are assigned to the secondary lane in the dual lane mode. Hence, the time slots are used to receive a downlink signal from the first pen 2 in the single lane mode, whereas the time slots are used to receive a downlink signal from the second pen 2 in the dual lane mode. In the following, the time slots of these types P(S), D(S), and T(S) may be referred to as a "secondary slot."

A time slot of the type M(P) is used for transmission of the tilt signal in the secondary lane in the dual lane mode, whereas the time slot is used also to receive a downlink signal DS from a pen 2 not yet paired in a case where the sensor controller 50 has entered the single lane mode, as will be described later in detail. Accordingly, in the following, a time slot of the type M(P) may be referred to as a "shared slot." In addition, the downlink signal DS transmitted from the pen 2 not yet paired is a response signal responding to the uplink signal US1, and therefore the downlink signal DS may be referred to as an "Ack signal" in the following.

A time slot of the type M(B) is also used to receive an Ack signal from a pen 2 not yet paired in a case where the sensor controller 50 has entered the single lane mode, as will be described later in detail. Accordingly, in the following, a time slot of the type M(B) may be referred to as an "Ack slot."

Figure 23A:
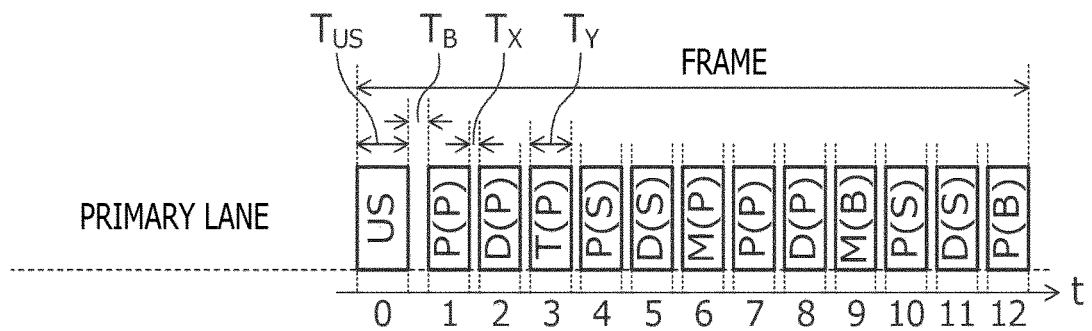
FIG. 23A is a diagram depicting an example method of time usage within a frame which corresponds to a table number n depicted in FIG. 21.

FIG. 23A is a diagram depicting an example method of time usage within a frame, which corresponds to the table number n depicted in FIG. 21. As depicted in the figure, an uplink signal US is transmitted from the sensor controller 50 at a start of a frame, and the following 12 time slots are given respective types in the order depicted in the "slot assignment" field in FIG. 21.

Figure 23B:
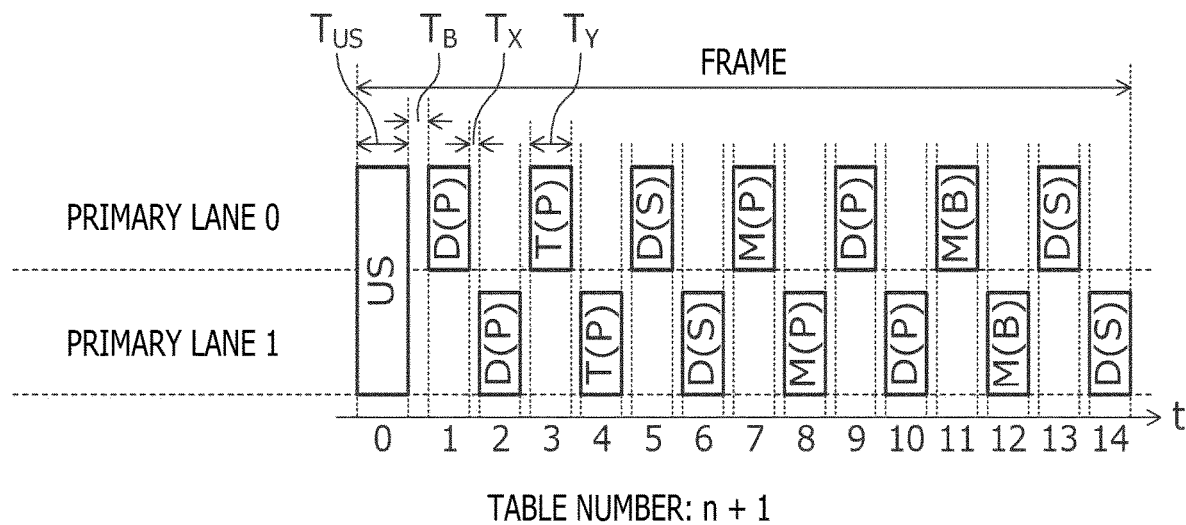
FIG. 23B is a diagram depicting an example method of time usage within a frame which corresponds to a table number n+1 depicted in FIG. 21.

FIG. 23B is a diagram depicting an example method of time usage within a frame, which corresponds to the table number n+1 depicted in FIG. 21. Also in the example of this figure, an uplink signal US is transmitted from the sensor controller 50 at a start of a frame. The following 14 time slots are alternately allocated to two primary lanes 0 and 1.

Then, in each primary lane, types are given to the respective time slots in the order depicted in the "slot assignment" field in FIG. 21.

Here, as is understood from FIG. 23B, in the resource allocation scheme corresponding to the table number n+1, downlink signals DS from the pens 2 do not include tone signals as in the example depicted in FIG. 5. Hence, only a sensor controller 50 that is configured to be able to detect the position of a pen 2 even without a tone signal can use the resource allocation scheme corresponding to the table number n+1. A sensor controller 50 of the type is configured to detect the position of the pen 2 by using a data signal in place of a tone signal.

The description returns to FIG. 21. The "Ack assignment" is information indicating time slots used to receive an Ack signal from a pen 2 not yet paired in a case where the sensor controller 50 has entered the single lane mode (that is, in a case where the sensor controller 50 is performing communication with the first pen 2). In the example of FIG. 21, in the case of the table number n, the 6th, 9th, and 12th time slots are used to receive an Ack signal from a pen 2 not yet paired, and in the case of the table number n+1, the 7th, 8th, 11th, and 12th time slots are used to receive an Ack signal from a pen 2 not yet paired.

Each of FIGS. 24A to 24E is a diagram depicting a configuration of an uplink signal US used in the present embodiment. As depicted in these figures, the above-described uplink signals US1 to US3 are used also in the present embodiment, but the respective content of the uplink signals US1 to US3 are different from those described in the first embodiment. An uplink signal US2a depicted in FIG. 24D is one type of uplink signal US2. An uplink signal US2a' depicted in FIG. 24E is an abbreviated version of the uplink signal US2a (which abbreviated version may hereinafter be referred to as a "short uplink signal").

"Protocol identifying information" and "USTYPE" depicted in FIGS. 24A to 24D correspond to specific content of the header depicted in FIGS. 6A to 6C. Specifically, the "protocol identifying information" is four bits of information indicating that the uplink signal US is in accordance with the present embodiment. "USTYPE" is two bits of information indicating the type of the uplink signal US (uplink type information). "USTYPE" is used to identify the uplink signals US1 to US3.

"ST" depicted in FIG. 24A is one bit of information indicating whether a pen state indicated by a "pen state indicator" is either a pairing state or a contact state (state type information).

When "ST" has a value corresponding to the pairing state, the "pen state indicator" is five bits of information indicating the pairing state (being paired or not yet paired) of each of the number of pens 2 that can be paired. In a specific example, the number of pens 2 whose pairing states can be indicated by the "pen state indicator" is eight. In this case, when a first bit is "0," the four remaining bits indicate the pairing states of the first to fourth pens 2, and, when the first bit is "1," the remaining four bits indicate the pairing states of the fifth to eighth pens 2.

When "ST" has a value corresponding to the contact state, on the other hand, the "pen state indicator" is five bits of information indicating the contact state of each of the number of pens 2 that can be paired (whether or not the pen 2 is in contact with the panel surface 1a depicted in FIG. 1). In a specific example, the number of pens 2 whose contact states can be indicated by the "pen state indicator" is eight. In this case, when the first bit is "0," the remaining four bits indicate the contact states of the first to fourth pens 2, and, when the first bit is "1," the remaining four bits indicate the contact states of the fifth to eighth pens 2.

"PE" is one bit of information indicating whether the sensor controller 50 can be paired with a new pen 2 (pairing enable information). "Pairing setting information" includes frequency identification information FID as three bits of data indicating a frequency to be assigned to the new pen 2, and lane identification information LID as two bits of data indicating a lane to be assigned to the new pen 2. In the present embodiment, the lane identification information LID is information that distinguishingly identifies the two primary lanes and their corresponding secondary lanes.

As depicted in FIGS. 24B to 24D, the uplink signals US2 and US3 include one of the "pairing setting information" and the "pen state indicator" according to the value of "PE." Specifically, in a case where the sensor controller 50 can be paired with the new pen 2, the uplink signals US2 and US3 include the "pairing setting information," and in a case where the sensor controller 50 cannot be paired with the new pen 2, the uplink signals US2 and US3 include the "pen state indicator."

A "table number" is information indicating the resource allocation scheme adopted by the sensor controller 50. The "table number" includes the value of one of n and n+1 depicted in FIG. 21. By including the "table number," the uplink signal US1 notifies the slot assignment information indicating the type of each slot within a frame from the sensor controller 50 to the pen 2. "RM" is information indicating whether the sensor controller 50 is operating in either the single lane mode or the dual lane mode (operation mode information).

A "command" depicted in FIG. 24B is information indicating an instruction or a notification from the sensor controller 50 to each pen 2. The "command" includes a "command type" and "command content." Examples of the "command type" include a frequency setting instruction, a frequency changing instruction, a lane setting instruction, a lane changing instruction, a pairing canceling instruction, a notification that a frame in question is a sub-frame to be described later, and the like.

In a case where the "command type" is a frequency setting instruction, the "command content" includes a local pen ID assigned to a target pen 2 and frequency identification information FID indicating a frequency to be set. In a case where the "command type" is a frequency changing instruction, the "command content" includes frequency identification information FID indicating a frequency before a change and frequency identification information FID indicating a frequency after the change.

In a case where the "command type" is a lane setting instruction, the "command content" includes a local pen ID assigned to a target pen 2 and lane identification information LID indicating a lane to be set. In a case where the "command type" is a lane changing instruction, the "command content" includes lane identification information LID indicating a lane before a change and lane identification information LID indicating a lane after the change.

In a case where the "command type" is a pairing canceling instruction, the "command content" includes a local pen ID assigned to a target pen 2.

The uplink signal US2 in a case where the "command type" is a notification that a frame in question is a sub-frame to be described later is the uplink signal US2a depicted in FIG. 24D. As depicted in FIG. 24D, the "command content" in this case includes two bits of a sub-frame number and one bit of information PT indicating whether or not the pen 2 is to operate in the resource allocation scheme indicated by a last-obtained table number. The sub-frame number is numerical value information indicating a serial number(s) of one or more sub-frames within a pen data configuration frame to be described later. As the information PT, normally a value is set that indicates the pen 2 is to operate in the resource allocation scheme indicated by the last obtained table number. The information PT is provided to notify the pen 2 that there is no change in the resource allocation scheme. In response to detecting the information PT, which is set as a value indicating that the pen 2 is not to operate in the resource allocation scheme indicated by the last obtained table number, the pen 2 determines that the setting of the resource allocation scheme has failed, and cancels a state of being paired with the sensor controller 50.

"Pairing confirmation data" depicted in FIG. 24C is data similar to the "pairing confirmation data" depicted in FIG. 6. An "assigned LPID" is information indicating a local pen ID to be newly assigned to the pen 2 to be paired hereafter. The pen 2 according to the present embodiment is configured to obtain the local pen ID assigned to the pen 2 based on the notification from the sensor controller 50, and not based on comparing the new and old pairing control indicators with each other as depicted in step S27 in FIG. 11. However, the local pen ID may be obtained by comparing the new and old pairing control indicators with each other.

"Short uplink indication information" depicted in FIG. 24E is seven bits of information for notifying the pen 2 that the uplink signal US is the uplink signal US2a'. The uplink signal US2a' includes the above-described two bits of the sub-frame number and the above-described one bit of the information PT in addition to the "short uplink indication information."

In the following, with regard to each of the two resource allocation schemes corresponding to the table numbers n and n+1, a method of using each time slot in a case where the number of paired pens 2 is increased will be described in detail with reference to FIGS. 25 to 32.

Figure 26:
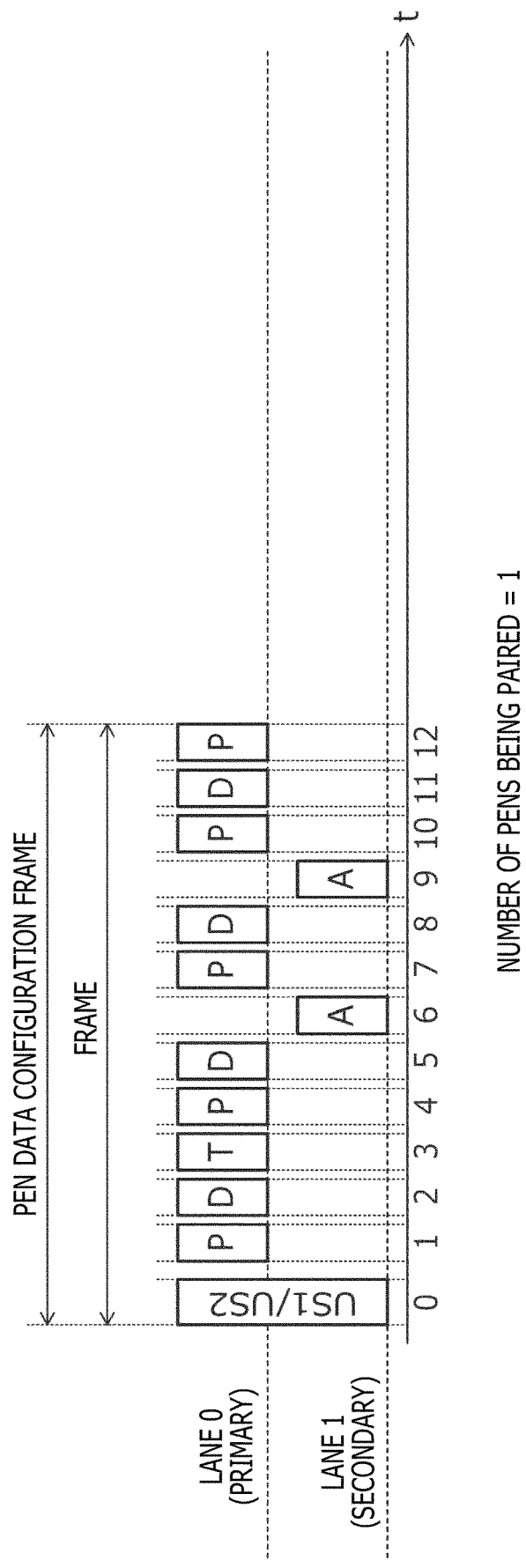
FIG. 26 is a diagram depicting a method of using each time slot in a case where the resource allocation scheme of the table number n depicted in FIG. 21 is used and where the number of pens 2 being paired is one.
Figure 27:
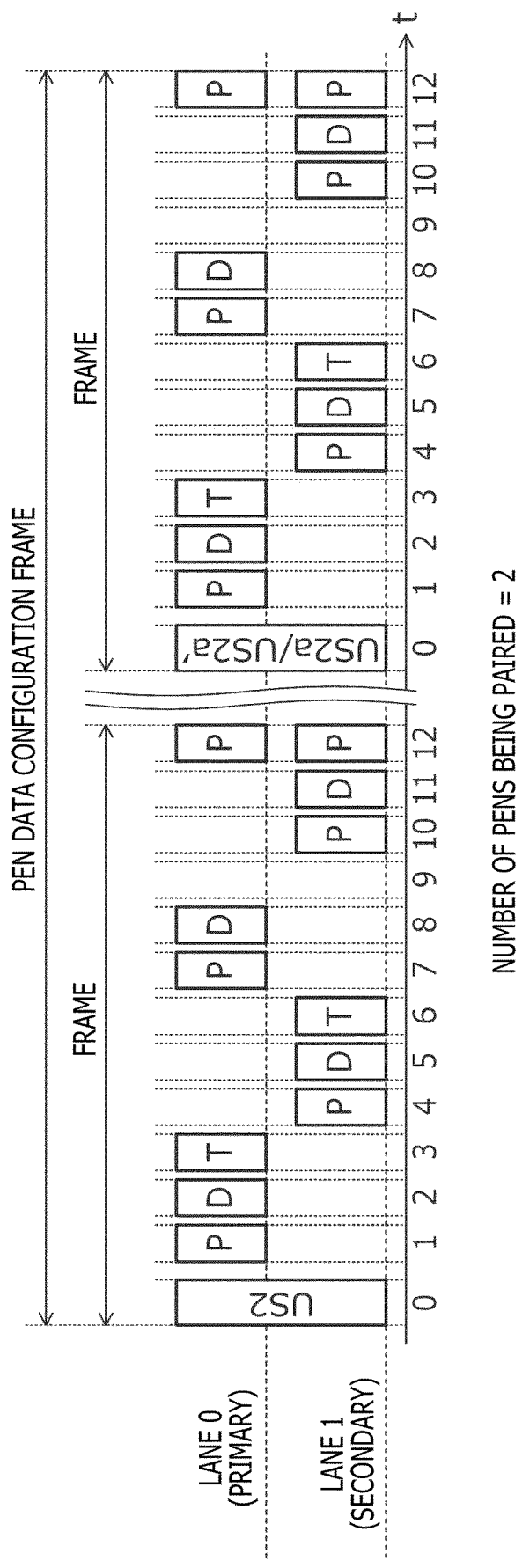
FIG. 27 is a diagram depicting a method of using each time slot in a case where the resource allocation scheme of the table number n depicted in FIG. 21 is used and where the number of pens 2 being paired is two.

FIGS. 25 to 27 are diagrams depicting a method of using each time slot in a case of using the resource allocation scheme of the table number n. FIG. 25 illustrates a case where the number of pens 2 being paired is zero. FIG. 26 illustrates a case where the number of pens 2 being paired is one. FIG. 27 illustrates a case where the number of pens 2 being paired is two. A lane 0 in each figure corresponds to a primary lane described above, and a lane 1 corresponds to a secondary lane corresponding to lane 0.

As depicted in FIG. 25, in the case where the number of pens 2 being paired is zero, the sensor controller 50 makes an entry into the discovery mode depicted in FIG. 9A, and performs processing similar to the processing depicted in FIG. 10. However, in steps S2 and S8 in FIG. 10, the lane identification information LID indicating lane 0 is set, in place of the time slot identification information TDID.

At this time, in parallel with the discovery mode, the sensor controller 50 makes an entry into the single lane mode described above. Thus, the sensor controller 50 treats one frame as one pen data configuration frame, and transmits the uplink signal US1 depicted in FIG. 24A at a start of each frame. In addition, the sensor controller 50 assigns, to lane 0, each time slot other than the sixth and ninth time slots set to be mute (see FIG. 23A), and attempts to receive an Ack signal in each assigned time slot. In FIG. 25, the time slots in which the sensor controller 50 attempts to receive an Ack signal are denoted as "A." This similarly applies in the following figures.

When receiving an Ack signal, the sensor controller 50 makes an entry into the pairing mode depicted in FIG. 9A, and performs pairing with a pen 2 that has transmitted the Ack signal. Details of the pairing are as described with reference to FIG. 11. However, in step S27 in FIG. 11, the pen 2 obtains the local pen ID by extraction from the uplink signal US3 instead of by comparing the new and old pairing control indicators with each other. The entry in the single lane mode is maintained during the process of the pairing.

FIG. 26 depicts a state in which a pairing with one pen 2 is completed. Also at this time, the sensor controller 50 maintains the entry in the single lane mode, and treats one frame as one pen data configuration frame. Then, the sensor controller 50 transmits the uplink signal US1 or the uplink signal US2 at a start of each frame by a processing similar to the processing depicted in FIG. 12 and FIG. 13. However, in step S2 in FIG. 13, the lane identification information LID indicating lane 1 is set, in place of the time slot identification information TDID.

In addition, the sensor controller 50 assigns all of the primary slots and the secondary slots depicted in FIG. 22 to lane 0, and uses all of the primary slots and the secondary slots to receive a downlink signal DS from the pen 2 being paired. When the pen 2 refers to operation mode information included in the uplink signal US1, and ascertains that the sensor controller 50 is operating in the single lane mode, the pen 2 also similarly assigns all of the primary slots and the secondary slots depicted in FIG. 22 to lane 0. Then, the pen 2 transmits a downlink signal DS by using lane 0 according to the lane identification information LID set in step S8 in FIG. 10.

In FIG. 26, time slots in which the sensor controller 50 attempts to receive a tone signal are denoted as "P," time slots in which the sensor controller 50 attempts to receive a data signal are denoted as "D," and time slots in which the sensor controller 50 attempts to receive a tilt signal are denoted as "T." This similarly applies in the following figures. As is clear from FIG. 26, the pen 2 in this case can transmit four tone signals, four data signals, and one tilt signal within one frame. Hence, the sensor controller 50 can treat one frame as one pen data configuration frame.

The sensor controller 50 also assigns the sixth and ninth time slots as a shared slot or a mute slot depicted in FIG. 22 to lane 1, and uses the time slots to attempt to receive an Ack signal transmitted from another pen 2. As depicted in FIG. 22, the shared slot and the mute slot are mute in the single lane mode, and can therefore be used to receive an Ack signal in lane 1. Pairing processing in a case where an Ack signal is received in lane 1 is similar to the pairing processing in the case where the Ack signal is received in lane 0.

FIG. 27 depicts a state in which a pairing with a second pen 2 is completed. At this time, the sensor controller 50 makes an entry into the dual lane mode in which the sensor controller 50 performs communication with the pens 2 by using both of lanes 0 and 1, and treats two or more consecutive frames (including a case where touch detection processing or pixel driving is performed between two frames, as depicted in FIG. 3, FIG. 15, and FIG. 20) as one pen data configuration frame. FIG. 27 illustrates a case where two consecutive frames are treated as one pen data configuration frame. This similarly applies in the following FIGS. 31 to 34. In addition, in the following, a first frame included in the pen data configuration frame may be referred to as a "main frame," and a second and subsequent frames may be referred to as "sub-frames."

The sensor controller 50 in this case transmits the uplink signal US2 at a start of each pen data configuration frame by a processing similar to the processing depicted in FIG. 12.

Because there is no room for receiving a new pen 2, the sensor controller 50 neither transmits the uplink signal US1 nor receives an Ack signal.

The sensor controller 50 transmits the uplink signal US2*a* depicted in FIG. 24D or the short uplink signal US2*a'* depicted in FIG. 24E at a start of a sub-frame. In response to receiving these signals, the pen 2 determines that the sub-frame is a frame used integrally with an immediately preceding main frame.

The sensor controller 50 assigns the primary slots depicted in FIG. 22 to lane 0, and assigns the secondary slots and the shared slot to lane 1. The sensor controller 50 uses the slots to receive a downlink signal DS from each of the two pens 2 being paired. When each pen 2 refers to the operation mode information included in the uplink signal US1 and ascertains that the sensor controller 50 is operating in the dual lane mode, the pen 2 also similarly assigns the primary slots depicted in FIG. 22 to lane 0, and assigns the secondary slots and the shared slot to lane 1. Then, the pen 2 transmits a downlink signal DS by using one of lanes 0 and 1 according to the lane identification information LID set in step S8 in FIG. 10.

Figure 28:
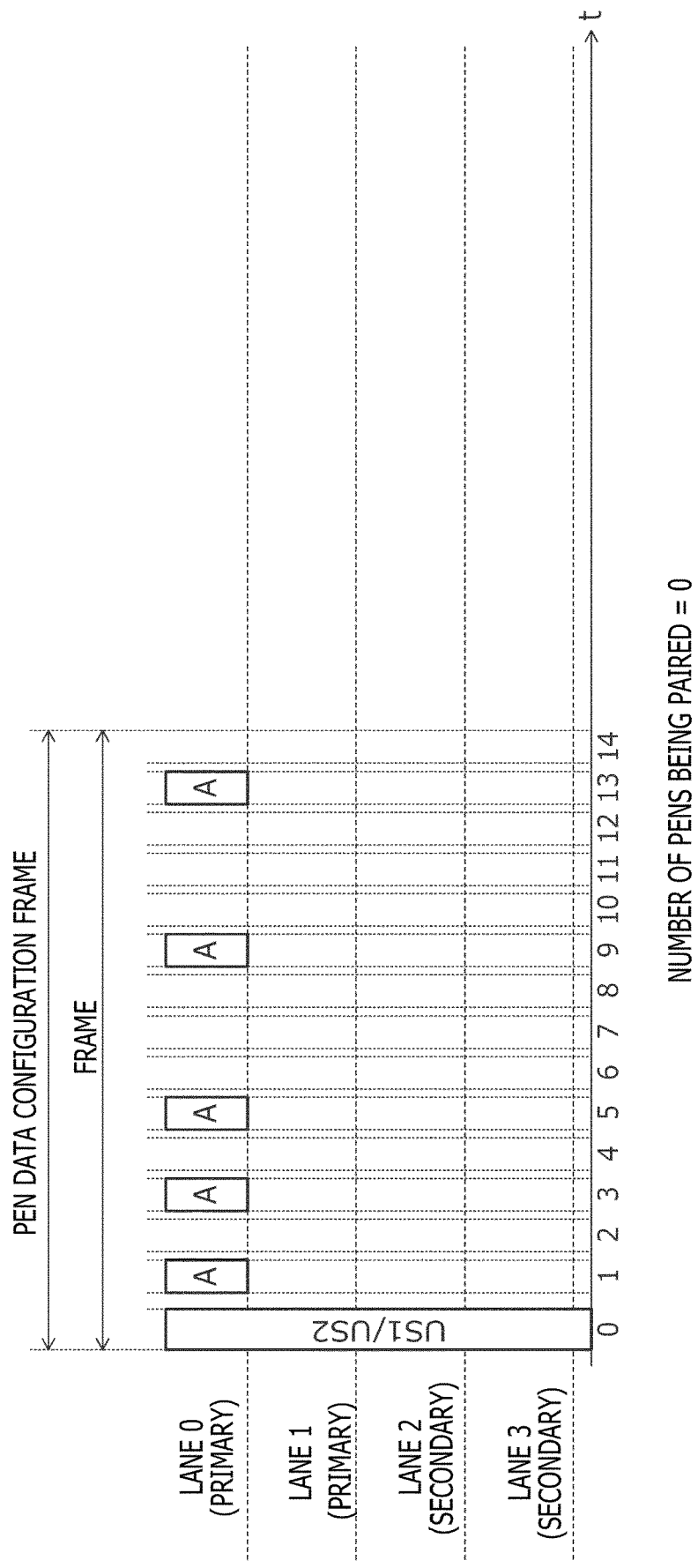
FIG. 28 is a diagram depicting a method of using each time slot in a case where the resource allocation scheme of the table number n+1 depicted in FIG. 21 is used and where the number of pens 2 being paired is zero.
Figure 29:
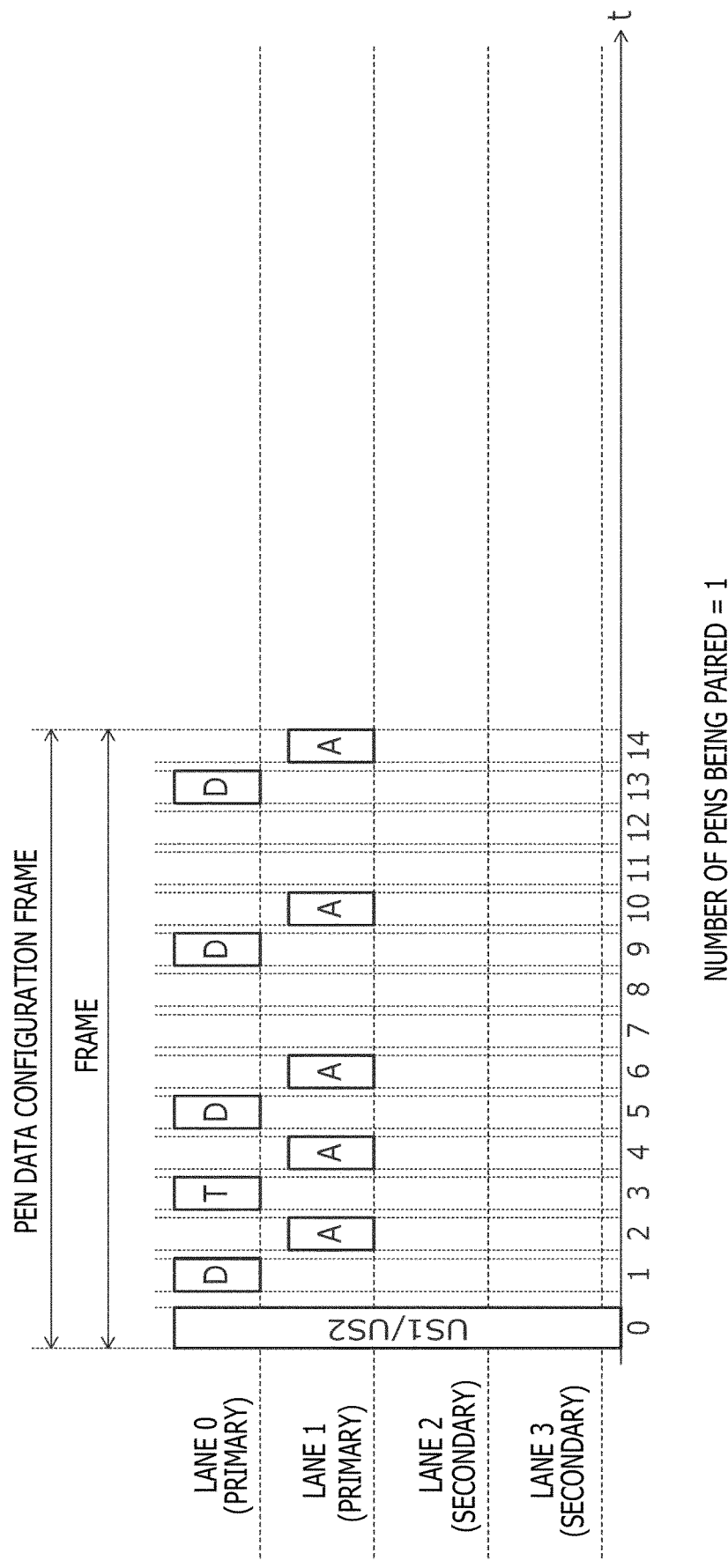
FIG. 29 is a diagram depicting a method of using each time slot in a case where the resource allocation scheme of the table number n+1 depicted in FIG. 21 is used and where the number of pens 2 being paired is one.
Figure 30:
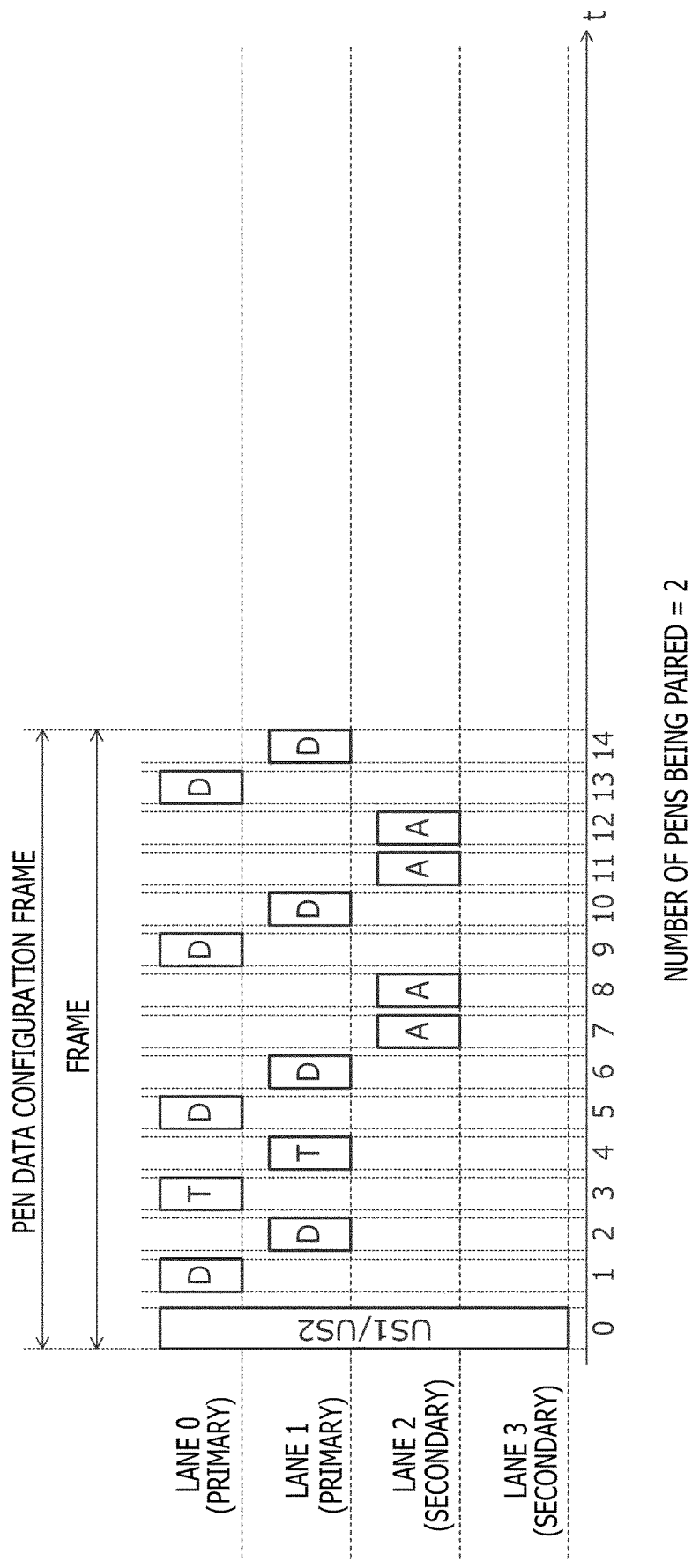
FIG. 30 is a diagram depicting a method of using each time slot in a case where the resource allocation scheme of the table number n+1 depicted in FIG. 21 is used and where the number of pens 2 being paired is two.
Figure 31:
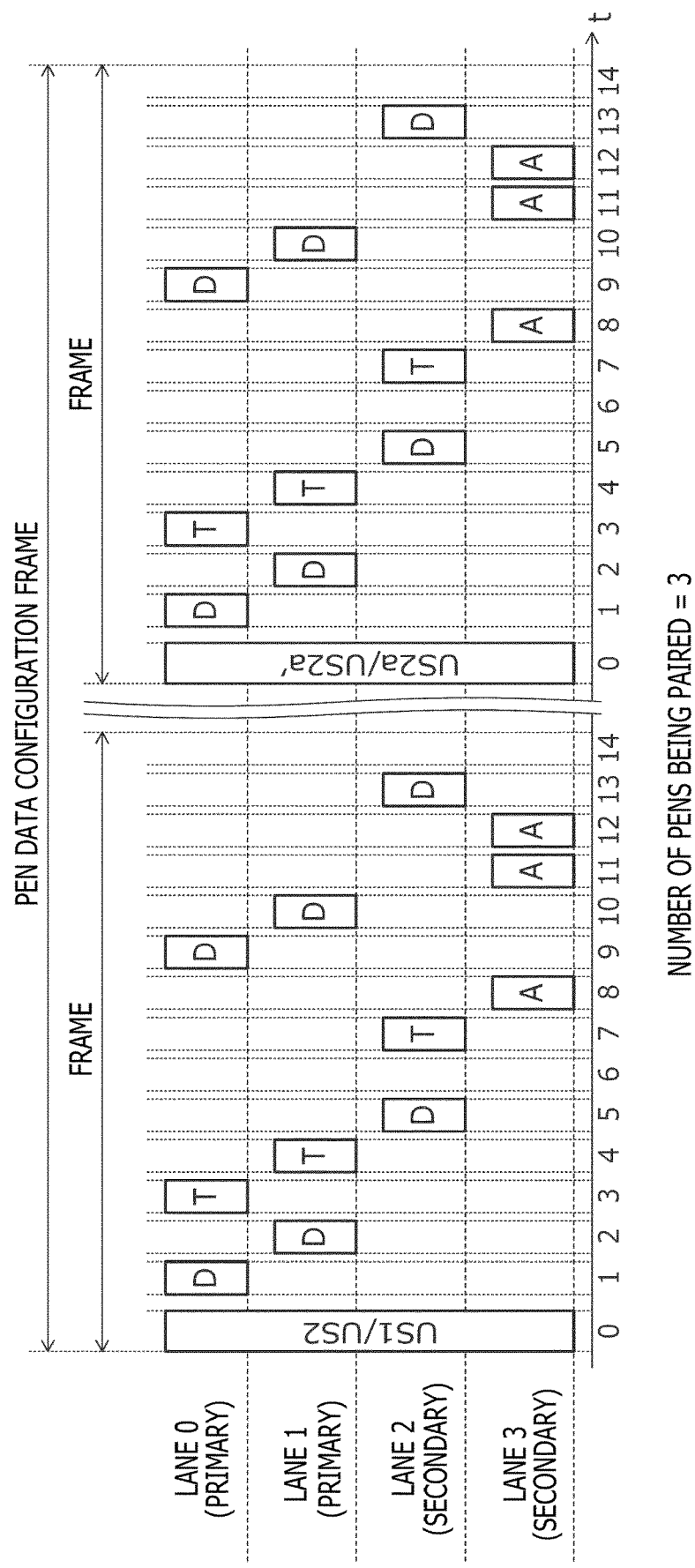
FIG. 31 is a diagram depicting a method of using each time slot in a case where the resource allocation scheme of the table number n+1 depicted in FIG. 21 is used and where the number of pens 2 being paired is three.
Figure 32:
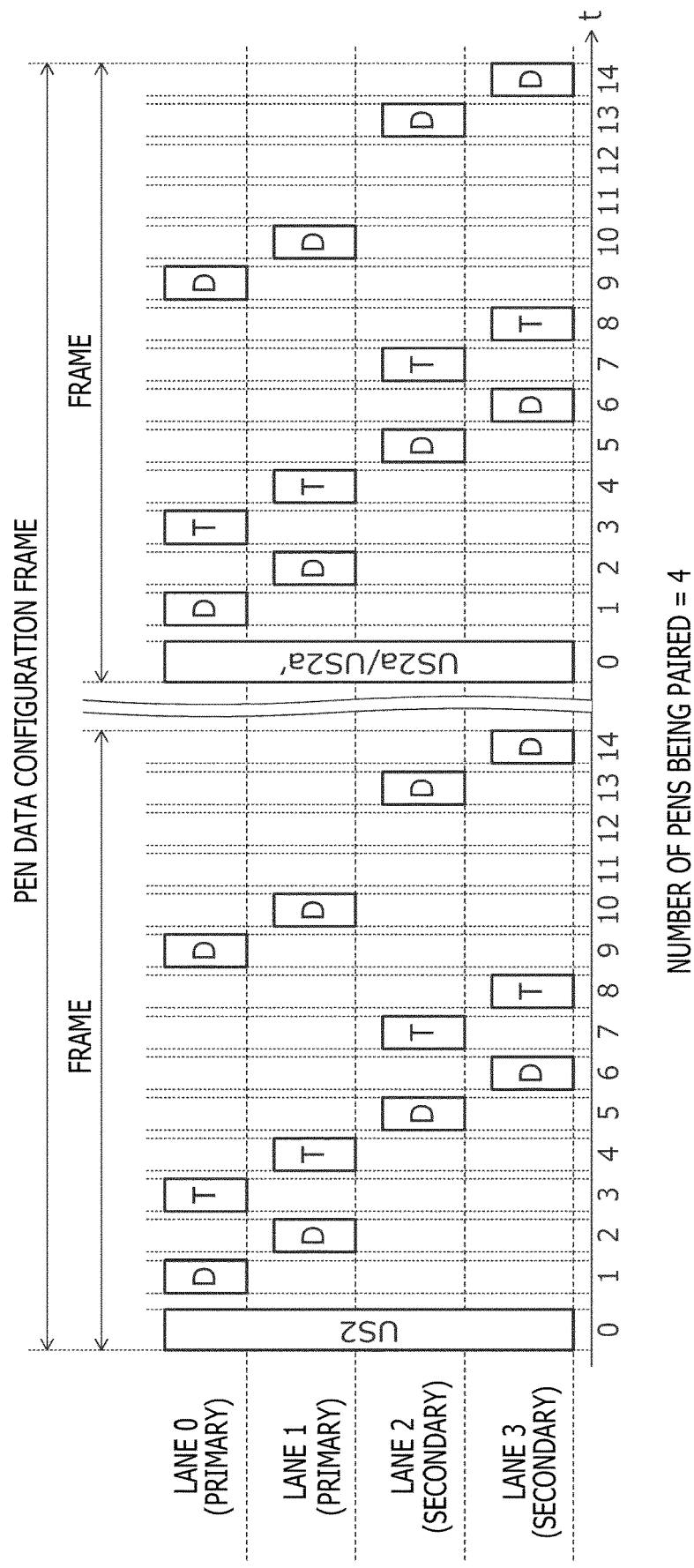
FIG. 32 is a diagram depicting a method of using each time slot in a case where the resource allocation scheme of the table number n+1 depicted in FIG. 21 is used and where the number of pens 2 being paired is four.

FIGS. 28 to 32 are diagrams depicting methods of using each time slot in a case of using the resource allocation scheme of the table number n+1. FIG. 28 illustrates a case where the number of pens 2 being paired is zero. FIG. 29 illustrates a case where the number of pens 2 being paired is one. FIG. 30 illustrates a case where the number of pens 2 being paired is two. FIG. 31 illustrates a case where the number of pens 2 being paired is three. FIG. 32 illustrates a case where the number of pens 2 being paired is four.

The sensor controller 50 is configured to have four lanes 0 to 3 in the case of using the resource allocation scheme of the table number n+1. Lanes 0 and 1 are respectively the primary lanes 0 and 1 depicted in FIG. 23B. In addition, lanes 2 and 3 respectively correspond to the secondary lanes corresponding to lanes 0 and 1.

As depicted in FIG. 28, in the case where the number of pens 2 being paired is zero, the sensor controller 50 makes an entry into the discovery mode depicted in FIG. 9A, and performs a processing similar to the processing depicted in FIG. 10. However, in steps S2 and S8 in FIG. 10, the lane identification information LID indicating lane 0 is set in place of the time slot identification information TDID.

At this time, in parallel with the discovery mode, the sensor controller 50 makes an entry into the single lane mode described above. Thus, the sensor controller 50 treats one frame as one pen data configuration frame, and transmits the uplink signal US1 depicted in FIG. 24A at a start of each frame. In addition, the sensor controller 50 assigns, to lane 0, each time slot other than the 7th and 11th time slots set to be mute (see FIG. 23B) among the 1st, 3rd, 5th, 7th, 9th, 11th, and 13th time slots intended to be assigned to lane 0, and attempts to receive an Ack signal in each assigned time slot. When receiving an Ack signal as a result, the sensor controller 50 makes an entry into the pairing mode depicted in FIG. 9A, and performs pairing with a pen 2 that has transmitted the Ack signal by a processing similar to the processing depicted in FIG. 11.

FIG. 29 depicts a state in which a pairing with one pen 2 is completed. Also at this time, the sensor controller 50 maintains the entry in the single lane mode, and treats one frame as one pen data configuration frame. Then, the sensor controller 50 transmits the uplink signal US1 or the uplink signal US2 at a start of each frame by a processing similar to the processing depicted in FIG. 12 and FIG. 13. However, in step S2 in FIG. 13, the lane identification information LID indicating lane 1 is set in place of the time slot identification information TDID.

In addition, the sensor controller 50 assigns all of time slots of the types D(P), T(P), and D(S) for lane 0 depicted in FIG. 23B to lane 0, and uses all of the time slots to receive a downlink signal DS from the pen 2 being paired. When the pen 2 refers to the operation mode information included in the uplink signal US1, and ascertains that the sensor controller 50 is operating in the dual lane mode, the pen 2 also similarly assigns all of the time slots of the types D(P), T(P), and D(S) for lane 0 depicted in FIG. 23B to lane 0. Then, the pen 2 transmits a downlink signal DS by using lane 0 according to the lane identification information LID set in step S8 in FIG. 10.

As is clear from FIG. 29, the pen 2 in this case can transmit four data signals used also for position detection and one tilt signal within one frame. Hence, the sensor controller 50 can treat one frame as one pen data configuration frame.

The sensor controller 50 also assigns, to lane 1, each time slot other than the 8th and 12th time slots (see FIG. 23B) set to be mute among the 2nd, 4th, 6th, 8th, 10th, 12th, and 14th time slots intended to be assigned to lane 1, and attempts to receive an Ack signal in each assigned time slot. When receiving an Ack signal as a result, the sensor controller 50 makes an entry into the pairing mode depicted in FIG. 9A, and performs pairing with a pen 2 that has transmitted the Ack signal by a processing similar to the processing depicted in FIG. 11.

FIG. 30 depicts a state in which pairings with the two pens 2 are completed. Also at this time, the sensor controller 50 maintains the entry in the single lane mode, and treats one frame as one pen data configuration frame. Then, the sensor controller 50 transmits the uplink signal US1 or the uplink signal US2 at a start of each frame by a processing similar to the processing depicted in FIG. 12 and FIG. 13. However, in step S2 in FIG. 13, the lane identification information LID indicating the lane 2 is set in place of the time slot identification information TDID.

In addition, the sensor controller 50 assigns all of time slots of the types D(P), T(P), and D(S) for lane 0 depicted in FIG. 23B to lane 0, and assigns all of time slots of the types D(P), T(P), and D(S) for lane 1 depicted in FIG. 23B to lane 1. The sensor controller 50 uses the time slots to receive a downlink signal DS from each of the pens 2 being paired. When each pen 2 refers to the operation mode information included in the uplink signal US1, and ascertains that the sensor controller 50 is operating in the single lane mode, the pen 2 also similarly assigns all of the time slots of the types D(P), T(P), and D(S) for lane 0 depicted in FIG. 23B to lane 0, and assigns all of the time slots of the types D(P), T(P), and D(S) for lane 1 depicted in FIG. 23B to lane 1. Then, the pen 2 transmits a downlink signal DS by using one of lanes 0 and 1 according to the lane identification information LID set in step S8 in FIG. 10.

As is clear from FIG. 30, each of the two pens 2 paired with the sensor controller 50 in this case can transmit four data signals used also for position detection and one tilt signal within one frame. Hence, even though the sensor controller 50 is paired with the two pens 2, the sensor controller 50 can treat one frame as one pen data configuration frame.

The sensor controller 50 also assigns the 7th, 8th, 11th, and 12th time slots (see FIG. 23B) as the shared slot or the mute slot depicted in FIG. 22 to lane 2, and attempts to receive an Ack signal in each assigned time slot. When receiving an Ack signal as a result, the sensor controller 50 makes an entry into the pairing mode depicted in FIG. 9A, and performs pairing with a pen 2 that has transmitted the Ack signal by a processing similar to the processing depicted in FIG. 11.

FIG. 31 depicts a state in which a pairing with the third pen 2 is completed. At this time, the sensor controller 50 makes an entry into the dual lane mode in which the sensor controller 50 performs communication with pens 2 using lanes 0 to 3, and treats two or more consecutive frames as one pen data configuration frame. Then, the sensor controller 50 transmits the uplink signal US1 or the uplink signal US2 at a start of each pen data configuration frame by a processing similar to the processing depicted in FIG. 12 and FIG. 13. However, in step S2 in FIG. 13, the lane identification information LID indicating the lane 3 is set in place of the time slot identification information TDID.

In addition, the sensor controller 50 transmits the uplink signal US2a depicted in FIG. 24D or the short uplink signal US2a' depicted in FIG. 24E at a start of a sub-frame. Receiving these signals, the pen 2 determines that the sub-frame is a frame used integrally with an immediately preceding main frame.

The sensor controller 50 assigns time slots of the types D(P) and T(P) as primary slots depicted in FIG. 22 to lanes 0 and 1 which are the primary lanes, and assigns time slots of the type D(S) as a secondary slot depicted in FIG. 22 to lane 2 as the secondary lane. Then, the sensor controller 50 uses the assigned time slots to receive a downlink signal DS from each of the three pens 2 being paired. When each pen 2 refers to the operation mode information included in the uplink signal US1, and ascertains that the sensor controller 50 is operating in the dual lane mode, the pen 2 also similarly assigns the time slots of the types D(P) and T(P) as primary slots depicted in FIG. 22 to lanes 0 and 1 as the primary lanes, and assigns the time slots of the type D(S) as a secondary slot depicted in FIG. 22 to the lane 2 as the secondary lane. Then, the pen 2 transmits a downlink signal DS in one of the lanes 0 to 2 according to the lane identification information LID set in step S8 in FIG. 10.

The sensor controller 50 also assigns the 8th, 11th, and 12th time slots (see FIG. 23B) as mute slots depicted in FIG. 22 to lane 3, and attempts to receive an Ack signal in each assigned time slot. When receiving an Ack signal as a result, the sensor controller 50 makes an entry into the pairing mode depicted in FIG. 9A, and performs pairing with a pen 2 that has transmitted the Ack signal by a processing similar to the processing depicted in FIG. 11.

FIG. 32 depicts a state in which a pairing with the fourth pen 2 is completed.

Also at this time, the sensor controller 50 maintains the entry in the dual lane mode, and treats two or more consecutive frames as one pen data configuration frame. Then, the sensor controller 50 transmits the uplink signal US2 at a start of each pen data configuration frame by a processing similar to the processing depicted in FIG. 12. In this case, because there is no room for receiving a new pen 2, the sensor controller 50 neither transmits the uplink signal US1 nor receives an Ack signal.

In addition, the sensor controller 50 transmits the uplink signal US2a depicted in FIG. 24D or the short uplink signal US2a' depicted in FIG. 24E at a start of a sub-frame. In response to receiving these signals, the pen 2 determines that the sub-frame is a frame used integrally with an immediately preceding main frame.

The sensor controller 50 assigns time slots of the types D(P) and T(P) as primary slots depicted in FIG. 22 to lanes 0 and 1 which are the primary lanes, and assigns time slots of the type D(S) as a secondary slot depicted in FIG. 22 to lanes 2 and 3 which are the secondary lanes. Then, the sensor controller 50 uses the assigned time slots to receive a downlink signal DS from each of the four pens 2 being paired. When each pen 2 refers to the operation mode information included in the uplink signal US1, and ascertains that the sensor controller 50 is operating in the dual lane mode, the pen 2 also similarly assigns the time slots of the types D(P) and T(P) as primary slots depicted in FIG. 22 to lanes 0 and 1 as the primary lanes, and assigns the time slots of the type D(S) as a secondary slot depicted in FIG. 22 to the lanes 2 and 3 as the secondary lanes. Then, the pen 2 transmits a downlink signal DS in one of the lanes 0 to 3 according to the lane identification information LID set in step S8 in FIG. 10.

Detailed description has been provided above of methods of using each time slot in a case where the number of paired pens 2 is increased with regard to each of the two resource allocation schemes corresponding to the table numbers n and n+1. Next, methods of using each time slot in a case where the number of paired pens 2 is decreased from three to two will be described in detail with reference to FIGS. 33 to 35 by taking the two resource allocation schemes corresponding to the table numbers n and n+1 as an example.

Figure 33:
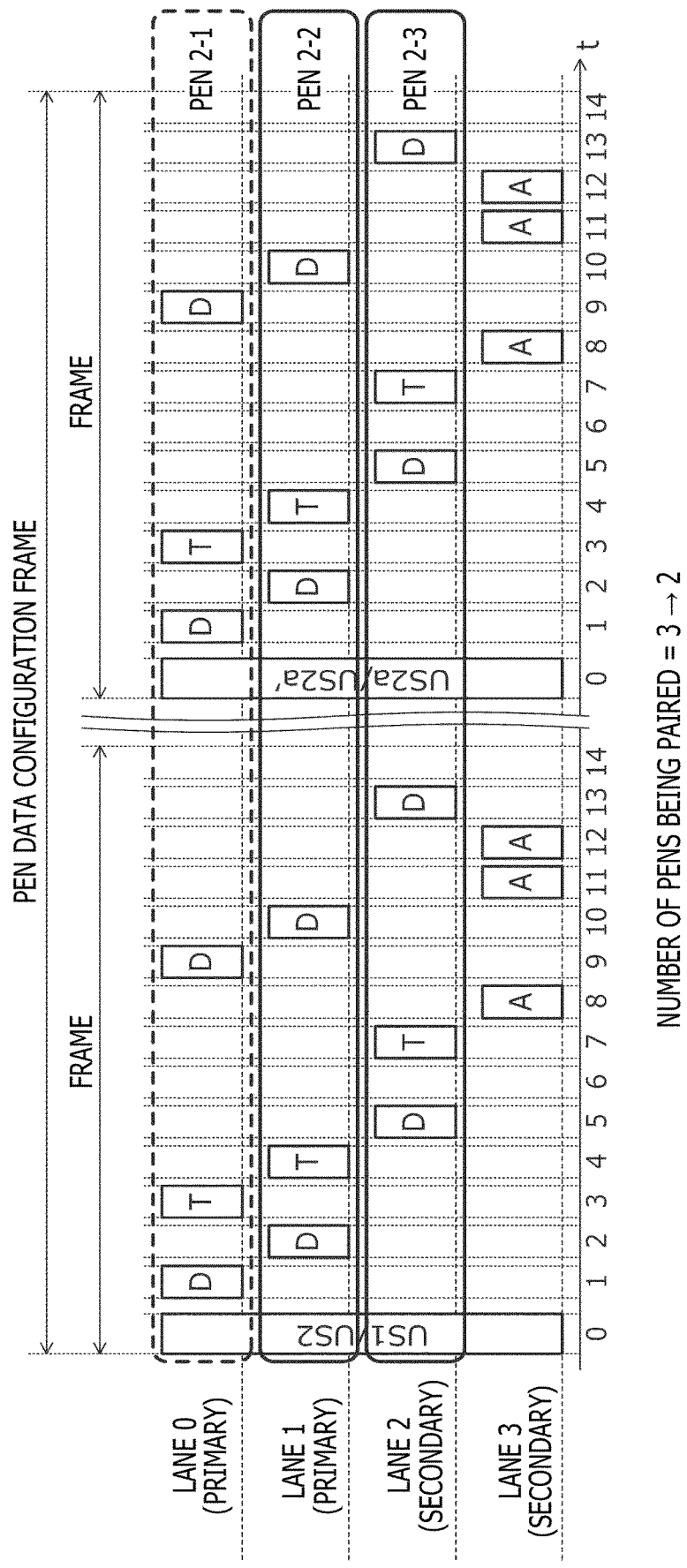
FIG. 33 is a diagram depicting a method of using each time slot in a case where the resource allocation scheme of the table number n+1 depicted in FIG. 21 is used and where the number of pens 2 being paired is three.
Figure 34:
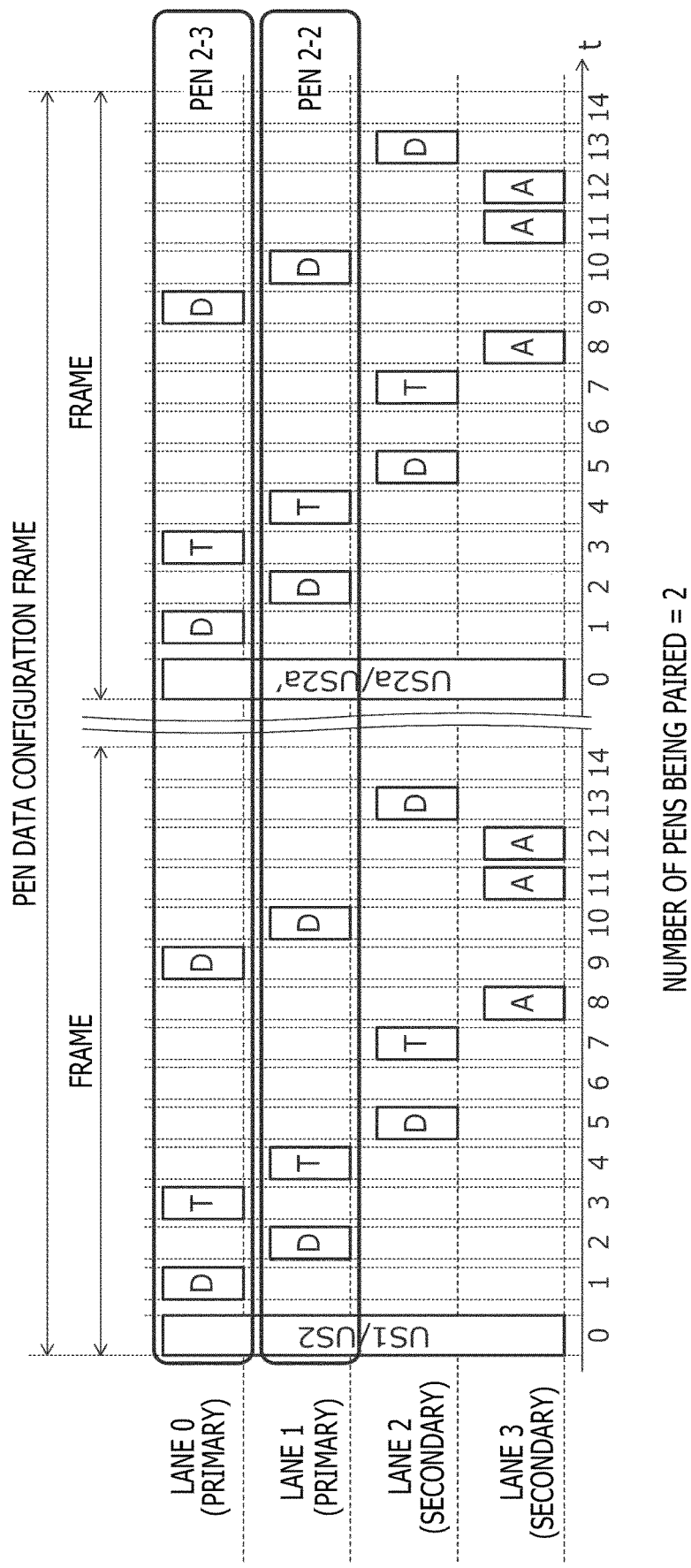
FIG. 34 is a diagram depicting a method of using each time slot after a pen 2-3 communicating in a lane 2 is moved to a lane 0 in a case where the resource allocation scheme of the table number n+1 depicted in FIG. 21 is used.

FIGS. 33 to 35 are diagrams depicting methods of using each time slot in a case of using the resource allocation scheme of the table number n+1. FIG. 33 illustrates a case where the number of pens 2 being paired is three. FIG. 34 and FIG. 35 illustrate cases where the number of pens 2 being paired is two.

The state of each time slot depicted in FIG. 33 is the same as that depicted in FIG. 31. In the following, as depicted in FIG. 33, a pen 2 being paired in lane 0 will be referred to as a pen 2-1, a pen 2 being paired in lane 1 will be referred to as a pen 2-2, and a pen 2 being paired in lane 2 will be referred to as a pen 2-3.

Suppose that the pen 2-1 is removed from the panel surface 1a in the state of FIG. 33. When the sensor controller 50 detects that no downlink signal DS is received from the pen 2-1 for a predetermined time, the sensor controller 50 performs processing for canceling the pairing with the pen 2-1.

Specifically, the sensor controller 50 first moves the pen 2-3 to lane 0, as depicted in FIG. 34. The processing is performed by changing lane 2 to lane 0 using the above-described lane changing instruction. As a result, as depicted in FIG. 34, the pen 2 using the secondary lane disappears.

The sensor controller 50 next changes the operation mode of the sensor controller 50 itself from the dual lane mode to the single lane mode. Accordingly, as depicted in FIG. 35, the sensor controller 50 assigns all of the time slots of the types D(P), T(P), and D(S) for lanes 0 and 1 as depicted in FIG. 23B to lanes 0 and 1, respectively. Then, the sensor controller 50 uses the assigned time slots to receive downlink signals DS from the pens 2-2 and 2-3 being paired. When the pens 2-2 and 2-3 refer to the operation mode information included in the uplink signal US1, and ascertain that the sensor controller 50 is operating in the single lane mode, the pens 2-2 and 2-3 also similarly assign all of the time slots of the types D(P), T(P), and D(S) for lanes 0 and 1 as depicted in FIG. 23B to lanes 0 and 1, respectively. Then, the pen 2-2 transmits a downlink signal DS by using lane 1, and the pen 2-3 transmits a downlink signal DS by using lane 0.

As described above, according to the present embodiment, the sensor controller 50 can notify each pen 2 to be paired hereafter, in advance using the uplink signal US1, with respect to each of a plurality of time slots, whether the slot is a primary slot or a secondary slot. Hence, it is not necessary to repeatedly transmit an uplink signal US to notify the transmission timing of a downlink signal DS. It is therefore possible to decrease the transmission frequency of the uplink signal US to thereby achieve efficient communication.

In addition, a shared slot is provided, which is used to receive a signal from a pen 2 not yet paired in the single lane mode, and is used to receive a data signal from a second pen 2 in the dual lane mode. Thus, in the dual lane mode in which it is not necessary to receive a signal from a pen 2 not yet paired, time slots reserved to receive a signal from a pen 2 not yet paired can be used for another purpose without using an explicit request by an uplink signal US.

In addition, during operation in the dual lane mode, a predetermined number of time slots among a plurality of time slots included in each of two consecutive frames are assigned to each of two pens 2 being paired, as time slots for transmission of a downlink signal DS. It is therefore possible to simultaneously use more pens 2 than the number of pens 2 defined by the number of time slots that can be accommodated within one frame.

In addition, when communication with the pen 2-1 communicating in the primary lane is ended during operation in the dual lane mode, the pen 2-3 communicating in the secondary lane is moved to the primary lane, and thereafter the operation mode is changed to the single lane mode. Thus, when the number of pens 2 used simultaneously is decreased and becomes equal to or less than a predetermined upper limit value, a communication rate can be restored to the original rate.

Preferred embodiments of the present invention have been described above. However, the present invention is not at all limited to such embodiments, and the present invention can of course be carried out in various modes without departing from the principles of the present invention.

For example, a data signal constituting a downlink signal DS may be a spread-modulated signal. In this case, the pairing setting information depicted in FIG. 6A may include identification information indicating assignment of communication resources to each pen 2 with regard to a spread code (spread code identification information). This enables the data signal to be modulated by using a spread code different for each pen 2. In addition, in this case, an item of spread code length may be provided in the resource allocation scheme table depicted in FIG. 8. This makes it possible to change the bit rate of the downlink signal DS by changing the spread code length.

The present invention can be configured as in each of the claims set forth below.

[Claim A1] A sensor controller for detecting a position of a pen by receiving a downlink signal from the pen by using any receiving method, wherein
the sensor controller transmits an uplink signal indicating a change in a bit rate of the downlink signal to the pen, and changes the receiving method for the downlink signal to a new receiving method corresponding to the bit rate after the change.

[Claim A2] The sensor controller according to claim A1, where
the uplink signal indicating the change in the bit rate of the downlink signal is a signal indicating a change in a symbol length of the downlink signal, and
a reception window for detecting the downlink signal is changed according to the symbol length after the change.

[Claim A3] The sensor controller according to claim A1, wherein
information indicating the bit rate of the downlink signal is broadcast to one or more paired pens.

[Claim A4] A pen that transmits a downlink signal to a sensor controller, wherein
the pen changes a symbol length of the downlink signal in response to reception of an uplink signal indicating a change in the symbol length of the downlink signal from the sensor controller.

[Claim B1] A sensor controller that performs communication with one or more pens in units of a super-frame including a plurality of frames each including a plurality of time slots, wherein
the sensor controller transmits a start uplink signal including setting information applied to the entire super-frame by using a start frame located at a start among the plurality of frames, and
in each of one or more succeeding frames as a frame other than the start frame among the plurality of frames, the sensor controller transmits a succeeding uplink signal indicating a reference time for the plurality of time slots arranged within the succeeding frame.

[Claim B2] The sensor controller according to claim B1, wherein
in each of the one or more succeeding frames, the sensor controller transmits the succeeding uplink signal at a timing moved forward or rearward by a time difference, for each succeeding frame, from a transmission timing determined from a temporal position of the super-frame.

[Claim B3] The sensor controller according to claim B1, wherein
the setting information includes information indicating the number of the frames arranged within the super-frame.

[Claim B4] A pen that performs communication with a sensor controller in units of a super-frame including a plurality of frames each including a plurality of time slots, wherein
when an uplink signal received from the sensor controller is a start uplink signal including setting information applied to the entire super-frame, the pen sets the setting information in a memory, and
when the uplink signal received from the sensor controller is a succeeding uplink signal indicating a reference time for the plurality of time slots arranged in one of one or more succeeding frames as a frame other than a start frame located at a start among the plurality of frames, the pen obtains a temporal position of each time slot within the corresponding succeeding frame on the basis of a reception timing of the succeeding uplink signal.

[Claim B5] The pen according to claim B4, wherein
the setting information includes division information indicating the number of the frames arranged within the super-frame, and
the pen obtains the number of the frames arranged within the super-frame on the basis of the division information.

[Claim C1] A sensor controller that performs communication with one or more pens, respectively, by using a frame including a plurality of first time slots, wherein the sensor controller is configured to operate in one of a single lane mode in which a data signal is received from a first pen, and a dual lane mode in which the data signal is received from each of the first pen and a second pen, the plurality of first time slots include a first primary slot, which is used to receive the data signal from the first pen in each of the single lane mode and the dual lane mode, and a first secondary slot, which is used to receive the data signal from the first pen in the single lane mode and is used to receive the data signal from the second pen in the dual lane mode, and the sensor controller transmits an uplink signal including slot assignment information indicating, for each of the plurality of first time slots, whether the slot is the first primary slot or the first secondary slot.

[Claim C2] The sensor controller according to claim C1, wherein the uplink signal further includes operation mode information indicating in which of the single lane mode and the dual lane mode the sensor controller is operating.

[Claim C3] The sensor controller according to claim C1 or C2, wherein during operation in the single lane mode, the sensor controller receives a downlink signal from the first pen in both the first time slot as the first primary slot and the first time slot as the first secondary slot, and during operation in the dual lane mode, the sensor controller receives the downlink signal from the first pen in the first time slot as the first primary slot, whereas the sensor controller receives the downlink signal from the second pen in the first time slot as the first secondary slot.

[Claim C4] The sensor controller according to claim C1 or C2, wherein the frame further includes a plurality of second time slots, the single lane mode is a mode in which the data signal is received from each of the first pen and a third pen, the dual lane mode is a mode in which the data signal is received from each of the first pen, the second pen, the third pen, and a fourth pen, the plurality of second time slots include a second primary slot, which is used to receive the data signal from the third pen in each of the single lane mode and the dual lane mode, and a second secondary slot, which is used to receive the data signal from the third pen in the single lane mode and is used to receive the data signal from the fourth pen in the dual lane mode, and the slot assignment information includes information indicating, for each of the plurality of second time slots, whether the slot is the second primary slot or the second secondary slot.

[Claim C5] The sensor controller according to claim C4, wherein during operation in the single lane mode, the sensor controller receives a downlink signal from the first pen in both the first time slot as the first primary slot and the first time slot as the first secondary slot, and the sensor controller receives the downlink signal from the third pen in both the second time slot as the second primary slot and the second time slot as the second secondary slot, and during operation in the dual lane mode, the sensor controller receives the downlink signal from the first pen in the first time slot as the first primary slot, whereas the sensor controller receives the downlink signal from the second pen in the first time slot as the second secondary slot, and the sensor controller receives the downlink signal from the third pen in the second time slot as the first primary slot, whereas the sensor controller receives the downlink signal from the fourth pen in the second time slot as the second secondary slot.

[Claim C6] A pen that performs communication with a sensor controller by using a frame including a plurality of time slots including a primary slot used to receive a data signal from a first pen in each of a single lane mode, in which the data signal is received from the first pen, and a dual lane mode, in which the data signal is received from each of the first pen and a second pen, and a secondary slot, which is used to receive the data signal from the first pen in the single lane mode and is used to receive the data signal from the second pen in the dual lane mode, the pen receives, from the sensor controller, an uplink signal including slot assignment information, which indicates which of the primary slot and the secondary slot each of the plurality of time slots is, and operation mode information indicating in which of the single lane mode and the dual lane mode the sensor controller is operating, when the operation mode information indicates that the sensor controller is operating in the single lane mode, the pen transmits a downlink signal in both the time slot as the primary slot and the time slot as the secondary slot, and when the operation mode information indicates that the sensor controller is operating in the dual lane mode, the pen transmits the downlink signal in one of the time slot as the primary slot and the time slot as the secondary slot, whereas the pen does not transmit the downlink signal in the other of the time slot as the primary slot and the time slot as the secondary slot.

[Claim D1] A sensor controller that performs communication with one or more pens, respectively, by using a frame including a plurality of time slots, wherein the sensor controller is configured to operate in one of a single lane mode in which a data signal is received from a first pen and a dual lane mode in which the data signal is received from each of the first pen and a second pen, and the plurality of time slots include a shared slot, which is used to receive a signal from a pen not yet paired in the single lane mode and is used to receive the data signal from the second pen in the dual lane mode.

[Claim D2] The sensor controller according to claim D1, wherein the sensor controller transmits an uplink signal including slot assignment information identifying a time slot as the shared slot among the plurality of time slots.

[Claim D3] A pen that performs communication with a sensor controller by using a frame including a plurality of time slots, the sensor controller being configured to operate in one of a single lane mode in which a data signal is received from a first pen and a dual lane mode in which the data signal is received from each of the first pen and a second pen, wherein the pen receives, from the sensor controller, an uplink signal including slot assignment information identifying, among the plurality of time slots, a shared slot, which is used to receive a signal from a pen not yet paired in the single lane mode and is used to receive the data signal from the second pen in the dual lane mode, and operation mode information indicating in which of the single lane mode and the dual lane mode the sensor controller is operating, when the pen is not paired with the sensor controller at a point in time when the pen receives the uplink signal, and the operation mode information indicates that the sensor controller is operating in the single lane mode, the pen transmits a signal for requesting a pairing with the sensor controller in the time slot as the shared slot, and when the pen is paired with the sensor controller at a point in time when the pen receives the uplink signal, and the operation mode information indicates that the sensor controller is operating in the dual lane mode, the pen transmits the data signal in the time slot as the shared slot.

[Claim E1] A sensor controller that performs communication with one or more pens, respectively, by using a series of frames each including a plurality of time slots, wherein the sensor controller is configured to operate in one of a single lane mode in which a data signal is received from a first pen and a dual lane mode in which the data signal is received from each of the first pen and a second pen, during operation in the single lane mode, the sensor controller assigns to the first pen, as time slots for transmission of a downlink signal, a predetermined number of time slots among the plurality of time slots included in one frame, and during operation in the dual lane mode, the sensor controller assigns to each of the first pen and the second pen, as time slots for transmission of the downlink signal, the predetermined number of time slots among the plurality of time slots in each of a first frame and a second frame that is consecutive to the first frame.

[Claim E2] The sensor controller according to claim E1, wherein the sensor controller is configured to transmit an uplink signal at a start of each of the series of frames, and the uplink signal transmitted at a start of the second frame includes information indicating that the second frame is a frame used integrally with the first frame.

[Claim E3] The sensor controller according to claim E1 or E2, wherein during operation in the dual lane mode, the sensor controller assigns to each of the first pen and the second pen, as time slots for transmission of the downlink signal, the same number of time slots from each of the first frame and the second frame.

[Claim E4] A pen that performs communication with a sensor controller by using a frame including a plurality of time slots, the sensor controller being configured to operate in one of a single lane mode in which a data signal is received from a first pen and a dual lane mode in which the data signal is received from each of the first pen and a second pen, wherein the pen receives, from the sensor controller, an uplink signal including operation mode information indicating in which of the single lane mode and the dual lane mode the sensor controller is operating, when the operation mode information indicates that the sensor controller is operating in the single lane mode, the pen transmits a downlink signal by using a predetermined number of time slots among the plurality of time slots included in one frame, and when the operation mode information indicates that the sensor controller is operating in the dual lane mode, the pen transmits the downlink signal by using one half of the predetermined number of time slots among the plurality of time slots included in one frame.

[Claim F1] A sensor controller that performs communication with one or more pens, respectively, by using a series of frames each including a plurality of time slots, wherein the sensor controller is configured to operate in one of a single lane mode, in which communication with a first pen is performed at a first communication rate by using a first primary lane, and a dual lane mode, in which the communication with the first pen is performed at a second communication rate half the first communication rate by using the first primary lane and communication with a second pen is performed at the second communication rate by using a first secondary lane, and when the communication with the first pen is ended during operation in the dual lane mode, the sensor controller moves the second pen to the first primary lane and thereafter changes an operation mode to the single lane mode.

[Claim F2] The sensor controller according to claim F1, wherein in the single lane mode, the sensor controller performs the communication with the first pen at the first communication rate by using the first primary lane and performs communication with a third pen at the first communication rate by using a second primary lane, and in the dual lane mode, the sensor controller performs the communication with the first pen at the second communication rate by using the first primary lane, and performs the communication with the second pen at the second communication rate by using the first secondary lane and performs the communication with the third pen at the second communication rate by using the second primary lane.

DESCRIPTION OF REFERENCE SYMBOLS

1: Electronic apparatus
1a: Panel surface
2, 2-1, 2-2, 2-3: Pen
2a, 2b: Pen tip electrode
10: Display device
11: Polarizing filter
12, 19, 33: Glass substrate
13: Pixel electrode group
14, 16: Alignment film
15: Liquid crystal layer
17: Common electrode
18: Color filter
20: Polarizing filter
30: Sensor panel
31: Row electrode group
32: Column electrode group
34, 35: Lead wiring
40: Control unit
50: Sensor controller
B: Start symbol
BP: Blank period
D0 to D7: Symbol
DP: Pixel driving period
DS: Downlink signal
D(P), P(B), P(P), T(P): Primary slot
D(S), P(S), T(S): Secondary slot
FID: Frequency identification information
FS: Finger detection signal
ID: Local pen
LID: Lane identification information
M(B): Ack slot M(P): Shared slot
PE: Pairing enable information
RM: Operation mode information
SL: Symbol length
ST: State type information
TDID: Time slot identification information
US, US1, US1a, US2, US2a, US3, US4: Uplink signal
US2a': Short uplink signal
USTYPE: Uplink type information

The invention claimed is:

1. A sensor controller comprising:
a memory; and
a processor configured to assign communication resources to one or more pens, respectively, and to detect a position of each of the one or more pens based on a downlink signal received from each of the one or more pens using the assigned communication resources,
wherein
when changing a resource allocation scheme indicating a structure of the communication resources or a method of using the communication resources, the sensor controller broadcasts information indicating a new resource allocation scheme to the one or more pens.

2. The sensor controller according to claim 1, wherein the sensor controller is configured to receive the downlink signal by using a plurality of time slots arranged within a frame, and
the resource allocation scheme includes one or more of: a number of time slot identification information (TDIDs) indicating assignment of the time slots to each pen, a number of the time slots included in the frame, a time length of the time slot, content of a signal to be transmitted in each of the plurality of time slots by each of the one or more pens, a modulation system of a data signal to be transmitted by the one or more pens, or a symbol length of the data signal.

3. The sensor controller according to claim 2, wherein the sensor controller is configured to perform communication with each of the one or more pens in units of a super-frame controlled by the sensor controller, and
the super-frame includes a plurality of frames.

4. The sensor controller according to claim 3, wherein the sensor controller transmits a start uplink signal including information indicating the resource allocation scheme, by using a start frame located at a start among the plurality of frames included in the super-frame, and
in each of one or more succeeding frames other than the start frame among the plurality of frames, the sensor controller transmits a succeeding uplink signal indicating a reference time for the plurality of time slots arranged within the succeeding frame.

5. The sensor controller according to claim 3, wherein the super-frame is in synchronism with a display frame of a display device disposed together with a sensor panel for receiving the downlink signal, and the display frame includes a plurality of blank periods that are each a period in which pixel driving operation is not performed, and
one frame is arranged in each of the plurality of blank periods.

6. The sensor controller according to claim 2, wherein the plurality of time slots are arranged in one blank period included in a display frame of a display device disposed together with a sensor panel for receiving the downlink signal.

7. The sensor controller according to claim 1, wherein the sensor controller changes the resource allocation scheme on a basis of a number of paired pens.

8. The sensor controller according to claim 1, wherein, when changing the resource allocation scheme, the sensor controller broadcasts the information indicating the new resource allocation scheme to all of paired pens.

9. The sensor controller according to claim 1, wherein, when changing the resource allocation scheme, the sensor controller broadcasts the information indicating the new resource allocation scheme to one or more pens to which a specific communication parameter is applicable.

10. A pen comprising:
a memory; and
a processor configured to receive a resource allocation scheme, which is broadcasted by a sensor controller to be received by a plurality of pens including the pen and which indicates a structure of communication resources or a method of using the communication resources, and to transmit a downlink signal according to the broadcasted resource allocation scheme,
wherein
the pen is configured to receive identification information indicating assignment of the communication resources from the sensor controller and to transmit the downlink signal by using the communication resources assigned by the identification information, and
when the pen receives a new resource allocation scheme broadcasted by the sensor controller, the pen continues to use the communication resources assigned by the identification information to transmit the downlink signal according to the new resource allocation scheme.

11. The pen according to claim 10, wherein, when receiving a command indicating a change in the assignment of the communication resources from the sensor controller, the pen transmits the downlink signal by using the changed communication resources.

12. The pen according to claim 10, wherein
the pen is configured to transmit the downlink signal by using a plurality of time slots arranged within a frame, and
the resource allocation scheme includes one or more of: a number of time slot identification information (TDIDs) indicating assignment of the time slots to each pen, a number of the time slots included in the frame, a time length of the time slot, content of a signal to be transmitted in each of the plurality of time slots by each pen, a modulation system of a data signal to be transmitted by each pen, or a symbol length of the data signal.

13. The pen according to claim 12, wherein the pen transmits the downlink signal in a time slot assigned by the time slot identification information among a plurality of time slots arranged in one blank period included in a display frame of a display device disposed together with a sensor panel for the sensor controller to receive the downlink signal.

* * * * *